US008114946B2

(12) United States Patent
Yang et al.

(10) Patent No.: US 8,114,946 B2
(45) Date of Patent: Feb. 14, 2012

(54) PROCESS FOR PRODUCING BROADER MOLECULAR WEIGHT DISTRIBUTION POLYMERS WITH A REVERSE COMONOMER DISTRIBUTION AND LOW LEVELS OF LONG CHAIN BRANCHES

(75) Inventors: Qing Yang, Bartlesville, OK (US); Max P. McDaniel, Bartlesville, OK (US); Joel L. Martin, Bartlesville, OK (US); Tony R. Crain, Niotaze, KS (US); Randy S. Muninger, Dewey, OK (US); Jerry T. Lanier, Bartlesville, OK (US); Jeff S. Fodor, Bartlesville, OK (US); Paul J. Deslauriers, Owasso, OK (US); Chung C. Tso, Bartlesville, OK (US); David C. Rohlfing, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 365 days.

(21) Appl. No.: 12/338,225

(22) Filed: Dec. 18, 2008

(65) Prior Publication Data

US 2010/0160579 A1 Jun. 24, 2010

(51) Int. Cl.
C08F 4/6592 (2006.01)

(52) U.S. Cl. ........ 526/129; 526/126; 526/127; 526/151; 526/154; 526/155; 526/134; 526/160; 526/170; 526/905; 526/943

(58) Field of Classification Search .................. 526/126, 526/127, 129, 134, 160, 170, 905
See application file for complete search history.

(56) References Cited

U.S. PATENT DOCUMENTS

| 3,242,099 A | 3/1966 | Manyik |
|---|---|---|
| 3,248,179 A | 4/1966 | Norwood |
| 4,060,480 A | 11/1977 | Reed |
| 4,452,910 A | 6/1984 | Hopkins |
| 4,501,885 A | 2/1985 | Sherk |
| 4,588,790 A | 5/1986 | Jenkins |
| 4,794,096 A | 12/1988 | Ewen |
| 4,808,561 A | 2/1989 | Welborn |
| 5,191,132 A | 3/1993 | Patsidis |
| 5,210,352 A | 5/1993 | Alt |
| 5,352,749 A | 10/1994 | DeChellis |
| 5,376,611 A | 12/1994 | Shveima |
| 5,399,636 A | 3/1995 | Alt |
| 5,401,817 A | 3/1995 | Palackal |
| 5,420,320 A | 5/1995 | Zenk |
| 5,436,304 A | 7/1995 | Griffin |
| 5,436,305 A | 7/1995 | Alt |
| 5,451,649 A | 9/1995 | Zenk |
| 5,455,314 A | 10/1995 | Burns |
| 5,498,581 A | 3/1996 | Welch |
| 5,565,175 A | 10/1996 | Hottovy |
| 5,571,880 A | 11/1996 | Alt |
| 5,575,979 A | 11/1996 | Hanson |
| 5,576,259 A | 11/1996 | Hasegawa |
| 5,631,203 A | 5/1997 | Welch |
| 5,631,335 A | 5/1997 | Alt |
| 5,654,454 A | 8/1997 | Peifer |
| 5,705,579 A | 1/1998 | Hawley |
| 5,739,220 A | 4/1998 | Shamshoum |
| 5,798,427 A | 8/1998 | Foster et al. |
| 5,807,938 A | 9/1998 | Kaneko |
| 5,919,983 A | 7/1999 | Rosen |
| 6,107,230 A | 8/2000 | McDaniel |
| 6,165,929 A | 12/2000 | McDaniel |
| 6,187,880 B1 | 2/2001 | Welch |
| 6,239,235 B1 | 5/2001 | Hottovy |
| 6,262,191 B1 | 7/2001 | Hottovy |
| 6,268,444 B1 | 7/2001 | Klosin |
| 6,294,494 B1 | 9/2001 | McDaniel |
| 6,300,271 B1 | 10/2001 | McDaniel |
| 6,316,553 B1 | 11/2001 | McDaniel |
| 6,355,594 B1 | 3/2002 | McDaniel |
| 6,376,415 B1 | 4/2002 | McDaniel |
| 6,388,017 B1 | 5/2002 | McDaniel |
| 6,391,816 B1 | 5/2002 | McDaniel |
| 6,395,666 B1 | 5/2002 | McDaniel |
| 6,462,161 B1 | 10/2002 | Cady |
| 6,509,427 B1 | 1/2003 | Welch |
| 6,524,987 B1 | 2/2003 | Collins |
| 6,548,441 B1 | 4/2003 | McDaniel |
| 6,548,442 B1 | 4/2003 | McDaniel |
| 6,576,583 B1 | 6/2003 | McDaniel |

(Continued)

FOREIGN PATENT DOCUMENTS

EP 0 351 392 A2 1/1990

(Continued)

OTHER PUBLICATIONS

Alt, H.G. et al., C1-Bridged Fluornylidene Cyclopentadienylidene . . . , Journal of Organometallic Chemistry, 1998, 568:87-112.
Alt, H.G. et al., C1-verbrijckte Fluorenyliden-Indeylidenkornplexe des Typs . . . , Journal of Organometallic Chemistry, 1998, 562:153-181.
J. Am. Chem. Soc. 2005, 127:14756-14768.
Koppl, A., et al., Heterogeneous Metallocene Catalysts for Ethlene Polymerization, Journal of Molecular Catalysis A: Chemical, 2001, 165:23-32.
Arnett, et al., Zero-Shear Viscosity of Some Ethyl Branched Paraffinic Model Polymers, J. Phys. Chem., 1980, 84:649-652.
Janzen, et al., Diagnosing long-chain branching in polyethylenes, Journal of Molecular Structure, 1999, 485-486 569-584.

(Continued)

Primary Examiner — Roberto Rabago
(74) Attorney, Agent, or Firm — Merchant & Gould P.C.

(57) ABSTRACT

The present invention provides a polymerization process which is conducted by contacting an olefin monomer and at least one olefin comonomer in the presence of hydrogen and a metallocene-based catalyst composition. Polymers produced from the polymerization process are also provided, and these polymers have a reverse comonomer distribution, low levels of long chain branches, and a ratio of Mw/Mn from about 3 to about 6.

36 Claims, 13 Drawing Sheets

U.S. PATENT DOCUMENTS

| | | |
|---|---|---|
| 6,613,712 B1 | 9/2003 | McDaniel |
| 6,632,894 B1 | 10/2003 | McDaniel |
| 6,667,274 B1 | 12/2003 | Hawley |
| 6,750,302 B1 | 6/2004 | McDaniel |
| 6,787,608 B2 | 9/2004 | Van Dun |
| 6,833,415 B2 | 12/2004 | Kendrick |
| 7,064,096 B1 | 6/2006 | Hoang |
| 7,129,296 B2 | 10/2006 | Van Dun |
| 7,345,113 B2 | 3/2008 | Van Dun |
| 7,468,452 B1 | 12/2008 | Martin et al. |
| 0,082,531 A1 | 3/2009 | Chai |
| 7,517,939 B2 | 4/2009 | Yang et al. |
| 7,619,047 B2 | 11/2009 | Yang et al. |
| 0,041,842 A1 | 2/2010 | Yang et al. |
| 7,732,542 B2 | 6/2010 | Yang et al. |
| 0,317,904 A1 | 12/2010 | Small |
| 2004/0059070 A1 | 3/2004 | White |
| 2005/0288461 A1 | 12/2005 | Jensen et al. |
| 2006/0189769 A1 | 8/2006 | Hoang |
| 2007/0021567 A1 | 1/2007 | Van Dun |
| 2007/0179044 A1* | 8/2007 | Yang et al. .......... 502/103 |
| 2007/0197374 A1 | 8/2007 | Yang |
| 2009/0137755 A1* | 5/2009 | Yamada et al. ......... 526/112 |

FOREIGN PATENT DOCUMENTS

| | | |
|---|---|---|
| EP | 0 537 130 A1 | 4/1993 |
| EP | 661 299 A2 | 7/1995 |
| EP | 0 729 978 A1 | 9/1996 |
| EP | 0 881 236 A1 | 12/1998 |
| EP | 1 857 470 A1 | 11/2007 |
| WO | WO 97/44371 A1 | 11/1997 |
| WO | WO 98/02470 A2 | 1/1998 |
| WO | WO 00/14129 A1 | 3/2000 |
| WO | WO 02/14384 A2 | 2/2001 |
| WO | 03/016362 A1 | 2/2003 |
| WO | 2006/054048 A1 | 5/2006 |
| WO | 2006/120418 | 11/2006 |
| WO | WO 2006/120418 | 11/2006 |
| WO | WO 2007/077732 * | 7/2007 |
| WO | 2007/117520 | 10/2007 |

OTHER PUBLICATIONS

DesLauriers, et al., Quantifying short chain branching microstructures in ethylene . . . , Polymer 43, 2002, 159-170.

Search Report for International Application No. PCT/US2009/006564, mailed May 12, 2010.

U.S. Appl. No. 12/898,465 filed Oct. 5, 2010 entitled "Oligomerization of Olefin Waxes Using Metallocene-Based Catalyst Systems".

Hawley's Condensed Chemical Dictionary, 11th Ed., John Wiley & Sons, 1995, 3 pages.

Cotton et al., Advanced Inorganic Chemistry, 6th Ed., Wiley-Interscience, 1999, 4 pages.

Pinnavaia, "Intercalated Clay Catalysts," Science, 1983, 220(4595), pp. 365-371.

Thomas, "Sheet Silicate Intercalates: New Agents for Unusual Chemical Conversions*," Intercalation Chemistry (S. Whittington and A. Jacobson, eds.), Academic Press, Inc. Ch. 3, 1972, pp. 55-99.

Hieber, et al., "Some correlations involving the shear viscosity of polystyrene melts," Rheologica Acta, vol. 28, No. 4 (1989), pp. 321-32.

Hieber, et al., "Shear-Rate-Dependence Modeling of Polymer Melt Viscosity," Polymer Engineering and Science, Jul. 1992, vol. 32, No. 14, pp. 931-938.

Bird, et al., Dynamics of Polymeric Liquids, Vol. 1, $2^{nd}$ Edition, Fluid Mechanics, (1987), pp. 171-172.

* cited by examiner

MET 1

MET 2

MET 3

PROCESS FOR PRODUCING BROADER MOLECULAR WEIGHT DISTRIBUTION POLYMERS WITH A REVERSE COMONOMER DISTRIBUTION AND LOW LEVELS OF LONG CHAIN BRANCHES

BACKGROUND OF THE INVENTION

The present invention relates generally to the field of olefin polymerization catalysis, catalyst compositions, methods for the polymerization and copolymerization of olefins, and polyolefins.

Polyolefin homopolymers, copolymers, terpolymers, etc., can be produced using various combinations of catalyst systems and polymerization processes. One method that can be used to produce such polyolefins employs a metallocene-based catalyst system. Generally, metallocene catalysts produce polyolefins with a narrow molecular weight distribution. While a polymer having a narrow molecular weight distribution can be advantageous in certain polymer processing operations and end-use applications, it can be a drawback in others. For instance, narrow molecular weight distribution polymers may require the use of a fluoropolymer additive in order to process the polymer at desirable production rates without flow instabilities, such as melt fracture, in some polymer processing operations. The use of a fluoropolymer processing aid increases the cost of producing a finished article from the polymer. Stability in other polymer processing operations, such as blown film and blow molding, often is reduced with a narrow molecular weight distribution polymer, as compared to broader molecular weight distribution polymers, resulting in reduced output or production rates.

Metallocene-based catalyst systems generally produce polymers with a narrow molecular weight distribution. Other catalyst systems, such as chromium or Ziegler-type, can produce broader molecular weight distribution polymers. However, when either a chromium or a Ziegler-type catalyst system is employed, the use of hydrogen in olefin polymerizations causes a narrowing of the molecular weight distribution of the polymer.

Hence, it would be beneficial to produce, in the presence of hydrogen, a broader molecular weight distribution polymer using a metallocene-based catalyst system. Accordingly, it is to these ends that the present invention is directed.

SUMMARY OF THE INVENTION

The present invention generally relates to catalyst compositions, methods for preparing catalyst compositions, methods for using the catalyst compositions to polymerize olefins, the polymer resins produced using such catalyst compositions, and articles produced using these polymer resins. In accordance with one aspect of the present invention, an olefin polymerization process is disclosed which can be used to produce, for example, ethylene copolymers. This process comprises:

contacting a catalyst composition with an olefin monomer and at least one olefin comonomer under polymerization conditions to produce an olefin polymer; wherein:

the catalyst composition comprises a contact product of at least one metallocene compound and at least one activator;

the polymerization process is conducted in the presence of hydrogen; and the olefin polymer has a ratio of Mw/Mn from about 3 to about 6.

Optionally, organoaluminum compounds can be employed in this catalyst composition and polymerization process. The at least one metallocene compound is a bridged metallocene compound having both a cyclopentadienyl and a fluorenyl moiety, and is represented by the following formula:

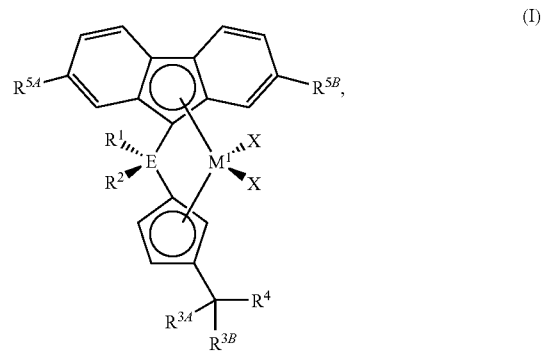

wherein:

$M^1$ is Ti, Zr, or Hf;

X is independently F; Cl; Br; I; methyl; phenyl; H; BH$_4$; OBR$^A{}_2$ or SO$_3$R$^A$, wherein R$^A$ is an alkyl or aryl group having up to 12 carbon atoms; or a hydrocarbyloxide group, a hydrocarbylamino group, or a hydrocarbylsilyl group, any of which can have up to 20 carbon atoms;

E is C or Si;

$R^1$ and $R^2$ are independently H or an alkyl or aryl group having up to 12 carbon atoms, wherein at least one of $R^1$ and $R^2$ is an aryl group;

$R^{3A}$ and $R^{3B}$ are independently H or a hydrocarbyl or hydrocarbylsilyl group having up to 20 carbon atoms;

$R^4$ is an alkyl or alkenyl group having up to 10 carbon atoms; and $R^{5A}$ and $R^{5B}$ are independently H or a hydrocarbyl group having up to 12 carbon atoms.

Olefin polymers can be produced using the catalyst compositions and methods for olefin polymerization disclosed herein. For instance, an ethylene polymer of the present invention can be characterized by the following polymer properties:

a melt index from about 0.1 to about 100 g/10 min;

a ratio of Mw/Mn from about 3 to about 6;

a reverse comonomer distribution;

less than about 0.05 long chain branches (LCB) per 1000 total carbon atoms; and less than about 5% by weight of the polymer eluted below a temperature of 40° C. in an ATREF test.

DEFINITIONS AND ABBREVIATIONS

Figure 1:
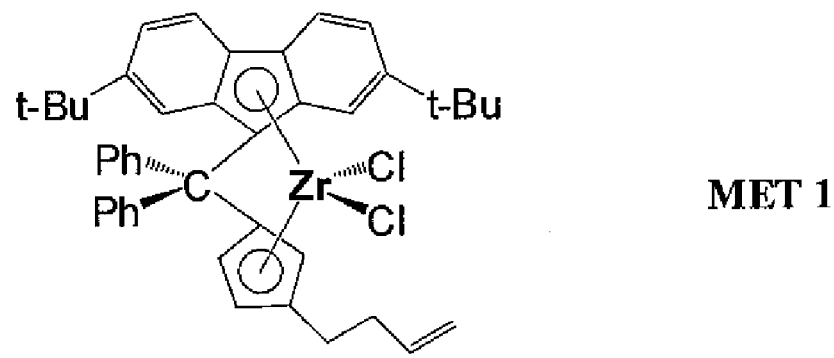
FIG. 1 illustrates the structures of metallocene compounds MET 1, MET 2, and MET 3, used in the Examples that follow.
Figure 1:
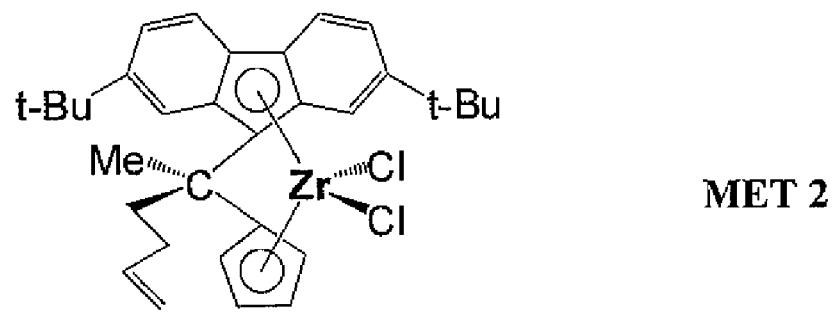
Figure 1:
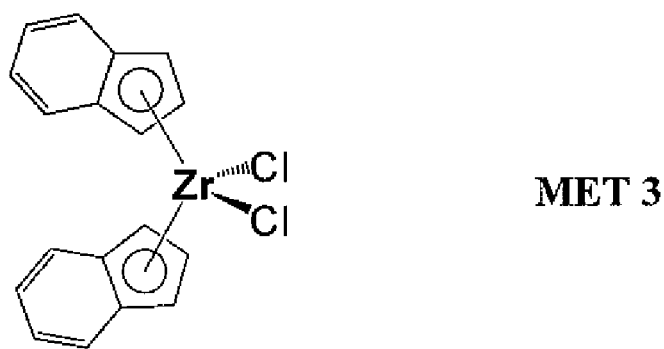

To define more clearly the terms used herein, the following definitions and abbreviations are provided. To the extent that any definition or usage provided by any document incorporated herein by reference conflicts with the definition or usage provided herein, the definition or usage provided herein controls.

ATREF—Analytical temperature rising elution fractionation.
D10—The molecular weight at which 10% of the polymer by weight has higher molecular weight.
D90—The molecular weight at which 90% of the polymer by weight has higher molecular weight.
HLMI—High load melt index.
LCB—Long chain branches.
M—Molecular weight.
Me—Methyl.
MI—Melt index.
Mn—Number-average molecular weight.
Mw—Weight-average molecular weight.
Mw/Mn—Ratio is a measure of the molecular weight distribution; also referred to as the polydispersity index.
$\eta_0$—Zero shear viscosity.
Ph—Phenyl.
SCB—Short chain branches.
SCBD—Short chain branch distribution, or short chain branching distribution.
t-Bu—Tert-butyl or t-butyl.
TC—Total carbons, or total carbon atoms.
TIBA—Triisobutylaluminum.
TNBA—Tri-n-butylaluminum.

The term "polymer" is used herein generically to include olefin homopolymers, copolymers, terpolymers, and so forth. Although the term polymer includes homopolymers, the present invention is principally directed to polymers derived from an olefin monomer and at least one olefin comonomer. Hence, a copolymer is derived from an olefin monomer and one olefin comonomer, while a terpolymer is derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer would be categorized an as ethylene/1-hexene copolymer.

In like manner, the scope of the term "polymerization" includes homopolymerization, copolymerization, terpolymerization, etc. Therefore, a copolymerization process would involve contacting one olefin monomer (e.g., ethylene) and one olefin comonomer (e.g., 1-hexene), to produce a copolymer.

Hydrogen in this disclosure can refer to either hydrogen ($H_2$) which is used in a polymerization process, or a hydrogen atom (H), which can be present on the bridged metallocene compound of formula (I). When used to denote a hydrogen atom, hydrogen will be displayed as "H," whereas if the intent is to disclose the use of hydrogen in a polymerization process, it will simply be referred to as "hydrogen."

The term "co-catalyst" is used generally herein to refer to organoaluminum compounds that can constitute one component of a catalyst composition. Additionally, "co-catalyst" can refer to other components of a catalyst composition including, but not limited to, aluminoxanes, organoboron or organoborate compounds, and ionizing ionic compounds, as disclosed herein. The term "co-catalyst" is used regardless of the actual function of the compound or any chemical mechanism by which the compound may operate. In one aspect of this invention, the term "co-catalyst" is used to distinguish that component of the catalyst composition from the metallocene component.

The term "fluoroorgano boron compound" is used herein with its ordinary meaning to refer to neutral compounds of the form $BY_3$. The term "fluoroorgano borate compound" also has its usual meaning to refer to the monoanionic salts of a fluoroorgano boron compound of the form $[cation]^+[BY_4]^-$, where Y represents a fluorinated organic group. Materials of these types are generally and collectively referred to as "organoboron or organoborate compounds."

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another.

The term "precontacted" mixture is used herein to describe a first mixture of catalyst components that are contacted for a first period of time prior to the first mixture being used to form a "postcontacted" or second mixture of catalyst components that are contacted for a second period of time. Often, the precontacted mixture describes a mixture of metallocene compound (or compounds), olefin monomer, and organoaluminum compound (or compounds), before this mixture is contacted with an activator(s) and/or activator-support(s) and optional additional organoaluminum compound(s). Thus, precontacted describes components that are used to contact each other, but prior to contacting the components in the second, postcontacted mixture. Accordingly, this invention may occasionally distinguish between a component used to prepare the precontacted mixture and that component after the mixture has been prepared. For example, according to this description, it is possible for the precontacted organoaluminum compound, once it is contacted with the metallocene and the olefin monomer, to have reacted to form at least one chemical compound, formulation, or structure different from the distinct organoaluminum compound used to prepare the precontacted mixture. In this case, the precontacted organoaluminum compound or component is described as comprising an organoaluminum compound that was used to prepare the precontacted mixture.

Alternatively, the precontacted mixture can describe a mixture of metallocene compound(s) and organoaluminum compound(s), prior to contacting of this mixture with the activator(s) and/or activator-support(s). This precontacted mixture also can describe a mixture of metallocene compound(s), olefin monomer, and activator(s) and/or activator-support(s), before this mixture is contacted with an organoaluminum co-catalyst compound or compounds.

Similarly, the term "postcontacted" mixture is used herein to describe a second mixture of catalyst components that are contacted for a second period of time, and one constituent of which is the "precontacted" or first mixture of catalyst components that were contacted for a first period of time. Typically, the term "postcontacted" mixture is used herein to describe the mixture of metallocene compound(s), olefin monomer, organoaluminum compound(s), and activator(s) and/or activator-support(s) formed from contacting the precontacted mixture of a portion of these components with any additional components added to make up the postcontacted mixture. Often, the activator and/or activator support is a chemically-treated solid oxide compound. For instance, the additional component added to make up the postcontacted mixture can be a chemically-treated solid oxide compound (or compounds), and optionally, can include an organoaluminum compound which is the same as or different from the organoaluminum compound used to prepare the precontacted mixture, as described herein. Accordingly, this invention may also occasionally distinguish between a component used to prepare the postcontacted mixture and that component after the mixture has been prepared.

The term "metallocene," as used herein, describes a compound comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands include hydrogen, therefore the description "substituted derivatives thereof" in this invention comprises partially saturated ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. For example, the compounds encompassed by formula (I) are bridged metallocene compounds having both a cyclopentadienyl and a fluorenyl moiety. In some contexts, the metallocene compound is referred to simply as the "catalyst," in much the same way the term "co-catalyst" is used herein to refer to, for example, an organoaluminum compound.

The terms "catalyst composition," "catalyst mixture," "catalyst system," and the like, do not depend upon the actual product resulting from the contact or reaction of the components of the mixtures, the nature of the active catalytic site, or the fate of the co-catalyst, the bridged metallocene compound, any olefin monomer used to prepare a precontacted mixture, or the activator or activator-support, after combining these components. Therefore, the terms "catalyst composition," "catalyst mixture," "catalyst system," and the like, can include both heterogeneous compositions and homogenous compositions.

The terms "chemically-treated solid oxide," "solid oxide activator-support," "treated solid oxide compound," and the like, are used herein to indicate a solid, inorganic oxide of relatively high porosity, which exhibits Lewis acidic or BrØnsted acidic behavior, and which has been treated with an electron-withdrawing component, typically an anion, and which is calcined. The electron-withdrawing component is typically an electron-withdrawing anion source compound. Thus, the chemically-treated solid oxide compound comprises a calcined contact product of at least one solid oxide compound with at least one electron-withdrawing anion source compound. Typically, the chemically-treated solid oxide comprises at least one ionizing, acidic solid oxide compound. The terms "support" and "activator-support" are not used to imply these components are inert, and such components should not be construed as an inert component of the catalyst composition. The activator-support of the present invention can be a chemically-treated solid oxide.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

For any particular compound disclosed herein, any structure presented also encompasses all conformational isomers, regioisomers, and stereoisomers that may arise from a particular set of substituents. The structure also encompasses all enantiomers, diastereomers, and other optical isomers whether in enantiomeric or racemic forms, as well as mixtures of stereoisomers, as would be recognized by a skilled artisan.

Applicants disclose several types of ranges in the present invention. These include, but are not limited to, a range of number of atoms, a range of weight ratios, a range of molar ratios, a range of temperatures, a range of molecular weights, a range of melt indices, a range of densities, and so forth. When Applicants disclose or claim a range of any type, Applicants' intent is to disclose or claim individually each possible number that such a range could reasonably encompass, including end points of the range as well as any sub-ranges and combinations of sub-ranges encompassed therein. For example, when the Applicants disclose or claim a chemical moiety having a certain number of carbon atoms, Applicants' intent is to disclose or claim individually every possible number that such a range could encompass, consistent with the disclosure herein. For example, the disclosure that a moiety is a hydrocarbyl group having from 1 to 20 carbon atoms, as used herein, refers to a moiety that can be selected independently from a hydrocarbyl group having 1, 2, 3, 4, 5, 6, 7, 8, 9, 10, 11, 12, 13, 14, 15, 16, 17, 18, 19, or 20 carbon atoms, as well as any range between these two numbers (for example, a hydrocarbyl group having 3 to 12 carbon atoms), and also including any combination of ranges between these two numbers (for example, a hydrocarbyl group having 1 to 4 carbon atoms and a hydrocarbyl group having 8 to 12 carbon atoms).

Similarly, another representative example follows for the Mw (weight-average molecular weight) of a polymer provided in one aspect of this invention. By a disclosure that the Mw of the polymer is in a range from about 20,000 to about 250,000 g/mol, Applicants intend to recite that the Mw can be selected from about 20,000, about 30,000, about 40,000, about 50,000, about 60,000, about 70,000, about 80,000, about 90,000, about 100,000, about 110,000, about 120,000, about 130,000, about 140,000, about 150,000, about 160,000, about 170,000, about 180,000, about 190,000, about 200,000, about 210,000, about 220,000, about 230,000, about 240,000, or about 250,000 g/mol. Additionally, the Mw can be within any range from about 20,000 to about 250,000 (for example, the Mw is in a range from about 70,000 to about 150,000), and this also includes any combination of ranges between about 20,000 and about 250,000 g/mol. Likewise, all other ranges disclosed herein should be interpreted in a manner similar to these two examples.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

While compositions and methods are described in terms of "comprising" various components or steps, the compositions and methods can also "consist essentially of" or "consist of" the various components or steps.

DETAILED DESCRIPTION OF THE INVENTION

The present invention is directed generally to catalyst compositions, methods for preparing the catalyst compositions, methods for using the catalyst compositions to polymerize olefins, the polymer resins produced using such catalyst compositions, and articles produced using these polymer resins. In one aspect, the present invention relates to an olefin polymerization process, said process comprising:

contacting a catalyst composition with an olefin monomer and at least one olefin comonomer under polymerization conditions to produce an olefin polymer; wherein:

the catalyst composition comprises a contact product of at least one metallocene compound and at least one activator;

the polymerization process is conducted in the presence of hydrogen; and the olefin polymer has a ratio of Mw/Mn from about 3 to about 6.

Olefins copolymers, terpolymers, and the like, can be produced using the catalyst compositions and methods for olefin polymerization disclosed herein. For instance, an ethylene polymer of the present invention can be characterized by the following polymer properties:

a melt index from about 0.1 to about 100 g/10 min;

a ratio of Mw/Mn from about 3 to about 6;

a reverse comonomer distribution;

less than about 0.05 LCB per 1000 total carbon atoms; and less than about 5% by weight of the polymer eluted below a temperature of 40° C. in an ATREF test.

Metallocene Compounds

The present invention employs a bridged metallocene compound having both a cyclopentadienyl and a fluorenyl moiety. In one aspect of this invention, such a bridged metallocene compound has the formula:

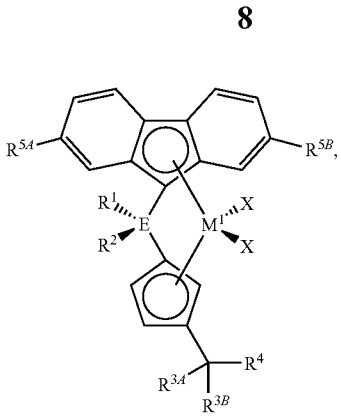

(I)

wherein:

$M^1$ is Ti, Zr, or Hf;

X is independently F; Cl; Br; I; methyl; phenyl; H; $BH_4$; $OBR^A{}_2$ or $SO_3R^A$, wherein $R^A$ is an alkyl or aryl group having up to 12 carbon atoms; or a hydrocarbyloxide group, a hydrocarbylamino group, or a hydrocarbylsilyl group, any of which can have up to 20 carbon atoms;

E is C or Si;

$R^1$ and $R^2$ are independently H or an alkyl or aryl group having up to 12 carbon atoms, wherein at least one of $R^1$ and $R^2$ is an aryl group;

$R^{3A}$ and $R^{3B}$ are independently H or a hydrocarbyl or hydrocarbylsilyl group having up to 20 carbon atoms;

$R^4$ is an alkyl or alkenyl group having up to 10 carbon atoms; and $R^{5A}$ and $R^{5B}$ are independently H or a hydrocarbyl group having up to 12 carbon atoms.

Formula (I) above is not designed to show stereochemistry or isomeric positioning of the different moieties (e.g., this formula is not intended to display cis or trans isomers, or R or S diastereoisomers), although such compounds are contemplated and encompassed by this formula.

The metal in formula (I), $M^1$, is either Ti, Zr, or Hf. Each X in formula (I) independently is F; Cl; Br; I; methyl; phenyl; H; $BH_4$; $OBR^A{}_2$ or $SO_3R^A$, wherein $R^A$ is an alkyl or aryl group having up to 12 carbon atoms; or a hydrocarbyloxide group, a hydrocarbylamino group, or a hydrocarbylsilyl group, any of which can have up to 20 carbon atoms. Unless otherwise specified, the disclosure of an alkyl group is intended to include all structural isomers, linear or branched, of a given moiety; for example, all enantiomers and all diastereomers are included within this definition. As an example, unless otherwise specified, the term propyl is meant to include n-propyl and iso-propyl, while the term butyl is meant to include n-butyl, iso-butyl, t-butyl, sec-butyl, and so forth. For instance, non-limiting examples of octyl isomers include 2-ethyl hexyl and neooctyl. Examples of suitable alkyl groups having up to 12 carbon atoms which can be employed as $R^A$ in $OBR^A{}_2$ or $SO_3R^A$ include, but are not limited to, methyl, ethyl, propyl, butyl, pentyl, hexyl, heptyl, octyl, nonyl, or decyl, and the like.

In the present invention, aryl groups having up to 12 carbon atom encompasses both aryl and arylalkyl groups, and these include, but are not limited to, phenyl, alkyl-substituted phenyl, naphthyl, alkyl-substituted naphthyl, phenyl-substituted alkyl, naphthyl-substituted alkyl, and the like. Hence, non-limiting examples of such aryl moieties which can be employed as $R^A$ in $OBR^A{}_2$ or $SO_3R^A$ include phenyl, benzyl, tolyl, dimethylphenyl, trimethylphenyl, phenylethyl, phenylpropyl, phenylbutyl, propyl-2-phenylethyl, and the like. Unless otherwise specified, any aryl group, such as an arylalkyl group, used herein is meant to include all regioisomers; for example, the term tolyl is meant to include any possible substituent position, that is, ortho, meta, or para.

The term "hydrocarbyl" is used herein to specify a hydrocarbon radical group and includes, but is not limited to, aryl, alkyl, cycloalkyl, alkenyl, cycloalkenyl, cycloalkadienyl, alkynyl, aralkyl, aralkenyl, aralkynyl, and the like, and includes all substituted, unsubstituted, branched, linear, or heteroatom substituted derivatives thereof. Unless otherwise specified, the hydrocarbyl groups of this invention typically comprise up to about 20 carbon atoms. In another aspect, hydrocarbyl groups can have up to 12 carbon atoms, for instance, up to 8 carbon atoms, or up to 6 carbon atoms. A hydrocarbyloxide group, therefore, is used generically to include both alkoxide and aryloxide groups, and these groups can comprise up to about 20 carbon atoms. Illustrative and non-limiting examples of alkoxide and aryloxide groups (i.e., hydrocarbyloxide groups) include methoxy, ethoxy, propoxy, butoxy, phenoxy, substituted phenoxy, and the like. Similarly, the term hydrocarbylamino group is used generically to refer collectively to alkylamino, arylamino, dialkylamino, and diarylamino groups. Unless otherwise specified, the hydrocarbylamino groups of this invention comprise up to about 20 carbon atoms. Hydrocarbylsilyl groups include, but are not limited to, alkylsilyl groups, arylsilyl groups, arylalkylsilyl groups, and the like, which have up 20 carbon atoms. For example, hydrocarbylsilyl groups can include trimethylsilyl and phenyloctylsilyl groups. These hydrocarbyloxide, hydrocarbylamino, and hydrocarbylsilyl groups can have up to 12 carbon atoms, or alternatively, up to 8 carbon atoms, in other aspects of the present invention.

According to one aspect of the present invention, each X in formula (I) is independently selected from F, Cl, Br, I, methyl, phenyl, H, $BH_4$, methoxy, ethoxy, propoxy, phenoxy, and trimethylsilyl. In another aspect, at least one X is Cl, methyl, phenyl, or H. Yet, in another aspect, each X independently is Cl or methyl.

The bridging atom, E, in formula (I) is C or Si, while $R^1$ and $R^2$ are independently H or an alkyl or aryl group having up to 12 carbon atoms. However, at least one of $R^1$ and $R^2$ is an aryl group. Independently, $R^1$ and $R^2$ can be any of the alkyl or aryl groups having up to 12 carbon atoms discussed above. For instance, $R^1$ and $R^2$ can be selected independently from H, methyl, ethyl, propyl, butyl, phenyl, benzyl, and tolyl. According to one aspect of the present invention, $R^1$ and $R^2$ are an aryl group having up to 12 carbon atoms. Alternatively, $R^1$ and $R^2$ can be methyl or phenyl, wherein at least one of $R^1$ and $R^2$ is phenyl.

In formula (I), $R^{3A}$ and $R^{3B}$ are independently H or a hydrocarbyl or hydrocarbylsilyl group having up to 20 carbon atoms. $R^{3A}$ and $R^{3B}$ can be any of the hydrocarbyl or hydrocarbylsilyl groups having up to 20 carbon atoms discussed above. $R^{3A}$ and $R^{3B}$ independently can be, for example, H, methyl, ethyl, propyl, butyl, pentyl, hexyl, allyl, benzyl, phenyl, or trimethylsilyl, and the like. In another aspect, $R^{3A}$ and $R^{3B}$ independently are H or methyl. $R^4$ in formula (I) is an alkyl or alkenyl group having up to 10 carbon atoms. Suitable alkyl and alkenyl selections for $R^4$ include, but are not limited to, methyl, ethyl, propyl, butyl, pentyl, hexyl, ethenyl, propenyl, butenyl, pentenyl, hexenyl, and the like. The $C_2$-$C_{10}$ alkenyl group is not limited to the regiochemistry of the alkene functionality, and can be linear or branched, as discussed above relative to alkyl groups. In some aspects, the olefinic bond is distal from the cyclopentadienyl ligand and, therefore, can be described as a pendant alkenyl group. For example, in one aspect of this invention, $R^4$ is a linear alkenyl group having up to 6 carbon atoms. In another aspect, $R^4$ is ethenyl, propenyl, butenyl, pentenyl, or hexenyl. Accordingly, $R^4$ can be an alkenyl group such as allyl, buten-3-yl, penten-4-yl, hexen-5-yl, 3-methylbuten-3-yl, 4-methylpenten-4-yl, and the like.

$R^{5A}$ and $R^{5B}$ in formula (I) are independently H or a hydrocarbyl group having up to 12 carbon atoms. $R^{5A}$ and $R^{5B}$ can be any of the hydrocarbyl groups having up to 12 carbon atoms discussed above. $R^{5A}$ and $R^{5B}$ independently can be, for example, H, methyl, ethyl, propyl, butyl, pentyl, hexyl, allyl, benzyl, or phenyl, and the like. In another aspect, $R^{5A}$ and $R^{5B}$ independently are H or t-butyl. Yet, in another aspect, both $R^{5A}$ and $R^{5B}$ are t-butyl.

According to one aspect of the present invention, $M^1$ is Zr or Hf in formula (I); each X is independently Cl, methyl, or phenyl; E is C; $R^1$ and $R^2$ are independently methyl, ethyl, phenyl, or benzyl, wherein at least one of $R^1$ and $R^2$ is phenyl; $R^{3A}$ and $R^{3B}$ are independently H, methyl, ethyl, or trimethylsilyl; $R^4$ is ethenyl, propenyl, butenyl, or pentenyl; and $R^{5A}$ and $R^{5B}$ are independently H, methyl, ethyl, propyl, or t-butyl.

Illustrative and non-limiting examples of bridged metallocene compounds of the present invention include, but are not limited to, the following compounds:

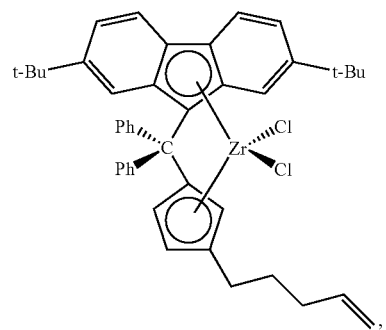

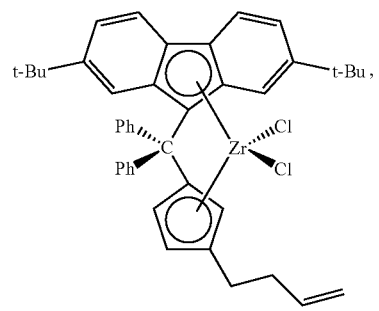

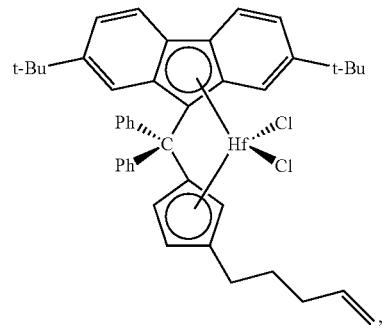

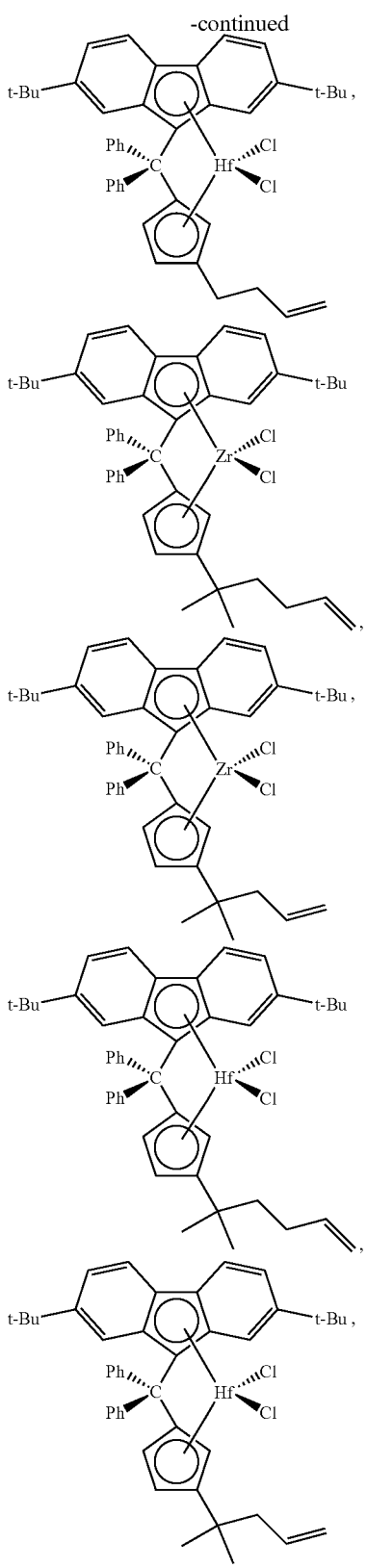

and the like.

FIG. 1 illustrates the structures of the metallocene compounds employed in the Examples that follow. Metallocene "MET 1" in FIG. 1, is representative of the bridged metallocene compounds of the present invention. Metallocene "MET 2" is a comparative bridged metallocene compound. Metallocene "MET 3" is a comparative unbridged metallocene compound.

Numerous processes to prepare bridged metallocene compounds that can be employed in this invention have been reported. For example, U.S. Pat. Nos. 5,191,132, 5,210,352, 5,399,636, 5,401,817, 5,420,320, 5,436,305, 5,451,649, 5,498,581, 5,571,880, 5,631,203, 5,631,335, 5,654,454, 5,705,579, 6,187,880, and 6,509,427 describe such methods. Other processes to prepare metallocene compounds that can be employed in the present invention can be found in references such as: Köppl, A. Alt, H. G. *J. Mol. Catal A.* 2001, 165, 23; Kajigaeshi, S.; Kadowaki, T.; Nishida, A.; Fujisaki, S. *Bulletin of the Chemical Society of Japan*, 1986, 59, 97; Alt, H. G.; Jung, M.; Kehr, G. *J. Organomet. Chem.* 1998, 562, 153-181; Alt, H. G.; Jung, M. *J. Organomet. Chem.* 1998, 568, 87-112; Jung, M., Doctoral Dissertation, University of Bayreuth, Bayreuth, Germany, 1997; Piefer, B., Doctoral Dissertation, University of Bayreuth, Bayreuth, Germany, 1995; and Zenk, R., Doctoral Dissertation, University of Bayreuth, Bayreuth, Germany, 1994. The following treatises also describe such methods: Wailes, P. C.; Coutts, R. S. P.; Weigold, H. in Organometallic Chemistry of Titanium, Zirconium, and Hafnium, Academic; New York, 1974.; Cardin, D. J.; Lappert, M. F.; and Raston, C. L.; Chemistry of Organo-Zirconium and—Hafnium Compounds; Halstead Press; New York, 1986. Methods of producing metallocene compounds which can be employed in some aspects of this invention are disclosed in U.S. Patent Publication No. 2007/0179044 and U.S. patent application Ser. No. 12/001,733, now U.S. Pat. No. 7,468,452, the disclosures of which are incorporated herein by reference in their entirety.

Activator-Support

The present invention encompasses various catalyst compositions containing an activator, which can be an activator-support. In one aspect, the activator-support comprises a chemically-treated solid oxide. Alternatively, the activator-support can comprise a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, or any combination thereof. Generally, the activator-support contains Brønsted or Lewis acid groups.

The chemically-treated solid oxide exhibits enhanced acidity as compared to the corresponding untreated solid oxide compound. The chemically-treated solid oxide also functions as a catalyst activator as compared to the corresponding untreated solid oxide. While the chemically-treated solid oxide activates the metallocene in the absence of co-catalysts, it is not necessary to eliminate co-catalysts from the catalyst composition. The activation function of the activator-support is evident in the enhanced activity of catalyst composition as a whole, as compared to a catalyst composition containing the corresponding untreated solid oxide. However, it is believed that the chemically-treated solid oxide can function as an activator, even in the absence of an organoaluminum compound, aluminoxanes, organoboron compounds, ionizing ionic compounds, and the like.

The chemically-treated solid oxide can comprise at least one solid oxide treated with at least one electron-withdrawing anion. While not intending to be bound by the following statement, it is believed that treatment of the solid oxide with an electron-withdrawing component augments or enhances the acidity of the oxide. Thus, either the activator-support exhibits Lewis or Brønsted acidity that is typically greater than the Lewis or Brønsted acid strength of the untreated solid oxide, or the activator-support has a greater number of acid sites than the untreated solid oxide, or both. One method to quantify the acidity of the chemically-treated and untreated solid oxide materials is by comparing the polymerization activities of the treated and untreated oxides under acid catalyzed reactions.

Chemically-treated solid oxides of this invention are formed generally from an inorganic solid oxide that exhibits Lewis acidic or Brønsted acidic behavior and has a relatively high porosity. The solid oxide is chemically-treated with an electron-withdrawing component, typically an electron-withdrawing anion, to form an activator-support.

According to one aspect of the present invention, the solid oxide used to prepare the chemically-treated solid oxide has a pore volume greater than about 0.1 cc/g. According to another aspect of the present invention, the solid oxide has a pore volume greater than about 0.5 cc/g. According to yet another aspect of the present invention, the solid oxide has a pore volume greater than about 1.0 cc/g.

In another aspect, the solid oxide has a surface area of from about 100 to about 1000 m$^2$/g. In yet another aspect, the solid oxide has a surface area of from about 200 to about 800 m$^2$/g. In still another aspect of the present invention, the solid oxide has a surface area of from about 250 to about 600 m$^2$/g.

The chemically-treated solid oxide can comprise a solid inorganic oxide comprising oxygen and at least one element selected from Group 2, 3, 4, 5, 6, 7, 8, 9, 10, 11, 12, 13, 14, or 15 of the periodic table, or comprising oxygen and at least one element selected from the lanthanide or actinide elements (See: Hawley's Condensed Chemical Dictionary, 11$^{th}$ Ed., John Wiley & Sons, 1995; Cotton, F. A., Wilkinson, G., Murillo; C. A., and Bochmann, M., Advanced Inorganic Chemistry, 6$^{th}$ Ed., Wiley-Interscience, 1999). For example, the inorganic oxide can comprise oxygen and at least one element selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr.

Suitable examples of solid oxide materials or compounds that can be used to form the chemically-treated solid oxide include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof. For example, the solid oxide can be silica, alumina, silica-alumina, aluminum phosphate, heteropolytungstate, titania, zirconia, magnesia, boria, zinc oxide, mixed oxides thereof, or any combination thereof.

The solid oxide of this invention encompasses oxide materials such as alumina, "mixed oxide" compounds thereof such as silica-alumina, and combinations and mixtures thereof. The mixed oxide compounds such as silica-alumina can be single or multiple chemical phases with more than one metal combined with oxygen to form a solid oxide compound. Examples of mixed oxides that can be used in the activator-support of the present invention include, but are not limited to, silica-alumina, silica-titania, silica-zirconia, zeolites, various clay minerals, alumina-titania, alumina-zirconia, zinc-aluminate, and the like.

The electron-withdrawing component used to treat the solid oxide can be any component that increases the Lewis or Brønsted acidity of the solid oxide upon treatment (as compared to the solid oxide that is not treated with at least one electron-withdrawing anion). According to one aspect of the present invention, the electron-withdrawing component is an electron-withdrawing anion derived from a salt, an acid, or other compound, such as a volatile organic compound, that serves as a source or precursor for that anion. Examples of electron-withdrawing anions include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, and the like, including mixtures and combinations thereof. In addition, other ionic or non-ionic compounds that serve as sources for these electron-withdrawing anions also can be employed in the present invention. It is contemplated that the electron-withdrawing anion is fluoride, chloride, bromide, phosphate, triflate, bisulfate, or sulfate, and the like, or any combination thereof, in one aspect of this invention.

Thus, for example, the chemically-treated solid oxide used in the catalyst compositions of the present invention can be fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-clad alumina, and the like, or combinations thereof.

When the electron-withdrawing component comprises a salt of an electron-withdrawing anion, the counterion or cation of that salt can be selected from any cation that allows the salt to revert or decompose back to the acid during calcining. Factors that dictate the suitability of the particular salt to serve as a source for the electron-withdrawing anion include, but are not limited to, the solubility of the salt in the desired solvent, the lack of adverse reactivity of the cation, ion-pairing effects between the cation and anion, hygroscopic properties imparted to the salt by the cation, and the like, and thermal stability of the anion. Examples of suitable cations in the salt of the electron-withdrawing anion include, but are not limited to, ammonium, trialkyl ammonium, tetraalkyl ammonium, tetraalkyl phosphonium, $H^+$, $[H(OEt_2)_2]^+$, and the like.

Further, combinations of one or more different electron-withdrawing anions, in varying proportions, can be used to tailor the specific acidity of the activator-support to the desired level. Combinations of electron-withdrawing components can be contacted with the oxide material simultaneously or individually, and in any order that affords the desired chemically-treated solid oxide acidity. For example, one aspect of this invention is employing two or more electron-withdrawing anion source compounds in two or more separate contacting steps.

Thus, one example of such a process by which a chemically-treated solid oxide is prepared is as follows: a selected solid oxide compound, or combination of oxide compounds, is contacted with a first electron-withdrawing anion source compound to form a first mixture; this first mixture is calcined and then contacted with a second electron-withdrawing anion source compound to form a second mixture; the second mixture is then calcined to form a treated solid oxide compound. In such a process, the first and second electron-withdrawing anion source compounds can be either the same or different compounds.

According to another aspect of the present invention, the chemically-treated solid oxide comprises a solid inorganic oxide material, a mixed oxide material, or a combination of inorganic oxide materials, that is chemically-treated with an electron-withdrawing component, and optionally treated with a metal source, including metal salts, metal ions, or other metal-containing compounds. Non-limiting examples of the metal or metal ion include zinc, nickel, vanadium, titanium, silver, copper, gallium, tin, tungsten, molybdenum, zirconium, and the like, or combinations thereof. Examples of chemically-treated solid oxides that contain a metal or metal ion include, but are not limited to, zinc-impregnated chlorided alumina, titanium-impregnated fluorided alumina, zinc-impregnated fluorided alumina, zinc-impregnated chlorided silica-alumina, zinc-impregnated fluorided silica-alumina, zinc-impregnated sulfated alumina, chlorided zinc aluminate, fluorided zinc aluminate, sulfated zinc aluminate, silica-clad alumina treated with hexafluorotitanic acid, silica-clad alumina treated with zinc and then fluorided, and the like, or any combination thereof.

Any method of impregnating the solid oxide material with a metal can be used. The method by which the oxide is contacted with a metal source, typically a salt or metal-containing compound, can include, but is not limited to, gelling, co-gelling, impregnation of one compound onto another, and the like. If desired, the metal-containing compound is added to or impregnated into the solid oxide in solution form, and subsequently converted into the supported metal upon calcining. Accordingly, the solid inorganic oxide can further comprise a metal selected from zinc, titanium, nickel, vanadium, silver, copper, gallium, tin, tungsten, molybdenum, and the like, or combinations of these metals. For example, zinc is often used to impregnate the solid oxide because it can provide improved catalyst activity at a low cost.

The solid oxide can be treated with metal salts or metal-containing compounds before, after, or at the same time that the solid oxide is treated with the electron-withdrawing anion. Following any contacting method, the contacted mixture of oxide compound, electron-withdrawing anion, and the metal ion is typically calcined. Alternatively, a solid oxide material, an electron-withdrawing anion source, and the metal salt or metal-containing compound are contacted and calcined simultaneously.

Various processes are used to form the chemically-treated solid oxide useful in the present invention. The chemically-treated solid oxide can comprise the contact product of at least one solid oxide compound and at least one electron-withdrawing anion source. It is not required that the solid oxide compound be calcined prior to contacting the electron-withdrawing anion source. The contact product typically is calcined either during or after the solid oxide compound is contacted with the electron-withdrawing anion source. The solid oxide compound can be calcined or uncalcined. Various processes to prepare solid oxide activator-supports that can be employed in this invention have been reported. For example, such methods are described in U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, and 6,750,302, the disclosures of which are incorporated herein by reference in their entirety.

According to one aspect of the present invention, the solid oxide material is chemically-treated by contacting it with at least one electron-withdrawing component, typically an electron-withdrawing anion source. Further, the solid oxide material optionally is chemically treated with a metal ion, and then calcined to form a metal-containing or metal-impregnated chemically-treated solid oxide. According to another aspect of the present invention, the solid oxide material and electron-withdrawing anion source are contacted and calcined simultaneously.

The method by which the oxide is contacted with the electron-withdrawing component, typically a salt or an acid of an electron-withdrawing anion, can include, but is not limited to, gelling, co-gelling, impregnation of one compound onto another, and the like. Thus, following any contacting method, the contacted mixture of the solid oxide, electron-withdrawing anion, and optional metal ion, is calcined.

The solid oxide activator-support (i.e., chemically-treated solid oxide) thus can be produced by a process comprising:

1) contacting a solid oxide compound with at least one electron-withdrawing anion source compound to form a first mixture; and 2) calcining the first mixture to form the solid oxide activator-support.

According to another aspect of the present invention, the solid oxide activator-support (chemically-treated solid oxide) is produced by a process comprising:

1) contacting at least one solid oxide compound with a first electron-withdrawing anion source compound to form a first mixture;

2) calcining the first mixture to produce a calcined first mixture;

3) contacting the calcined first mixture with a second electron-withdrawing anion source compound to form a second mixture; and 4) calcining the second mixture to form the solid oxide activator-support.

According to yet another aspect of the present invention, the chemically-treated solid oxide is produced or formed by contacting the solid oxide with the electron-withdrawing anion source compound, where the solid oxide compound is calcined before, during, or after contacting the electron-withdrawing anion source, and where there is a substantial absence of aluminoxanes, organoboron or organoborate compounds, and ionizing ionic compounds.

Calcining of the treated solid oxide generally is conducted in an ambient atmosphere, typically in a dry ambient atmosphere, at a temperature from about 200° C. to about 900° C., and for a time of about 1 minute to about 100 hours. Calcining can be conducted at a temperature of from about 300° C. to about 800° C., or alternatively, at a temperature of from about 400° C. to about 700° C. Calcining can be conducted for about 1 hour to about 50 hours, or for about 3 hours to about 20 hours. Thus, for example, calcining can be carried out for about 1 to about 10 hours at a temperature of from about 350° C. to about 550° C. Any suitable ambient atmosphere can be employed during calcining. Generally, calcining is conducted in an oxidizing atmosphere, such as air. Alternatively, an inert atmosphere, such as nitrogen or argon, or a reducing atmosphere, such as hydrogen or carbon monoxide, can be used.

According to one aspect of the present invention, the solid oxide material is treated with a source of halide ion, sulfate ion, or a combination of anions, optionally treated with a metal ion, and then calcined to provide the chemically-treated solid oxide in the form of a particulate solid. For example, the solid oxide material is treated with a source of sulfate (termed a "sulfating agent"), a source of chloride ion (termed a "chloriding agent"), a source of fluoride ion (termed a "fluoriding agent"), or a combination thereof, and calcined to provide the solid oxide activator. Useful acidic activator-supports include, but are not limited to, bromided alumina, chlorided alumina, fluorided alumina, sulfated alumina, bromided silica-alumina, chlorided silica-alumina, fluorided silica-alumina, sulfated silica-alumina, bromided silica-zirconia, chlorided silica-zirconia, fluorided silica-zirconia, sulfated silica-zirconia, fluorided silica-titania, alumina treated with hexafluorotitanic acid, silica-clad alumina treated with hexafluorotitanic acid, silica-alumina treated with hexafluorozirconic acid, fluorided boria-alumina, silica treated with tetrafluoroboric acid, alumina treated with tetrafluoroboric acid, alumina treated with hexafluorophosphoric acid, a pillared clay, such as a pillared montmorillonite, optionally treated with fluoride, chloride, or sulfate; phosphated alumina or other aluminophosphates optionally treated with sulfate, fluoride, or chloride; or any combination of the above. Further, any of these activator-supports optionally can be treated with a metal ion.

The chemically-treated solid oxide can comprise a fluorided solid oxide in the form of a particulate solid. The fluorided solid oxide can be formed by contacting a solid oxide with a fluoriding agent. The fluoride ion can be added to the oxide by forming a slurry of the oxide in a suitable solvent such as alcohol or water including, but not limited to, the one to three carbon alcohols because of their volatility and low surface tension. Examples of suitable fluoriding agents include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4)_2SiF_6$), ammonium hexafluorophosphate ($NH_4PF_6$), hexafluorotitanic acid ($H_2TiF_6$), ammonium hexafluorotitanic acid (($NH_4)_2TiF_6$), hexafluorozirconic acid ($H_2ZrF_6$), analogs thereof, and combinations thereof. For example, ammonium bifluoride $NH_4HF_2$ can be used as the fluoriding agent, due to its ease of use and availability.

If desired, the solid oxide is treated with a fluoriding agent during the calcining step. Any fluoriding agent capable of thoroughly contacting the solid oxide during the calcining step can be used. For example, in addition to those fluoriding agents described previously, volatile organic fluoriding agents can be used. Examples of volatile organic fluoriding agents useful in this aspect of the invention include, but are not limited to, freons, perfluorohexane, perfluorobenzene, fluoromethane, trifluoroethanol, an the like, and combinations thereof. Gaseous hydrogen fluoride or fluorine itself also can be used with the solid oxide if fluorided while calcining. One convenient method of contacting the solid oxide with the fluoriding agent is to vaporize a fluoriding agent into a gas stream used to fluidize the solid oxide during calcination.

Similarly, in another aspect of this invention, the chemically-treated solid oxide comprises a chlorided solid oxide in the form of a particulate solid. The chlorided solid oxide is formed by contacting a solid oxide with a chloriding agent. The chloride ion can be added to the oxide by forming a slurry of the oxide in a suitable solvent. The solid oxide can be treated with a chloriding agent during the calcining step. Any chloriding agent capable of serving as a source of chloride and thoroughly contacting the oxide during the calcining step can be used. For example, volatile organic chloriding agents can be used. Examples of suitable volatile organic chloriding agents include, but are not limited to, certain freons, perchlorobenzene, chloromethane, dichloromethane, chloroform, carbon tetrachloride, trichloroethanol, and the like, or any combination thereof. Gaseous hydrogen chloride or chlorine itself also can be used with the solid oxide during calcining. One convenient method of contacting the oxide with the chloriding agent is to vaporize a chloriding agent into a gas stream used to fluidize the solid oxide during calcination.

The amount of fluoride or chloride ion present before calcining the solid oxide generally is from about 2 to about 50% by weight, where the weight percent is based on the weight of the solid oxide, for example, silica-alumina, before calcining. According to another aspect of this invention, the amount of fluoride or chloride ion present before calcining the solid oxide is from about 3 to about 25% by weight, and according to another aspect of this invention, from about 4 to about 20% by weight. Once impregnated with halide, the halided oxide can be dried by any suitable method including, but not limited to, suction filtration followed by evaporation, drying under vacuum, spray drying, and the like, although it is also possible to initiate the calcining step immediately without drying the impregnated solid oxide.

The silica-alumina used to prepare the treated silica-alumina typically has a pore volume greater than about 0.5 cc/g. According to one aspect of the present invention, the pore volume is greater than about 0.8 cc/g, and according to another aspect of the present invention, greater than about 1.0 cc/g. Further, the silica-alumina generally has a surface area greater than about 100 $m^2$/g. According to another aspect of this invention, the surface area is greater than about 250 $m^2$/g. Yet, in another aspect, the surface area is greater than about 350 $m^2$/g.

The silica-alumina utilized in the present invention typically has an alumina content from about 5 to about 95% by weight. According to one aspect of this invention, the alumina content of the silica-alumina is from about 5 to about 50%, or from about 8% to about 30%, alumina by weight. In another aspect, high alumina content silica-alumina compounds can employed, in which the alumina content of these silica-alumina compounds typically ranges from about 60% to about 90%, or from about 65% to about 80%, alumina by weight. According to yet another aspect of this invention, the solid oxide component comprises alumina without silica, and according to another aspect of this invention, the solid oxide component comprises silica without alumina.

The sulfated solid oxide comprises sulfate and a solid oxide component, such as alumina or silica-alumina, in the form of a particulate solid. Optionally, the sulfated oxide is treated further with a metal ion such that the calcined sulfated oxide comprises a metal. According to one aspect of the present invention, the sulfated solid oxide comprises sulfate and alumina. In some instances, the sulfated alumina is formed by a process wherein the alumina is treated with a sulfate source, for example, sulfuric acid or a sulfate salt such as ammonium sulfate. This process is generally performed by forming a slurry of the alumina in a suitable solvent, such as alcohol or water, in which the desired concentration of the sulfating agent has been added. Suitable organic solvents include, but are not limited to, the one to three carbon alcohols because of their volatility and low surface tension.

According to one aspect of this invention, the amount of sulfate ion present before calcining is from about 0.5 to about 100 parts by weight sulfate ion to about 100 parts by weight solid oxide. According to another aspect of this invention, the amount of sulfate ion present before calcining is from about 1 to about 50 parts by weight sulfate ion to about 100 parts by weight solid oxide, and according to still another aspect of this invention, from about 5 to about 30 parts by weight sulfate ion to about 100 parts by weight solid oxide. These weight ratios are based on the weight of the solid oxide before calcining. Once impregnated with sulfate, the sulfated oxide can be dried by any suitable method including, but not limited to, suction filtration followed by evaporation, drying under vacuum, spray drying, and the like, although it is also possible to initiate the calcining step immediately.

According to another aspect of the present invention, the activator-support used in preparing the catalyst compositions of this invention comprises an ion-exchangeable activator-support, including but not limited to silicate and aluminosilicate compounds or minerals, either with layered or non-layered structures, and combinations thereof. In another aspect of this invention, ion-exchangeable, layered aluminosilicates such as pillared clays are used as activator-supports. When the acidic activator-support comprises an ion-exchangeable activator-support, it can optionally be treated with at least one electron-withdrawing anion such as those disclosed herein, though typically the ion-exchangeable activator-support is not treated with an electron-withdrawing anion.

According to another aspect of the present invention, the activator-support of this invention comprises clay minerals having exchangeable cations and layers capable of expanding. Typical clay mineral activator-supports include, but are not limited to, ion-exchangeable, layered aluminosilicates such as pillared clays. Although the term "support" is used, it is not meant to be construed as an inert component of the catalyst composition, but rather is to be considered an active part of the catalyst composition, because of its intimate association with the metallocene component.

According to another aspect of the present invention, the clay materials of this invention encompass materials either in their natural state or that have been treated with various ions by wetting, ion exchange, or pillaring. Typically, the clay material activator-support of this invention comprises clays that have been ion exchanged with large cations, including polynuclear, highly charged metal complex cations. However, the clay material activator-supports of this invention also encompass clays that have been ion exchanged with simple salts, including, but not limited to, salts of Al(III), Fe(II), Fe(III), and Zn(II) with ligands such as halide, acetate, sulfate, nitrate, or nitrite.

According to another aspect of the present invention, the activator-support comprises a pillared clay. The term "pillared clay" is used to refer to clay materials that have been ion exchanged with large, typically polynuclear, highly charged metal complex cations. Examples of such ions include, but are not limited to, Keggin ions which can have charges such as 7+, various polyoxometallates, and other large ions. Thus, the term pillaring refers to a simple exchange reaction in which the exchangeable cations of a clay material are replaced with large, highly charged ions, such as Keggin ions. These polymeric cations are then immobilized within the interlayers of the clay and when calcined are converted to metal oxide "pillars," effectively supporting the clay layers as column-like structures. Thus, once the clay is dried and calcined to produce the supporting pillars between clay layers, the expanded lattice structure is maintained and the porosity is enhanced. The resulting pores can vary in shape and size as a function of the pillaring material and the parent clay material used. Examples of pillaring and pillared clays are found in: T. J. Pinnavaia, *Science* 220 (4595), 365-371 (1983); J. M. Thomas, Intercalation Chemistry, (S. Whittington and A. Jacobson, eds.) Ch. 3, pp. 55-99, Academic Press, Inc., (1972); U.S. Pat. No. 4,452,910; U.S. Pat. No. 5,376,611; and U.S. Pat. No. 4,060,480; the disclosures of which are incorporated herein by reference in their entirety.

The pillaring process utilizes clay minerals having exchangeable cations and layers capable of expanding. Any pillared clay that can enhance the polymerization of olefins in the catalyst composition of the present invention can be used. Therefore, suitable clay minerals for pillaring include, but are not limited to, allophanes; smectites, both dioctahedral (Al) and tri-octahedral (Mg) and derivatives thereof such as montmorillonites (bentonites), nontronites, hectorites, or laponites; halloysites; vermiculites; micas; fluoromicas; chlorites; mixed-layer clays; the fibrous clays including but not limited to sepiolites, attapulgites, and palygorskites; a serpentine clay; illite; laponite; saponite; and any combination thereof. In one aspect, the pillared clay activator-support comprises bentonite or montmorillonite. The principal component of bentonite is montmorillonite.

The pillared clay can be pretreated if desired. For example, a pillared bentonite is pretreated by drying at about 300° C. under an inert atmosphere, typically dry nitrogen, for about 3 hours, before being added to the polymerization reactor. Although an exemplary pretreatment is described herein, it should be understood that the preheating can be carried out at many other temperatures and times, including any combination of temperature and time steps, all of which are encompassed by this invention.

The activator-support used to prepare the catalyst compositions of the present invention can be combined with other inorganic support materials, including, but not limited to, zeolites, inorganic oxides, phosphated inorganic oxides, and the like. In one aspect, typical support materials that are used include, but are not limited to, silica, silica-alumina, alumina, titania, zirconia, magnesia, boria, thoria, aluminophosphate, aluminum phosphate, silica-titania, coprecipitated silica/titania, mixtures thereof, or any combination thereof.

According to another aspect of the present invention, one or more of the metallocene compounds can be precontacted with an olefin monomer and an organoaluminum compound for a first period of time prior to contacting this mixture with the activator-support. Once the precontacted mixture of the metallocene compound(s), olefin monomer, and organoaluminum compound is contacted with the activator-support, the composition further comprising the activator-support is termed a "postcontacted" mixture. The postcontacted mixture can be allowed to remain in further contact for a second period of time prior to being charged into the reactor in which the polymerization process will be carried out.

According to yet another aspect of the present invention, one or more of the metallocene compounds can be precontacted with an olefin monomer and an activator-support for a first period of time prior to contacting this mixture with the organoaluminum compound. Once the precontacted mixture of the metallocene compound(s), olefin monomer, and activator-support is contacted with the organoaluminum compound, the composition further comprising the organoaluminum is termed a "postcontacted" mixture. The postcontacted mixture can be allowed to remain in further contact for a second period of time prior to being introduced into the polymerization reactor.

Organoaluminum Compounds

In one aspect, catalyst compositions of the present invention can comprise organoaluminum compounds. Such compounds include, but are not limited to, compounds having the formula:

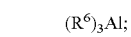

$(R^6)_3Al;$ where $R^6$ is an aliphatic group having from 2 to 10 carbon atoms. For example, $R^6$ can be ethyl, propyl, butyl, hexyl, or isobutyl.

Other organoaluminum compounds which can be used in catalyst compositions disclosed herein can include, but are not limited to, compounds having the formula:

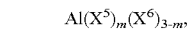

$Al(X^5)_m(X^6)_{3-m},$ where $X^5$ is a hydrocarbyl; $X^6$ is an alkoxide or an aryloxide, a halide, or a hydride; and m is from 1 to 3, inclusive.

In one aspect, $X^5$ is a hydrocarbyl having from 1 to about 20 carbon atoms. In another aspect of the present invention, $X^5$ is an alkyl having from 1 to 10 carbon atoms. For example, $X^5$ can be ethyl, propyl, n-butyl, sec-butyl, isobutyl, or hexyl, and the like, in yet another aspect of the present invention.

According to one aspect of the present invention, $X^6$ is an alkoxide or an aryloxide, any one of which has from 1 to 20 carbon atoms, a halide, or a hydride. In another aspect of the present invention, $X^6$ is selected independently from fluorine or chlorine. Yet, in another aspect, $X^6$ is chlorine.

In the formula, $Al(X^5)_m(X^6)_{3-m}$, m is a number from 1 to 3, inclusive, and typically, m is 3. The value of m is not restricted to be an integer; therefore, this formula includes sesquihalide compounds or other organoaluminum cluster compounds.

Examples of organoaluminum compounds suitable for use in accordance with the present invention include, but are not limited to, trialkylaluminum compounds, dialkylaluminum halide compounds, dialkylaluminum alkoxide compounds, dialkylaluminum hydride compounds, and combinations thereof. Specific non-limiting examples of suitable organoaluminum compounds include trimethylaluminum (TMA), triethylaluminum (TEA), tri-n-propylaluminum (TNPA), tri-n-butylaluminum (TNBA), triisobutylaluminum (TIBA), tri-n-hexylaluminum, tri-n-octylaluminum, diisobutylaluminum hydride, diethylaluminum ethoxide, diethylaluminum chloride, and the like, or combinations thereof.

The present invention contemplates a method of precontacting at least one bridged metallocene compound with at least one organoaluminum compound and an olefin monomer to form a precontacted mixture, prior to contacting this precontacted mixture with an activator-support to form a catalyst composition. When the catalyst composition is prepared in this manner, typically, though not necessarily, a portion of the organoaluminum compound is added to the precontacted mixture and another portion of the organoaluminum compound is added to the postcontacted mixture prepared when the precontacted mixture is contacted with the solid oxide activator-support. However, the entire organoaluminum compound can be used to prepare the catalyst composition in either the precontacting or postcontacting step. Alternatively, all the catalyst components are contacted in a single step.

Further, more than one organoaluminum compound can be used in either the precontacting or the postcontacting step. When an organoaluminum compound is added in multiple steps, the amounts of organoaluminum compound disclosed herein include the total amount of organoaluminum compound used in both the precontacted and postcontacted mixtures, and any additional organoaluminum compound added to the polymerization reactor. Therefore, total amounts of organoaluminum compounds are disclosed regardless of whether a single organoaluminum compound or more than one organoaluminum compound is used.

Aluminoxane Compounds

The present invention employs a catalyst composition which contains an activator, and in some aspects of the invention, the activator comprises at least one aluminoxane compound, at least one organoboron or organoborate compound, or at least one ionizing ionic compound, or any combination thereof. As used herein, the term "aluminoxane" refers to aluminoxane compounds, compositions, mixtures, or discrete species, regardless of how such aluminoxanes are prepared, formed or otherwise provided. For example, a catalyst composition comprising an aluminoxane compound can be prepared in which aluminoxane is provided as the poly(hydrocarbyl aluminum oxide), or in which aluminoxane is provided as the combination of an aluminum alkyl compound and a source of active protons such as water. Aluminoxanes are also referred to as poly(hydrocarbyl aluminum oxides) or organoaluminoxanes.

The other catalyst components typically are contacted with the aluminoxane in a saturated hydrocarbon compound solvent, though any solvent that is substantially inert to the reactants, intermediates, and products of the activation step can be used. The catalyst composition formed in this manner is collected by any suitable method, for example, by filtration. Alternatively, the catalyst composition is introduced into the polymerization reactor without being isolated.

The aluminoxane compound of this invention can be an oligomeric aluminum compound comprising linear structures, cyclic structures, or cage structures, or mixtures of all three. Cyclic aluminoxane compounds having the formula:

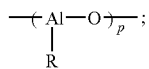

wherein R is a linear or branched alkyl having from 1 to 10 carbon atoms, and p is an integer from 3 to 20, are encompassed by this invention. The AlRO moiety shown here also constitutes the repeating unit in a linear aluminoxane. Thus, linear aluminoxanes having the formula:

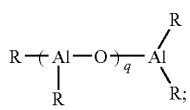

wherein R is a linear or branched alkyl having from 1 to 10 carbon atoms, and q is an integer from 1 to 50, are also encompassed by this invention.

Further, aluminoxanes can have cage structures of the formula $R^t_{5r+a}R^b_{r-a}Al_{4r}O_{3r}$, wherein $R^t$ is a terminal linear or branched alkyl group having from 1 to 10 carbon atoms; $R^b$ is a bridging linear or branched alkyl group having from 1 to 10 carbon atoms; r is 3 or 4; and α is equal to $n_{Al(3)}-n_{O(2)}+n_{O(4)}$, wherein $n_{Al(3)}$ is the number of three coordinate aluminum atoms, $n_{O(2)}$ is the number of two coordinate oxygen atoms, and $n_{O(4)}$ is the number of 4 coordinate oxygen atoms.

Thus, aluminoxanes which can be employed in the catalyst compositions of the present invention are represented generally by formulas such as $(R-Al-O)_p$, $R(R-Al-O)_qAlR_2$, and the like. In these formulas, the R group is typically a linear or branched $C_1$-$C_6$ alkyl, such as methyl, ethyl, propyl, butyl, pentyl, or hexyl. Examples of aluminoxane compounds that can be used in accordance with the present invention include, but are not limited to, methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentylaluminoxane, 2-pentylaluminoxane, 3-pentylaluminoxane, isopentylaluminoxane, neopentylaluminoxane, and the like, or any combination thereof. Methylaluminoxane, ethylaluminoxane, and iso-butylaluminoxane are prepared from trimethylaluminum, triethylaluminum, or triisobutylaluminum, respectively, and sometimes are referred to as poly(methyl aluminum oxide), poly(ethyl aluminum oxide), and poly(isobutyl aluminum oxide), respectively. It is also within the scope of the invention to use an aluminoxane in combination with a trialkylaluminum, such as that disclosed in U.S. Pat. No. 4,794,096, incorporated herein by reference in its entirety.

The present invention contemplates many values of p and q in the aluminoxane formulas $(R-Al-O)_p$ and $R(R-Al-O)_qAlR_2$, respectively. In some aspects, p and q are at least 3. However, depending upon how the organoaluminoxane is prepared, stored, and used, the value of p and q can vary within a single sample of aluminoxane, and such combinations of organoaluminoxanes are contemplated herein.

In preparing a catalyst composition containing an aluminoxane, the molar ratio of the total moles of aluminum in the aluminoxane (or aluminoxanes) to the total moles of metallocene compound (or compounds) in the composition is generally between about 1:10 and about 100,000:1. In another aspect, the molar ratio is in a range from about 5:1 to about 15,000:1. Optionally, aluminoxane can be added to a polymerization zone in ranges from about 0.01 mg/L to about 1000 mg/L, from about 0.1 mg/L to about 100 mg/L, or from about 1 mg/L to about 50 mg/L.

Organoaluminoxanes can be prepared by various procedures. Examples of organoaluminoxane preparations are disclosed in U.S. Pat. Nos. 3,242,099 and 4,808,561, the disclosures of which are incorporated herein by reference in their entirety. For example, water in an inert organic solvent can be reacted with an aluminum alkyl compound, such as $(R^6)_3Al$, to form the desired organoaluminoxane compound. While not intending to be bound by this statement, it is believed that this synthetic method can afford a mixture of both linear and cyclic R—Al—O aluminoxane species, both of which are encompassed by this invention. Alternatively, organoaluminoxanes can be prepared by reacting an aluminum alkyl compound, such as $(R^6)_3Al$ with a hydrated salt, such as hydrated copper sulfate, in an inert organic solvent.

Organoboron/Organoborate Compounds

According to another aspect of the present invention, the catalyst composition can comprise an organoboron or organoborate activator. Organoboron or organoborate compounds include neutral boron compounds, borate salts, and the like, or combinations thereof. For example, fluoroorgano boron compounds and fluoroorgano borate compounds are contemplated.

Any fluoroorgano boron or fluoroorgano borate compound can be utilized with the present invention. Examples of fluoroorgano borate compounds that can be used in the present invention include, but are not limited to, fluorinated aryl borates such as N,N-dimethylanilinium tetrakis(pentafluorophenyl)borate, triphenylcarbenium tetrakis(pentafluorop-benyl)borate, lithium tetrakis(pentafluorophenyl)borate, N,N-dimethylanilinium tetrakis[3,5-bis(trifluoromethyl) phenyl]borate, triphenylcarbenium tetrakis[3,5-bis(trifluoromethyl)phenyl]borate, and the like, or mixtures thereof. Examples of fluoroorgano boron compounds that can be used in the present invention include, but are not limited to, tris (pentafluorophenyl)boron, tris[3,5-bis(trifluoromethyl)phenyl]boron, and the like, or mixtures thereof. Although not intending to be bound by the following theory, these examples of fluoroorgano borate and fluoroorgano boron compounds, and related compounds, are thought to form "weakly-coordinating" anions when combined with organometal or metallocene compounds, as disclosed in U.S. Pat. No. 5,919,983, the disclosure of which is incorporated herein by reference in its entirety. Applicants also contemplate the use of diboron, or bis-boron, compounds or other bifunctional compounds containing two or more boron atoms in the chemical structure, such as disclosed in J. Am. Chem. Soc., 2005, 127, pp. 14756-14768, the content of which is incorporated herein by reference in its entirety.

Generally, any amount of organoboron compound can be used. According to one aspect of this invention, the molar ratio of the total moles of organoboron or organoborate compound (or compounds) to the total moles of metallocene compound (or compounds) in the catalyst composition is in a range from about 0.1:1 to about 15:1. Typically, the amount of the fluoroorgano boron or fluoroorgano borate compound used is from about 0.5 moles to about 10 moles of boron/borate compound per mole of metallocene compound. According to another aspect of this invention, the amount of fluoroorgano boron or fluoroorgano borate compound is from about 0.8 moles to about 5 moles of boron/borate compound per mole of metallocene compound.

Ionizing Ionic Compounds

The present invention further provides a catalyst composition which can comprise an ionizing ionic compound. An ionizing ionic compound is an ionic compound that can function as an activator or co-catalyst to enhance the activity of the catalyst composition. While not intending to be bound by theory, it is believed that the ionizing ionic compound is capable of reacting with a metallocene compound and converting the metallocene into one or more cationic metallocene compounds, or incipient cationic metallocene compounds. Again, while not intending to be bound by theory, it is believed that the ionizing ionic compound can function as an ionizing compound by completely or partially extracting an anionic ligand, possibly a non-alkadienyl ligand such as X, from the metallocene. However, the ionizing ionic compound is an activator regardless of whether it ionizes the metallocene, abstracts an X ligand in a fashion as to form an ion pair, weakens the metal-X bond in the metallocene, simply coordinates to an X ligand, or activates the metallocene compound by some other mechanism.

Further, it is not necessary that the ionizing ionic compound activate the metallocene compound only. The activation function of the ionizing ionic compound can be evident in the enhanced activity of catalyst composition as a whole, as compared to a catalyst composition that does not contain an ionizing ionic compound.

Examples of ionizing ionic compounds include, but are not limited to, the following compounds: tri(n-butyl)ammonium tetrakis(p-tolyl)borate, tri(n-butyl) ammonium tetrakis(m-tolyl)borate, tri(n-butyl)ammonium tetrakis(2,4-dimethylphenyl)borate, tri(n-butyl)ammonium tetrakis(3,5-dimethylphenyl)borate, tri(n-butyl)ammonium tetrakis[3,5-bis (trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethyl-phenyl)borate, N,N-dimethylanilinium tetrakis[3,5-bis (trifluoromethyl)phenyl]borate, N,N-dimethylanilinium tetrakis(pentafluorophenyl)borate, triphenylcarbenium tetrakis(p-tolyl)borate, triphenylcarbenium tetrakis(m-tolyl) borate, triphenylcarbenium tetrakis(2,4-dimethylphenyl)borate, triphenylcarbenium tetrakis(3,5-dimethylphenyl) borate, triphenylcarbenium tetrakis[3,5-bis(trifluoro-methyl) phenyl]borate, triphenylcarbenium tetrakis (pentafluorophenyl)borate, tropylium tetrakis(p-tolyl)borate, tropylium tetrakis(m-tolyl)borate, tropylium tetrakis(2,4-dimethylphenyl)borate, tropylium tetrakis(3,5-dimethylphenyl)borate, tropylium tetrakis[3,5-bis(trifluoromethyl)phenyl]borate, tropylium tetrakis(pentafluorophenyl)borate, lithium tetrakis(pentafluorophenyl)borate, lithium tetraphenylborate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, lithium tetrafluoroborate, sodium tetrakis(pentafluorophenyl)borate, sodium tetraphenylborate, sodium tetrakis(p-tolyl)borate, sodium tetrakis(m-tolyl)borate, sodium tetrakis(2,4-dimethylphenyl)borate, sodium tetrakis(3,5-dimethylphenyl)borate, sodium tetrafluoroborate, potassium tetrakis(pentafluorophenyl)borate, potassium tetraphenylborate, potassium tetrakis(p-tolyl)borate, potassium tetrakis(m-tolyl)borate, potassium tetrakis(2,4-dimethylphenyl)borate, potassium tetrakis(3,5-dimethylphenyl)borate, potassium tetrafluoroborate, lithium tetrakis-(pentafluorophenyl)aluminate, lithium tetraphenylaluminate, lithium tetrakis(p-tolyl)aluminate, lithium tetrakis(m-tolyl)aluminate, lithium tetrakis(2,4-dimethylphenyl)aluminate, lithium tetrakis(3,5-dimethylphenyl)aluminate, lithium tetrafluoroaluminate, sodium tetrakis(pentafluorophenyl)aluminate, sodium tetraphenylaluminate, sodium tetrakis(p-tolyl)aluminate, sodium tetrakis (m-tolyl)aluminate, sodium tetrakis(2,4-dimethylphenyl) aluminate, sodium tetrakis(3,5-dimethylphenyl)aluminate, sodium tetrafluoroaluminate, potassium tetrakis(pentafluorophenyl)aluminate, potassium tetraphenylaluminate, potassium tetrakis(p-tolyl)aluminate, potassium tetrakis(m-tolyl) aluminate, potassium tetrakis(2,4-dimethylphenyl) aluminate, potassium tetrakis(3,5-dimethylphenyl) aluminate, potassium tetrafluoroaluminate, and the like, or combinations thereof. Ionizing ionic compounds useful in this invention are not limited to these; other examples of ionizing ionic compounds are disclosed in U.S. Pat. Nos. 5,576,259 and 5,807,938, the disclosures of which are incorporated herein by reference in their entirety.

Olefin Monomers

Unsaturated reactants that can be employed with catalyst compositions and polymerization processes of this invention typically include olefin compounds having from about 2 to 30 carbon atoms per molecule and having at least one olefinic double bond. This invention encompasses copolymerization and higher reactions (e.g., terpolymerization) using an olefin monomer such as ethylene or propylene, with at least one different olefinic compound. For example, the resultant ethylene copolymers, terpolymers, etc., generally contain a major amount of ethylene (>50 mole percent) and a minor amount of comonomer (<50 mole percent), though this is not a requirement. Comonomers that can be copolymerized with ethylene often have from 3 to 20 carbon atoms in their molecular chain.

Acyclic, cyclic, polycyclic, terminal (α), internal, linear, branched, substituted, unsubstituted, functionalized, and non-functionalized olefins can be employed in this invention. For example, typical unsaturated compounds that can be polymerized with the catalyst compositions of this invention include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes, the four normal nonenes, the five normal decenes, and the like, or mixtures of two or more of these compounds. Cyclic and bicyclic olefins, including but not limited to, cyclopentene, cyclohexene, norbornylene, norbornadiene, and the like, can also be polymerized as described above. Styrene can also be employed as a monomer in the present invention.

When a copolymer (or alternatively, a terpolymer) is desired, the olefin monomer can comprise, for example, ethylene or propylene, which is copolymerized with at least one comonomer. According to one aspect of this invention, the olefin monomer in the polymerization process is ethylene. In this aspect, examples of suitable olefin comonomers include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to one aspect of the present invention, the at least one comonomer is selected from 1-butene, 1-pentene, 1-hexene, 1-octene, 1-decene, or styrene, or any combination thereof.

Generally, the amount of comonomer introduced into a reactor zone to produce the copolymer is from about 0.01 to about 50 weight percent of the comonomer based on the total weight of the monomer and comonomer. According to another aspect of the present invention, the amount of comonomer introduced into a reactor zone is from about 0.01 to about 40 weight percent comonomer based on the total weight of the monomer and comonomer. In still another aspect, the amount of comonomer introduced into a reactor zone is from about 0.1 to about 35 weight percent comonomer based on the total weight of the monomer and comonomer. Yet, in another aspect, the amount of comonomer introduced into a reactor zone is from about 0.5 to about 20 weight percent comonomer based on the total weight of the monomer and comonomer.

While not intending to be bound by this theory, where branched, substituted, or functionalized olefins are used as reactants, it is believed that a steric hindrance can impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might. In addition, the catalyst compositions and processes of this invention can be used in the polymerization of diolefin compounds including, but not limited to, 1,3-butadiene, isoprene, 1,4-pentadiene, and 1,5-hexadiene.

Catalyst Compositions

The present invention employs catalyst compositions containing a bridged metallocene compound. One such catalyst composition comprises a contact product of at least one metallocene compound and at least one activator. This catalyst composition can further comprise at least one organoaluminum compound. Suitable activators can include, but are not limited to, an activator-support, an aluminoxane compound, an organoboron or organoborate compound, an ionizing ionic compound, and the like, or a combination thereof.

These catalyst compositions can be used to produce polyolefins, such as ethylene copolymers, for a variety of end-use applications. The at least one metallocene compound in these catalyst compositions has the formula:

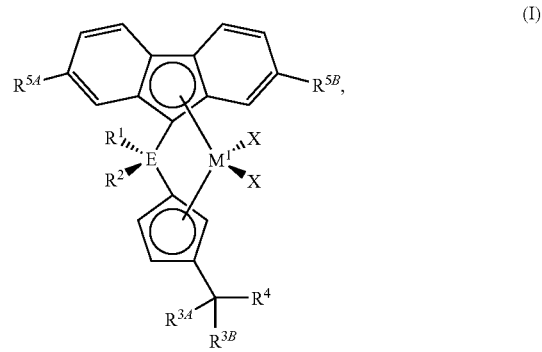

(I)

wherein:

$M^1$ is Ti, Zr, or Hf;

X is independently F; Cl; Br; I; methyl; phenyl; H; BH$_4$; OBR$^A_2$ or SO$_3$R$^A$, wherein R$^A$ is an alkyl or aryl group having up to 12 carbon atoms; or a hydrocarbyloxide group, a hydrocarbylamino group, or a hydrocarbylsilyl group, any of which can have up to 20 carbon atoms;

E is C or Si;

$R^1$ and $R^2$ are independently H or an alkyl or aryl group having up to 12 carbon atoms, wherein at least one of $R^1$ and $R^2$ is an aryl group;

$R^{3A}$ and $R^{3B}$ are independently H or a hydrocarbyl or hydrocarbylsilyl group having up to 20 carbon atoms;

R[4] is an alkyl or alkenyl group having up to 10 carbon atoms; and

R[5A] and R[5B] are independently H or a hydrocarbyl group having up to 12 carbon atoms.

In accordance with these and other aspects of the present invention, it is contemplated that the catalyst compositions disclosed herein can contain additional bridged or unbridged metallocene compounds, as well as more than one activator. Additionally, more than one organoaluminum compound is also contemplated.

A catalyst composition in another aspect of the present invention comprises a contact product of at least one metallocene compound having formula (I), at least one activator-support, and at least one organoaluminum compound, wherein this catalyst composition is substantially free of aluminoxanes, organoboron or organoborate compounds, and ionizing ionic compounds. In this aspect, the catalyst composition has catalyst activity, to be discussed below, in the absence of these additional materials.

However, in other aspects of this invention, these compounds can be employed as activators. For example, a catalyst composition comprising at least one metallocene compound and at least one activator is contemplated, and in this aspect, the activator is an aluminoxane compound, an organoboron or organoborate compound, an ionizing ionic compound, or any combination thereof. More than one activator or co-catalyst can be present in the catalyst composition.

A catalyst composition in yet another aspect of the present invention comprises a contact product of one metallocene compound having formula (I) and at least one activator. That is, the catalyst composition comprises only one metallocene compound, and said one metallocene compound has formula (I), in this aspect of the invention. Optionally, this catalyst composition can further comprise at least one organoaluminum compound. For example, a catalyst composition useful in the present invention can consist essentially of one metallocene compound having formula (I), one activator-support (e.g., a chemically-treated solid oxide), and one organoaluminum compound (e.g., TIBA), wherein no other materials are present in the catalyst composition which would increase/decrease the activity of the catalyst composition more than about 10% from the catalyst activity of the catalyst composition in the absence of said materials.

This invention further encompasses methods of making catalyst compositions disclosed herein, such as, for example, contacting the respective catalyst components in any order or sequence.

In one aspect of the invention, the at least one metallocene compound can be precontacted with an olefinic monomer if desired, not necessarily the olefin monomer or comonomer to be copolymerized, and an organoaluminum compound for a first period of time prior to contacting this precontacted mixture with an activator-support. The first period of time for contact, the precontact time, between the metallocene compound or compounds, the olefinic monomer, and the organoaluminum compound typically ranges from a time period of about 0.05 hours to about 24 hours, for example, from about 0.05 hours to about 1 hour. Precontact times from about 10 minutes to about 30 minutes are also employed.

In another aspect of the invention, the at least one metallocene compound can be precontacted with an olefinic monomer and an activator-support for a first period of time prior to contacting this precontacted mixture with an organoaluminum compound. The first period of time for contact, the precontact time, between the metallocene compound or compounds, the olefinic monomer, and the activator-support typically ranges from a time period of about 0.05 hours to about 24 hours, for example, from about 0.05 hours to about 2 hours. Precontact times from about 10 minutes to about 60 minutes are also employed.

Alternatively, the precontacting process is carried out in multiple steps, rather than a single step, in which multiple mixtures are prepared, each comprising a different set of catalyst components. For example, at least two catalyst components are contacted forming a first mixture, followed by contacting the first mixture with at least one other catalyst component forming a second mixture, and so forth.

Multiple precontacting steps can be carried out in a single vessel or in multiple vessels. Further, multiple precontacting steps can be carried out in series (or sequentially), in parallel, or a combination thereof. For example, a first mixture of two catalyst components can be formed in a first vessel, a second mixture comprising the first mixture plus one additional catalyst component can be formed in the first vessel or in a second vessel, which is typically placed downstream of the first vessel.

In another aspect, one or more of the catalyst components can be split and used in different precontacting treatments. For example, part of a catalyst component is fed into a first precontacting vessel for precontacting with at least one other catalyst component, while the remainder of that same catalyst component is fed into a second precontacting vessel for precontacting with at least one other catalyst component, or is fed directly into the reactor, or a combination thereof. The precontacting can be carried out in any suitable equipment, such as tanks, stirred mix tanks, various static mixing devices, a flask, a vessel of any type, or combinations of these apparatus.

In another aspect of this invention, the various catalyst components (for example, bridged metallocene, activator-support, organoaluminum co-catalyst, and optionally an unsaturated hydrocarbon) are contacted in the polymerization reactor simultaneously while the polymerization reaction is proceeding. Alternatively, any two or more of these catalyst components can be precontacted in a vessel prior to entering the reaction zone. This precontacting step can be continuous, in which the precontacted product is fed continuously to the reactor, or it can be a stepwise or batchwise process in which a batch of precontacted product is added to make a catalyst composition. This precontacting step can be carried out over a time period that can range from a few seconds to as much as several days, or longer. In this aspect, the continuous precontacting step generally lasts from about 1 second to about 1 hour. In another aspect, the continuous precontacting step lasts from about 10 seconds to about 45 minutes, or from about 1 minute to about 30 minutes.

Once the precontacted mixture of the metallocene compound, olefin monomer, and organoaluminum co-catalyst is contacted with the activator-support, this composition (with the addition of the activator-support) is termed a "postcontacted mixture." The postcontacted mixture optionally remains in contact for a second period of time, the postcontact time, prior to initiating the polymerization process. Postcontact times between the precontacted mixture and the activator-support generally range from about 0.05 hours to about 24 hours. In a further aspect, the postcontact time is in a range from about 0.05 hours to about 1 hour. The precontacting step, the postcontacting step, or both, can increase the productivity of the polymer as compared to the same catalyst composition that is prepared without precontacting or postcontacting. However, neither a precontacting step nor a postcontacting step is required.

The postcontacted mixture can be heated at a temperature and for a time period sufficient to allow adsorption, impregnation, or interaction of precontacted mixture and the activator-support, such that a portion of the components of the precontacted mixture is immobilized, adsorbed, or deposited thereon. Where heating is employed, the postcontacted mixture generally is heated to a temperature of from between about 0° F. to about 150° F., or from about 40° F. to about 95° F.

According to one aspect of this invention, the molar ratio of the moles of metallocene compound to the moles of organoaluminum compound in a catalyst composition generally is in a range from about 1:1 to about 1:10,000. In another aspect, the molar ratio is in a range from about 1:1 to about 1:1,000. Yet, in another aspect, the molar ratio of the moles of metallocene compound to the moles of organoaluminum compound is in a range from about 1:1 to about 1:100. These molar ratios reflect the ratio of total moles of metallocene compound or compounds to the total amount of organoaluminum compound (or compounds) in both the precontacted mixture and the postcontacted mixture combined, if precontacting and/or postcontacting steps are employed.

When a precontacting step is used, the molar ratio of the total moles of olefin monomer to total moles of metallocene compound in the precontacted mixture is typically in a range from about 1:10 to about 100,000:1. Total moles of each component are used in this ratio to account for aspects of this invention where more than one olefin monomer and/or more than metallocene compound is employed. Further, this molar ratio can be in a range from about 10:1 to about 1,000:1 in another aspect of the invention.

Generally, the weight ratio of organoaluminum compound to activator-support is in a range from about 10:1 to about 1:1000. If more than one organoaluminum compound and/or more than one activator-support is employed, this ratio is based on the total weight of each respective component. In another aspect, the weight ratio of the organoaluminum compound to the activator-support is in a range from about 3:1 to about 1:100, or from about 1:1 to about 1:50.

In some aspects of this invention, the weight ratio of metallocene to activator-support is in a range from about 1:1 to about 1:1,000,000. If more than one metallocene and/or more than one activator-support is employed, this ratio is based on the total weight of each respective component. In another aspect, this weight ratio is in a range from about 1:5 to about 1:100,000, or from about 1:10 to about 1:10,000. Yet, in another aspect, the weight ratio of the metallocene compound to the activator-support is in a range from about 1:20 to about 1:1000.

According to some aspects of this invention, aluminoxane compounds are not required to form the catalyst composition. Thus, the polymerization can proceed in the absence of aluminoxanes. Accordingly, the present invention can use, for example, organoaluminum compounds and an activator-support in the absence of aluminoxanes. While not intending to be bound by theory, it is believed that the organoaluminum compound likely does not activate the metallocene catalyst in the same manner as an organoaluminoxane compound.

Additionally, in some aspects, organoboron and organoborate compounds are not required to form a catalyst composition of this invention. Nonetheless, aluminoxanes, organoboron or organoborate compounds, ionizing ionic compounds, or combinations thereof, can be used in other catalyst compositions contemplated by and encompassed within the present invention. Hence, aluminoxanes, organoboron or organoborate compounds, ionizing ionic compounds, or combinations thereof, can be employed with the metallocene compound, for example, either in the presence or in the absence of an organoaluminum compound.

Catalyst compositions of the present invention generally have a catalyst activity greater than about 100 grams of polyethylene (homopolymer, copolymer, etc., as the context requires) per gram of activator-support per hour (abbreviated gPE/(gAS·hr)). In another aspect, the catalyst activity is greater than about 150, greater than about 200, or greater than about 250 gPE/(gAS·hr). In still another aspect, catalyst compositions of this invention are characterized by having a catalyst activity greater than about 500, greater than about 1000, or greater than about 1500 gPE/(gAS·hr). Yet, in another aspect, the catalyst activity is greater than about 2000 gPE/(gAS·hr). This activity is measured under slurry polymerization conditions using isobutane as the diluent, at a polymerization temperature of about 90° C. and a reactor pressure of about 450 psig.

As discussed above, any combination of the metallocene compound, the activator-support, the organoaluminum compound, and the olefin monomer, can be precontacted in some aspects of this invention. When any precontacting occurs with an olefinic monomer, it is not necessary that the olefin monomer used in the precontacting step be the same as the olefin to be copolymerized. Further, when a precontacting step among any combination of the catalyst components is employed for a first period of time, this precontacted mixture can be used in a subsequent postcontacting step between any other combination of catalyst components for a second period of time. For example, a metallocene compound, an organoaluminum compound, and 1-hexene can be used in a precontacting step for a first period of time, and this precontacted mixture then can be contacted with an activator-support to form a postcontacted mixture that is contacted for a second period of time prior to initiating the polymerization reaction. For example, the first period of time for contact, the precontact time, between any combination of the metallocene compound, the olefinic monomer, the activator-support, and the organoaluminum compound can be from about 0.05 hours to about 24 hours, from about 0.05 hours to about 1 hour, or from about 10 minutes to about 30 minutes. The postcontacted mixture optionally is allowed to remain in contact for a second period of time, the postcontact time, prior to initiating the polymerization process. According to one aspect of this invention, postcontact times between the precontacted mixture and any remaining catalyst components is from about 0.05 hours to about 24 hours, or from about 0.1 hour to about 1 hour.

Polymerization Process

Catalyst compositions of the present invention can be used to polymerize olefins to form copolymers, terpolymers, and the like. One such process for polymerizing olefins in the presence of a catalyst composition comprises contacting the catalyst composition with an olefin monomer and at least one olefin comonomer under polymerization conditions to produce an olefin polymer, wherein the catalyst composition comprises a contact product of at least one metallocene compound and at least one activator. This polymerization process is conducted in the presence of hydrogen, and results in an olefin polymer with a ratio of Mw/Mn ranging from about 3 to about 6. The at least one metallocene compound employed in the catalyst composition has the formula:

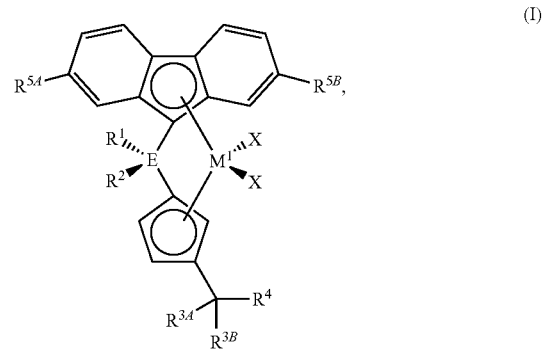

(I)

wherein:

$M^1$ is Ti, Zr, or Hf;

X is independently F; Cl; Br; I; methyl; phenyl; H; $BH_4$; $OBR^A{}_2$ or $SO_3R^A$, wherein $R^A$ is an alkyl or aryl group having up to 12 carbon atoms; or a hydrocarbyloxide group, a hydrocarbylamino group, or a hydrocarbylsilyl group, any of which can have up to 20 carbon atoms;

E is C or Si;

$R^1$ and $R^2$ are independently H or an alkyl or aryl group having up to 12 carbon atoms, wherein at least one of $R^1$ and $R^2$ is an aryl group;

$R^{3A}$ and $R^{3B}$ are independently H or a hydrocarbyl or hydrocarbylsilyl group having up to 20 carbon atoms;

$R^4$ is an alkyl or alkenyl group having up to 10 carbon atoms; and $R^{5A}$ and $R^{5B}$ are independently H or a hydrocarbyl group having up to 12 carbon atoms; and Olefin polymerization processes disclosed herein can be conducted using various types of polymerization reactors. As used herein, "polymerization reactor" includes any polymerization reactor capable of polymerizing olefin monomers and comonomers (one or more than one comonomer) to produce copolymers, terpolymers, and the like. The various types of reactors include those that may be referred to as batch, slurry, gas phase, solution, high pressure, tubular, or autoclave reactors. Gas phase reactors may comprise fluidized bed reactors or staged horizontal reactors. Slurry reactors may comprise vertical or horizontal loops. High pressure reactors may comprise autoclave or tubular reactors. Reactor types can include batch or continuous processes. Continuous processes could use intermittent or continuous product discharge. Processes may also include partial or full direct recycle of unreacted monomer, unreacted comonomer, and/or diluent.

Polymerization reactor systems of the present invention may comprise one type of reactor in a system or multiple reactors of the same or different type. Production of polymers in multiple reactors may include several stages in at least two separate polymerization reactors interconnected by a transfer device making it possible to transfer the polymers resulting from the first polymerization reactor into the second reactor. The desired polymerization conditions in one of the reactors may be different from the operating conditions of the other reactors. Alternatively, polymerization in multiple reactors may include the manual transfer of polymer from one reactor to subsequent reactors for continued polymerization. Multiple reactor systems may include any combination including, but not limited to, multiple loop reactors, multiple gas phase reactors, a combination of loop and gas phase reactors, multiple high pressure reactors, or a combination of high pressure with loop and/or gas phase reactors. The multiple reactors may be operated in series or in parallel.

According to one aspect of the invention, the polymerization reactor system may comprise at least one loop slurry reactor comprising vertical or horizontal loops. Monomer, diluent, catalyst, and comonomer may be continuously fed to a loop reactor where polymerization occurs. Generally, continuous processes may comprise the continuous introduction of monomer/comonomer, a catalyst, and a diluent into a polymerization reactor and the continuous removal from this reactor of a suspension comprising polymer particles and the diluent. Reactor effluent may be flashed to remove the solid polymer from the liquids that comprise the diluent, monomer and/or comonomer. Various technologies may be used for this separation step including but not limited to, flashing that may include any combination of heat addition and pressure reduction; separation by cyclonic action in either a cyclone or hydrocyclone; or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, and 6,833,415, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this invention, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference in its entirety herein.

According to still another aspect of the invention, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the invention, the polymerization reactor may comprise a solution polymerization reactor wherein the monomer/comonomer are contacted with the catalyst composition by suitable stirring or other means. A carrier comprising an inert organic diluent or excess monomer may be employed. If desired, the monomer/comonomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present invention may further comprise any combination of at least one raw material feed system, at least one feed system for catalyst or catalyst components, and/or at least one polymer recovery system. Suitable reactor systems for the present invention may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide desired polymer properties include temperature, pressure, and the concentrations of various reactants. Polymerization temperature can affect catalyst productivity, polymer molecular weight, and molecular weight distribution. Suitable polymerization temperature may be any temperature below the de-polymerization temperature according to the Gibbs Free energy equation. Typically, this includes from about 60° C. to about 280° C., for example, or from about 60° C. to about 110° C., depending upon the type of polymerization reactor. In some reactor systems, the polymerization temperature generally is within a range from about 70° C. to about 90° C., or from about 75° C. to about 85° C.

Suitable pressures will also vary according to the reactor and polymerization type. The pressure for liquid phase polymerizations in a loop reactor is typically less than 1000 psig. Pressure for gas phase polymerization is usually at about 200 to 500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

According to one aspect of this invention, the ratio of hydrogen to the olefin monomer in the polymerization process is controlled. This weight ratio can range from about 50 ppm to about 10,000 ppm of hydrogen, based on the weight of the olefin monomer. For instance, the reactant or feed ratio of hydrogen to olefin monomer can be controlled at a weight ratio which falls within a range from about 50 ppm to about 7500 ppm, from about 50 ppm to about 5000 ppm, or from about 50 ppm to about 1000 ppm. Furthermore, the reactant or feed ratio of hydrogen to olefin monomer can be controlled at a weight ratio in a range from about 75 ppm to about 900 ppm, from about 100 ppm to about 800 ppm, or from about 125 ppm to about 700 ppm, in some aspects of this invention.

In ethylene polymerizations, the feed ratio of hydrogen to ethylene monomer, irrespective of comonomer(s) employed, generally is controlled at a weight ratio within a range from about 50 ppm to about 1000 ppm, but the specific weight ratio target can depend upon the desired polymer molecular weight or melt index (MI). For ethylene polymers (copolymers, terpolymers, etc.) having a MI around 1 g/10 min, the weight ratio of hydrogen to ethylene is typically in a range from about 50 ppm to about 250 ppm, such as, for example, from about 75 ppm to about 225 ppm, or from about 100 ppm to about 200 ppm. At higher melt indices, such as around 75-125 g/10 min, this hydrogen:ethylene feed ratio is often in a range from about 400 ppm to about 1000 ppm, or from about 500 to about 900 ppm.

In another aspect, the feed or reactant ratio of hydrogen to olefin monomer is maintained substantially constant during the polymerization run for a particular polymer grade. That is, the hydrogen olefin ratio is selected at a particular ratio within the range from about 50 ppm to about 10,000 ppm, and maintained at the ratio to within about ±25% during the polymerization run. For instance, if the target ratio is 100 ppm, then maintaining the hydrogen:olefin ratio substantially constant would entail maintaining the feed ratio between about 75 ppm and about 125 ppm. Further, the addition of comonomer (or comonomers) can be, and generally is, substantially constant throughout the polymerization run for a particular polymer grade. The reactant/feed strategy employed herein is different from the pulsing of reactants employed in U.S. Pat. No. 5,739,220 and U.S. Patent Publication No. 2004/0059070, for example.

Yet, in another aspect, effluent flush gas from the polymerization reactors disclosed herein generally has a hydrogen to olefin monomer molar ratio of less than about 0.01, although this ratio can depend upon the desired polymer molecular weight, MI, etc. In an ethylene polymerization, the hydrogen:ethylene molar ratio is typically less than about 0.01, and often, less than about 0.005. For example, for an ethylene copolymer with a high load melt index (HLMI) of 150 g/10 min, this hydrogen:ethylene molar ratio in the effluent flush gas is generally less than about 0.005.

The polymerization process disclosed herein can be conducted in a single reactor in certain aspects of this invention. Thus, multiple reactor systems are not required. An olefin polymer (e.g., an ethylene copolymer) can be produced in the presence of hydrogen and a metallocene-based catalyst system, in a single reactor, resulting in a polymer with a ratio of $M_w/M_n$ in the range from about 3 to about 6. Further, the single reactor can be, as discussed above, a gas phase reactor, a loop reactor, or a stirred tank reactor, for example.

The concentration of the reactant entering the polymerization reactor can be controlled to produce resins with certain physical and mechanical properties. The proposed end-use product that will be formed by the polymer resin and the method of forming that product ultimately can determine the desired polymer properties and attributes. Mechanical properties include tensile, flexural, impact, creep, stress relaxation, and hardness tests. Physical properties include density, molecular weight, molecular weight distribution, melting temperature, glass transition temperature, temperature melt of crystallization, density, stereoregularity, crack growth, long chain branching, and rheological measurements.

This invention is also directed to the polymers produced by any of the polymerization processes disclosed herein. Specific polymer properties and characteristics will be discussed in greater detail in the following section. Articles of manufacture can be formed from, and can comprise, the polymers produced in accordance with this invention.

Polymers and Articles

If the resultant polymer produced in accordance with the present invention is, for example, a polymer or copolymer of ethylene, its properties can be characterized by various analytical techniques known and used in the polyolefin industry. Articles of manufacture can be formed from, and can comprise, the ethylene polymers of this invention, whose typical properties are provided below.

Polymers of ethylene (copolymers, terpolymers, etc.) produced in accordance with this invention generally have a melt index from about 0.01 to about 100 g/10 min. Melt indices in the range from about 0.1 to about 50 g/10 min, or from about 0.3 to about 20 g/10 min, are contemplated in some aspects of this invention. For example, a polymer of the present invention can have a melt index in a range from about 0.5 to about 10, from about 0.5 to about 6, or from about 0.5 to about 3 g/10 min.

The density of ethylene-based polymers produced using one or more metallocene compounds disclosed herein typically falls within the range from about 0.88 to about 0.97 g/cm$^3$. In one aspect of this invention, the density of an ethylene polymer is in a range from about 0.90 to about 0.95 g/cm$^3$. Yet, in another aspect, the density is in a range from about 0.91 to about 0.94 g/cm$^3$, such as, for example, from about 0.91 to about 0.93 g/cm$^3$.

Ethylene polymers, such as copolymers and terpolymers, having a weight-average molecular weight (Mw) that falls within a range from about 15,000 to about 350,000 g/mol are within the scope of the present invention. Often, the Mw of the polymers of the present invention is within a range from about 20,000 to about 250,000 g/mol, for example, from about 50,000 to about 200,000 g/mol, or from about 70,000 to about 150,000 g/mol.

One measure of the molecular weight distribution of ethylene polymers disclosed herein is the polydispersity index, or the ratio of Mw/Mn, where Mw is weight-average molecular weight and Mn is number-average molecular weight. Generally, the ratios of Mw/Mn for polymers prepared by traditional metallocene catalyst systems, and not of this invention, are in a range from about 2.0 to about 2.5. However, the ratios of Mw/Mn for polymers of this invention are in a range from about 3 to about 6. In some aspects, the Mw/Mn ratio of the polymer is in a range from about 3.1 to about 5.5, or from about 3.1 to about 5.0. In other aspects, the Mw/Mn of the polymer is in a range from about 3.2 to about 4.8, from about 3.2 to about 4.5, from about 3.3 to about 4.4, or from about 3.5 to about 4.4.

Ethylene polymers produced using the polymerization processes and catalyst systems described above have a reverse comonomer distribution. A reverse comonomer distribution, as used herein, refers to a polymer in which the higher molecular weight components of the polymer have higher comonomer incorporation than the lower molecular weight components. Generally, there is increasing comonomer incorporation with increasing molecular weight. Often, the amount of comonomer incorporation at higher molecular weights is about 20% higher, or 30% higher, than at lower molecular weights. In one aspect, the amount of comonomer incorporation at higher molecular weights is about 50% higher than at lower molecular weights. Another characterization of a reverse comonomer distribution is that the number of short chain branches (SCB) per 1000 total carbon atoms is greater at Mw than at Mn.

The short chain branching distribution (SCBD) of polymers of this invention also can be characterized by a ratio of the number of SCB per 1000 total carbon atoms of the polymer at a molecular weight of $10^{5.5}$ to the number of SCB per 1000 total carbon atoms of the polymer at a molecular weight of $10^4$, i.e., (SCB at $10^{5.5}$ molecular weight)/(SCB at $10^4$ molecular weight). In this invention, the ratio is greater than 1. In another aspect, the ratio of the number of SCB per 1000 total carbon atoms of the polymer at a molecular weight of $10^{5.5}$ to the number of SCB per 1000 total carbon atoms of the polymer at a molecular weight of $10^4$ is greater than about 1.2, for example, greater than about 1.3. In other aspects, the ratio is greater than about 1.5. Yet, in other aspects, the ratio is in a range from about 1 to about 5, from about 1.2 to about 4, or from about 1.3 to about 3.5. As an example, the ratio of the number of SCB per 1000 total carbon atoms of the polymer at a molecular weight of $10^{5.5}$ to the number of SCB per 1000 total carbon atoms of the polymer at a molecular weight of $10^4$ can be in a range from about 1.5 to about 3.

Figure 2:
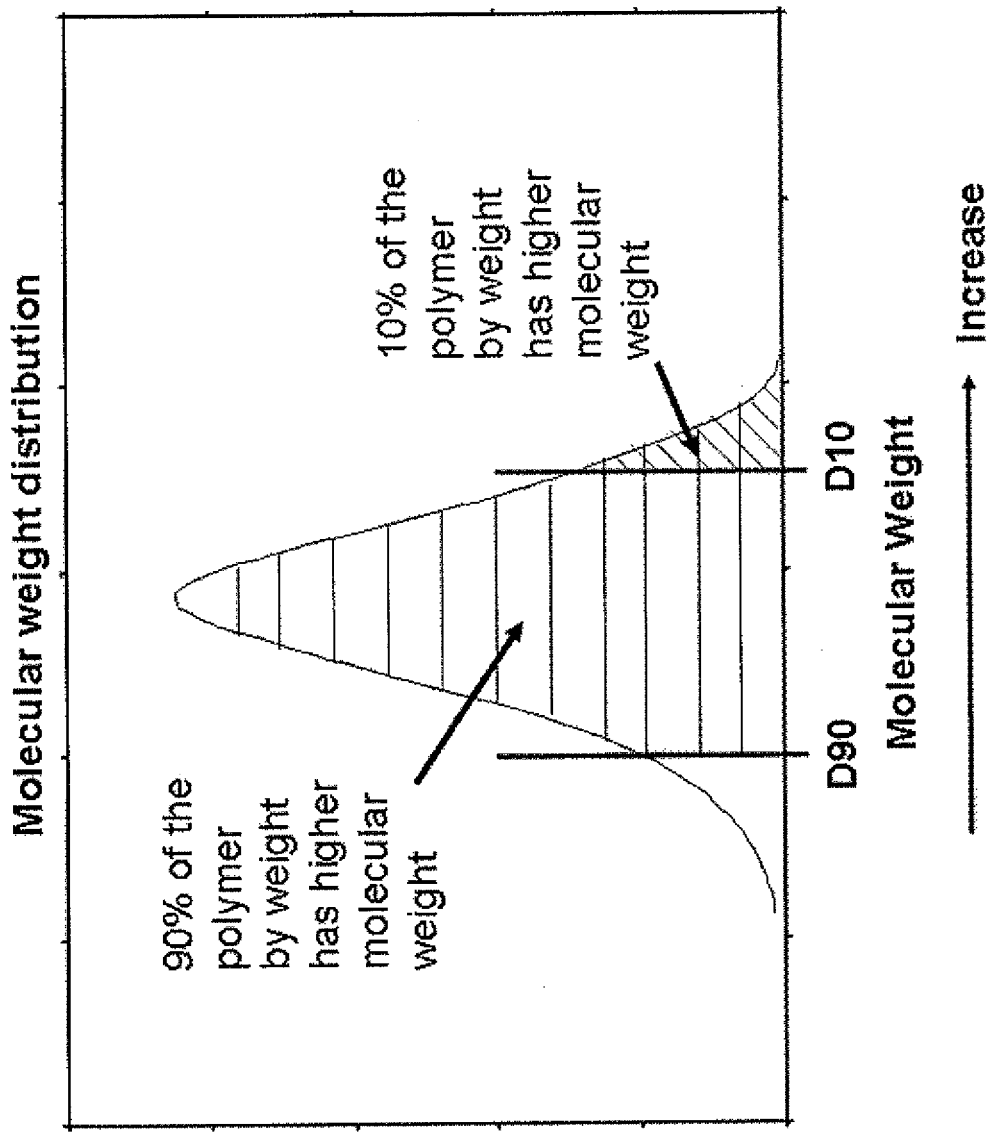
FIG. 2 illustrates the definitions of D90 and D10 on a molecular weight distribution curve.

In addition, the SCBD of polymers of the present invention can be characterized the ratio of the number of SCB per 1000 total carbon atoms of the polymer at D90 to the number of SCB per 1000 total carbon atoms of the polymer at D10, i.e., (SCB at D90)/(SCB at D10). D90 is the molecular weight at which 90% of the polymer by weight has higher molecular weight, and D10 is the molecular weight at which 10% of the polymer by weight has higher molecular weight. D90 and D10 are depicted graphically in FIG. 2. In accordance with one aspect of the present invention, a ratio of the number of short chain branches (SCB) per 1000 total carbon atoms of the polymer at D90 to the number of SCB per 1000 total carbon atoms of the polymer at D10 is less than about 0.9. For instance, the ratio of (SCB at D90)/(SCB at D10) can be in a range from about 0.1 to about 0.9. In another aspect, the ratio is less than about 0.8, or less than about 0.7. Yet, in another aspect, the ratio of the number of SCB per 1000 total carbon atoms of the polymer at D90 to the number of SCB per 1000 total carbon atoms of the polymer at D10 is in a range from about 0.2 to about 0.8, such as, for example, from about 0.3 to about 0.7.

Analytical Temperature Rising Elution Fractionation (ATREF) can be used to characterize the SCBD of the polymers disclosed herein. In an ATREF test, less than about 5% by weight of these polymers is eluted below a temperature of 40° C. In another aspect, less than about 4% by weight, or less than about 3% by weight, of the polymer is eluted below a temperature of 40° C. in an ATREF test. For example, less than about 1% by weight of the polymer can be eluted below a temperature of 40° C. in an ATREF test.

Generally, polymers of the present invention have low levels of long chain branching, with typically less than about 0.05 long chain branches (LCB) per 1000 total carbon atoms. In some aspects, the number of LCB per 1000 total carbon atoms is less than about 0.04, less than about 0.03, less than about 0.02, or less than about 0.01. Furthermore, polymers of the present invention can have less than about 0.008, less than about 0.006, less than about 0.005, less than about 0.004, less than about 0.003, less than about 0.002, or less than about 0.001 LCB per 1000 total carbon atoms, in other aspects of this invention.

An illustrative and non-limiting example of an ethylene polymer of the present invention can be characterized by a melt index from about 0.1 to about 100 g/10 min; a ratio of Mw/Mn from about 3 to about 6; and a reverse comonomer distribution. This polymer also has less than about 0.05 LCB per 1000 total carbon atoms; and less than about 5% by weight of the polymer is eluted below a temperature of 40° C. in an ATREF test.

Another exemplary ethylene polymer has a melt index from about 0.3 to about 20 g/10 min; a ratio of Mw/Mn from about 3.1 to about 5.0; a reverse comonomer distribution; less than about 0.01 LCB per 1000 total carbon atoms; and less than about 3% by weight of the polymer eluted below a temperature of 40° C. in an ATREF test.

Yet another ethylene polymer disclosed herein has a melt index from about 0.5 to about 10 g/10 min; a ratio of Mw/Mn from about 3.2 to about 4.5; a reverse comonomer distribution; less than about 0.005 LCB per 1000 total carbon atoms; and less than about 1% by weight of the polymer eluted below a temperature of 40° C. in an ATREF test.

Polymers of ethylene, whether copolymers, terpolymers, and so forth, can be formed into various articles of manufacture. Articles which can comprise polymers of this invention include, but are not limited to, an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, a toy, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt index (MI, g/10 min) was determined in accordance with ASTM D1238 at 190° C. with a 2,160 gram weight.

High load melt index (HLMI, g/10 min) was determined in accordance with ASTM D1238 at 190° C. with a 21,600 gram weight.

Polymer density was determined in grams per cubic centimeter (g/cm$^3$) on a compression molded sample, cooled at about 15° C. per hour, and conditioned for about 40 hours at room temperature in accordance with ASTM D1505 and ASTM D1928, procedure C.

Melt rheological characterizations were performed as follows. Small-strain (10%) oscillatory shear measurements were performed on a Rheometrics Scientific, Inc. ARES rheometer using parallel-plate geometry. All rheological tests were performed at 190° C. The complex viscosity $|\eta^*|$ versus frequency ($\omega$) data were then curve fitted using the modified three parameter Carreau-Yasuda (CY) empirical model to obtain the zero shear viscosity—$\eta_0$, characteristic viscous relaxation time—$\tau_\eta$, and the breadth parameter—a. The simplified Carreau-Yasuda (CY) empirical model is as follows.

$$|\eta*(\omega)| = \frac{\eta_0}{[1+(\tau_\eta\omega)^a]^{(1-n)/a}},$$

wherein:

$|\eta^*(\omega)|$=magnitude of complex shear viscosity;
$\eta_0$=zero shear viscosity;
$\tau_\eta$=viscous relaxation time;
$\alpha$="breadth" parameter;
n=fixes the final power law slope, fixed at 2/11; and
$\omega$=angular frequency of oscillatory shearing deformation.

Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987); each of which is incorporated herein by reference in its entirety.

Molecular weights and molecular weight distributions were obtained using a PL 220 SEC high temperature chromatography unit (Polymer Laboratories) with trichlorobenzene (TCB) as the solvent, with a flow rate of 1 mL/minute at a temperature of 145° C. BHT (2,6-di-tert-butyl-4-methylphenol) at a concentration of 0.5 g/L was used as a stabilizer in the TCB. An injection volume of 200 µL was used with a nominal polymer concentration of 1.5 mg/mL. Dissolution of the sample in stabilized TCB was carried out by heating at 150° C. for 5 hours with occasional, gentle agitation. The columns used were three PLgel Mixed A LS columns (7.8× 300 mm) and were calibrated with a broad linear polyethylene standard (Phillips Marlex® BHB 5003) for which the molecular weight had been determined.

SCBD data was obtained using a SEC-FTIR high temperature heated flow cell (Polymer Laboratories) as described by P. J. DesLauriers, D. C. Rohlfing, and E. T. Hsieh, *Polymer*, 43, 159 (2002). The ATREF procedure was as follows: Forty milligrams of the polymer sample and 20 mL of 1,2,4-trichlorobenzene were sequentially charged into the vessel on a PolyChar TREF 200+ instrument. After dissolving the polymer, an aliquot of polymer solution was loaded on the column and cooled at 0.5° C./min to 35° C. Then, the elution began using a 0.5 mL/min flow rate and heating at 1° C./min up to 120° C.

The sulfated alumina activator-support employed in some of the Examples was prepared in accordance with the following procedure. Bohemite was obtained from W.R. Grace Company under the designation "Alumina A" and having a surface area of about 300 m$^2$/g and a pore volume of about 1.3 mL/g. This material was obtained as a powder having an average particle size of about 100 microns. This material was impregnated to incipient wetness with an aqueous solution of ammonium sulfate to equal about 15% sulfate. This mixture was then placed in a flat pan and allowed to dry under vacuum at approximately 110° C. for about 16 hours.

To calcine the support, about 10 grams of this powdered mixture were placed in a 1.75-inch quartz tube fitted with a sintered quartz disk at the bottom. While the powder was supported on the disk, air (nitrogen can be substituted) dried by passing through a 13× molecular sieve column, was blown upward through the disk at the linear rate of about 1.6 to 1.8 standard cubic feet per hour. An electric furnace around the quartz tube was then turned on and the temperature was raised at the rate of about 400° C. per hour to the desired calcining temperature of about 600° C. At this temperature, the powder was allowed to fluidize for about three hours in the dry air. Afterward, the sulfated alumina activator-support was collected and stored under dry nitrogen, and was used without exposure to the atmosphere.

Comparative Examples 1-2

Polymers Produced Using a Chromium-Based Catalyst System

Comparative Examples 1-2 were produced in accordance with the following procedure. Cr/silica catalyst, obtained from W.R. Grace under the name 969MPI, was activated by calcination in a fluidized bed at 700° C. for 3 hours. About 0.1 g was then charged under nitrogen to a 2.2-L autoclave, equipped with temperature control and a marine stirrer operating at 400 rpm. About 1.2 L of isobutane liquid were added, followed by hydrogen addition (if used). Hydrogen gas was added to the reactor at 25° C. from a 1-L pressurized storage cylinder. Enough hydrogen was added to cause a 100 psig drop in pressure in the storage cylinder. The temperature of the reactor was then increased to 103° C. Ethylene was added to 550 psig, and continuously added to maintain that pressure during polymerization. Thus, polymerizations were conducted at a temperature of 103° C., a pressure of 550 psig, and either in the presence of, or the absence of, hydrogen, Polymerizations were stopped by venting after about 60 minutes.

Figure 3:
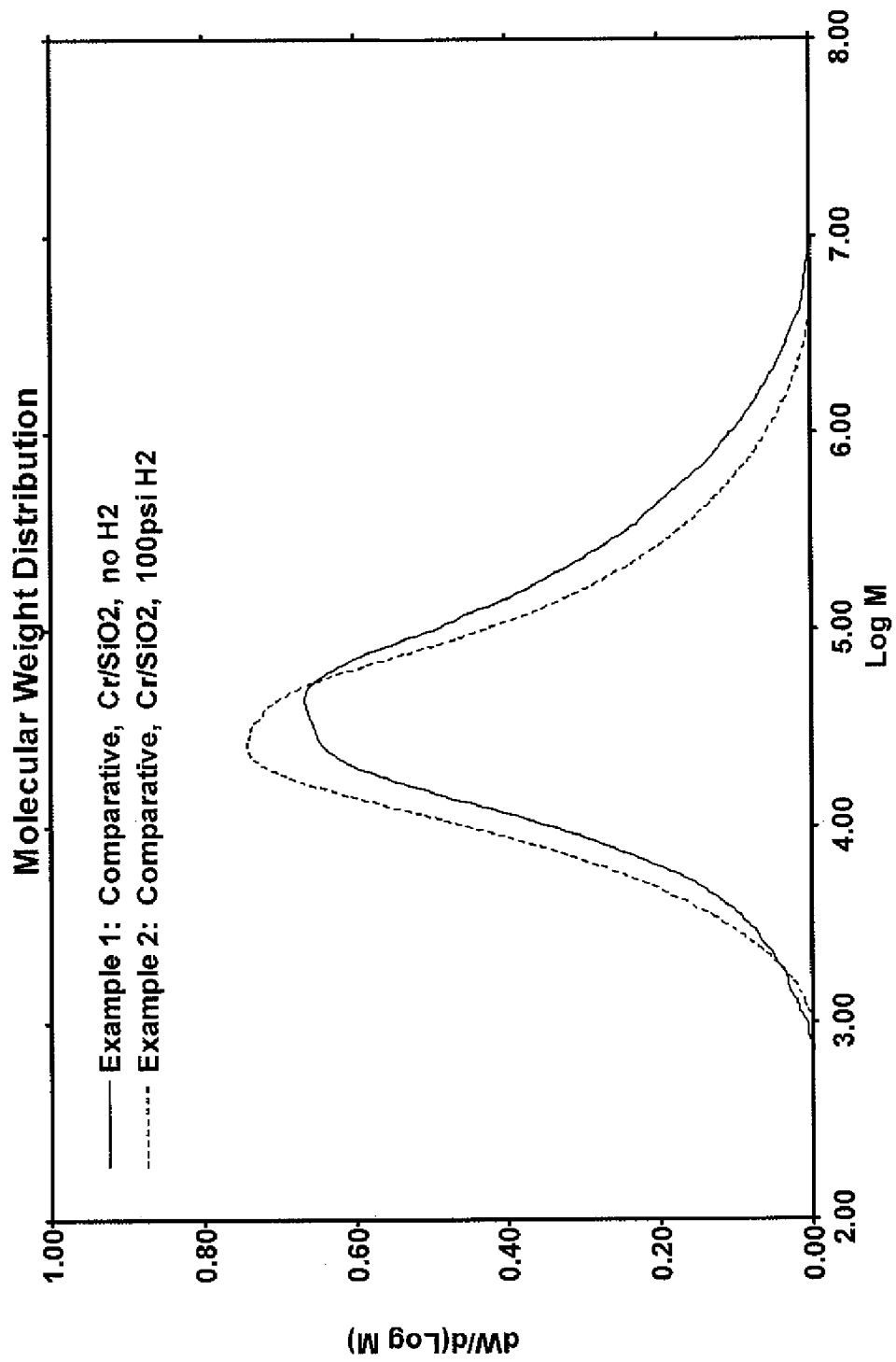
FIG. 3 presents a plot of the molecular weight distributions of the polymers of Examples 1-2.

FIG. 3 compares the molecular weight distributions of the polymers of Comparative Examples 1-2, while Table I lists Mw, Mn, and the ratio of Mw/Mn, a measure of molecular weight distribution. The results of Comparative Examples 1-2 indicate that the addition of hydrogen in the polymerization of ethylene produces a polymer with a narrower molecular weight distribution.

TABLE I

Polymer properties of Comparative Examples 1-2.

| Example | Catalyst Type | Hydrogen Δ psig | Mn g/mol | Mw g/mol | Mw/Mn |
|---|---|---|---|---|---|
| 1 | Cr/SiO$_2$ | 0 | 20,250 | 179,100 | 8.8 |
| 2 | Cr/SiO$_2$ | 100 | 17,540 | 103,100 | 5.9 |

Examples 3-7

Polymers Produced Using Metallocene MET 1

The polymerization runs of Examples 3-7 were conducted in a one-gallon (3.8-liter) stainless steel reactor as follows. First, the reactor was purged with nitrogen and then with isobutane vapor. About 0.5 mL of 1M TIBA or TNBA organoaluminum co-catalyst, 100 mg of sulfated alumina activator-support, and either 0.5 mg or 0.68 mg of MET 1 were added in that order through a charge port while venting isobutane vapor. The MET 1 was added from a 1 mg/mL solution prepared by dissolving 20 mg of metallocene in 20 mL of toluene. The charge port was closed and 1.8 L of isobutane were added. The contents of the reactor were stirred and heated to 80° C. Thirty grams of 1-hexene were then added into the reactor, followed by the introduction of ethylene and hydrogen, with the hydrogen added at a fixed mass ratio with respect to the ethylene flow. Hydrogen was stored in a 340-mL pressure vessel and added with the ethylene via an automated feeding system, while the total reactor pressure was maintained at 340 psig by the combined ethylene/hydrogen addition. Ultimately, the total amount of hydrogen added was recorded as the pressure drop in the 340-mL vessel. The contents of the reactor were maintained at the run temperature for either 19 or 30 minutes by an automated heating-cooling system. The polymerization conditions and resultant polymer properties for Inventive Examples 3-6 and Comparative Example 7 are listed in Table II.

Figure 4:
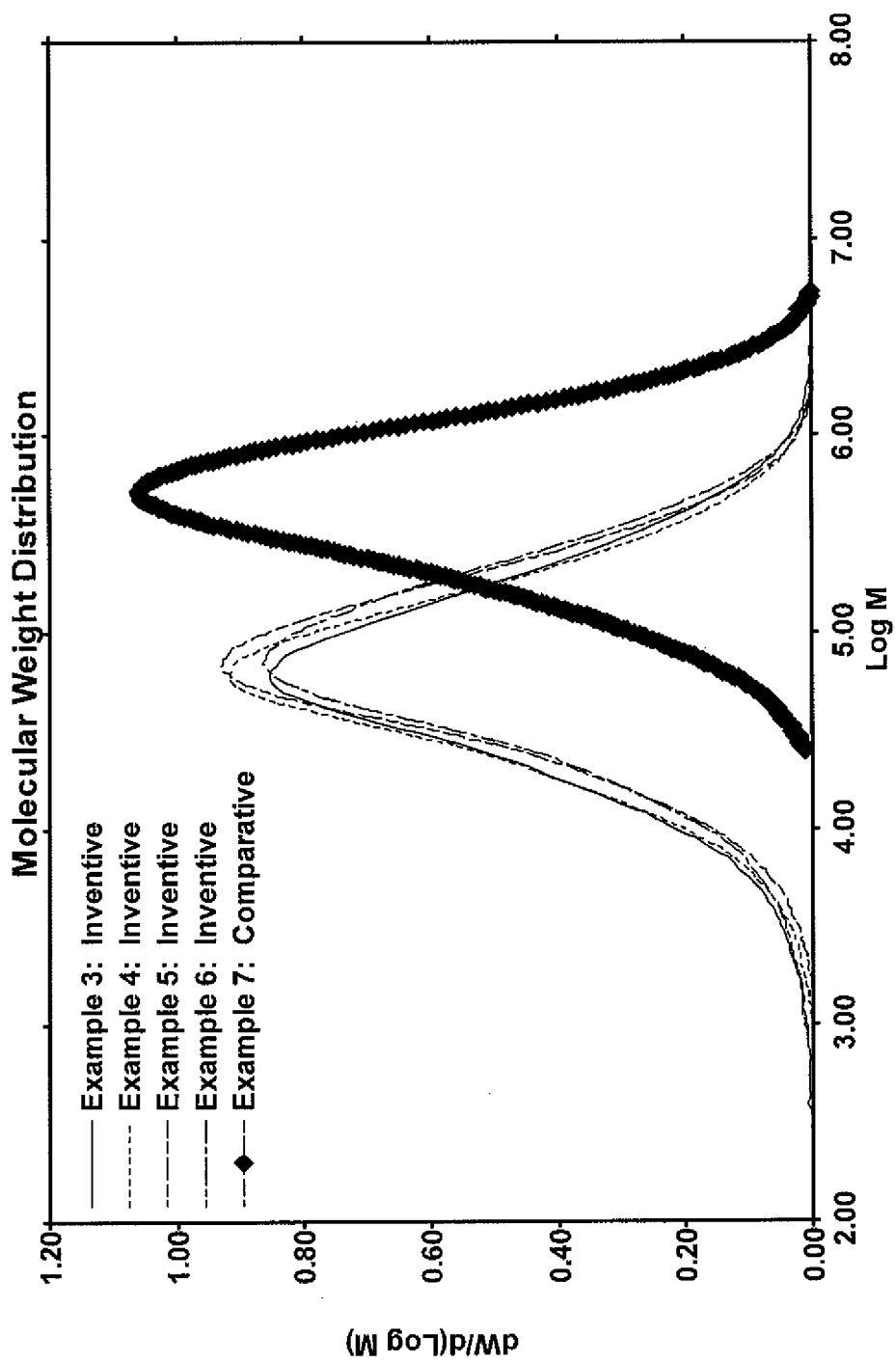
FIG. 4 presents a plot of the molecular weight distributions of the polymers of Examples 3-7.

FIG. 4 compares the molecular weight distributions of the polymers of Examples 3-7, while Table II lists MI, HLMI, density, Mw, Mn, and the ratio of Mw/Mn, a measure of molecular weight distribution. As shown by comparing the results of Examples 3-6 with those of Example 7, polymers produced using MET 1 in the presence of hydrogen had a broader molecular weight distribution than the polymer produced in the absence of hydrogen.

TABLE II

Polymerization Conditions and Polymer Properties of Examples 3-7.

| Example | Metallocene MET 1 (mg) | Time (min) | Hydrogen Δ psig | (R$^6$)$_3$Al (mmol) | g PE produced |
|---|---|---|---|---|---|
| 3 | 0.5 mg | 30 | 58 | 0.5 TIBA | 211 |
| 4 | 0.5 mg | 30 | 45 | 0.5 TIBA | 177 |
| 5 | 0.5 mg | 30 | 37 | 0.5 TNBA | 113 |
| 6 | 0.5 mg | 30 | 34 | 0.5 TNBA | 131 |
| 7 | 0.68 mg | 19 | 0 | 0.5 TNBA | 124 |

| Example | MI g/10 min | HLMI g/10 min | Density g/cc | Mn g/mol | Mw g/mol | Mw/Mn |
|---|---|---|---|---|---|---|
| 3 | 1.6 | 43 | 0.9210 | 22,500 | 113,300 | 5.0 |
| 4 | 1.9 | 47 | 0.9216 | 30,200 | 104,400 | 3.5 |
| 5 | 1.2 | 26 | 0.9209 | 37,200 | 113,900 | 3.1 |
| 6 | 1.0 | 23 | 0.9233 | 29,900 | 121,000 | 4.1 |
| 7 | 0.0 | 0 | 0.9058 | 274,000 | 612,500 | 2.2 |

Examples 8-14

Polymers Produced Using Metallocene MET 1 or MET 2

The polymerization runs of Examples 8-14 were conducted in a one-gallon (3.8-liter) stainless steel reactor as follows. First, the reactor was purged with nitrogen and then with isobutane vapor. About 0.5 mL of 1M TIBA organoaluminum co-catalyst, 100 mg of sulfated alumina (SA) activator-support, and the specified quantity of either MET 1 or MET 2 were added in that order through a charge port while venting isobutane vapor. The MET 1 or MET 2 was added from a 1 mg/mL solution prepared by dissolving 20 mg of metallocene in 20 mL of toluene. The charge port was closed and then 2 L of isobutane were added. The contents of the reactor were stirred and heated to 80° C. The contents were maintained at that temperature for the duration of the polymerization run using an automated heating-cooling system. Comonomer 1-hexene was then added into the reactor, followed by the introduction of ethylene and hydrogen at a fixed mass ratio via an automated feeding system. The total reactor pressure was maintained at 355 psig throughout the run by the automated feeding system. Ethylene and hydrogen were fed on demand to maintain the desired total pressure of 355 psig for the 30-minute polymerization run. The polymerization conditions and resultant polymer properties for Inventive Examples 8-11 and Comparative Examples 12-14 are listed in Table III.

Figure 5:
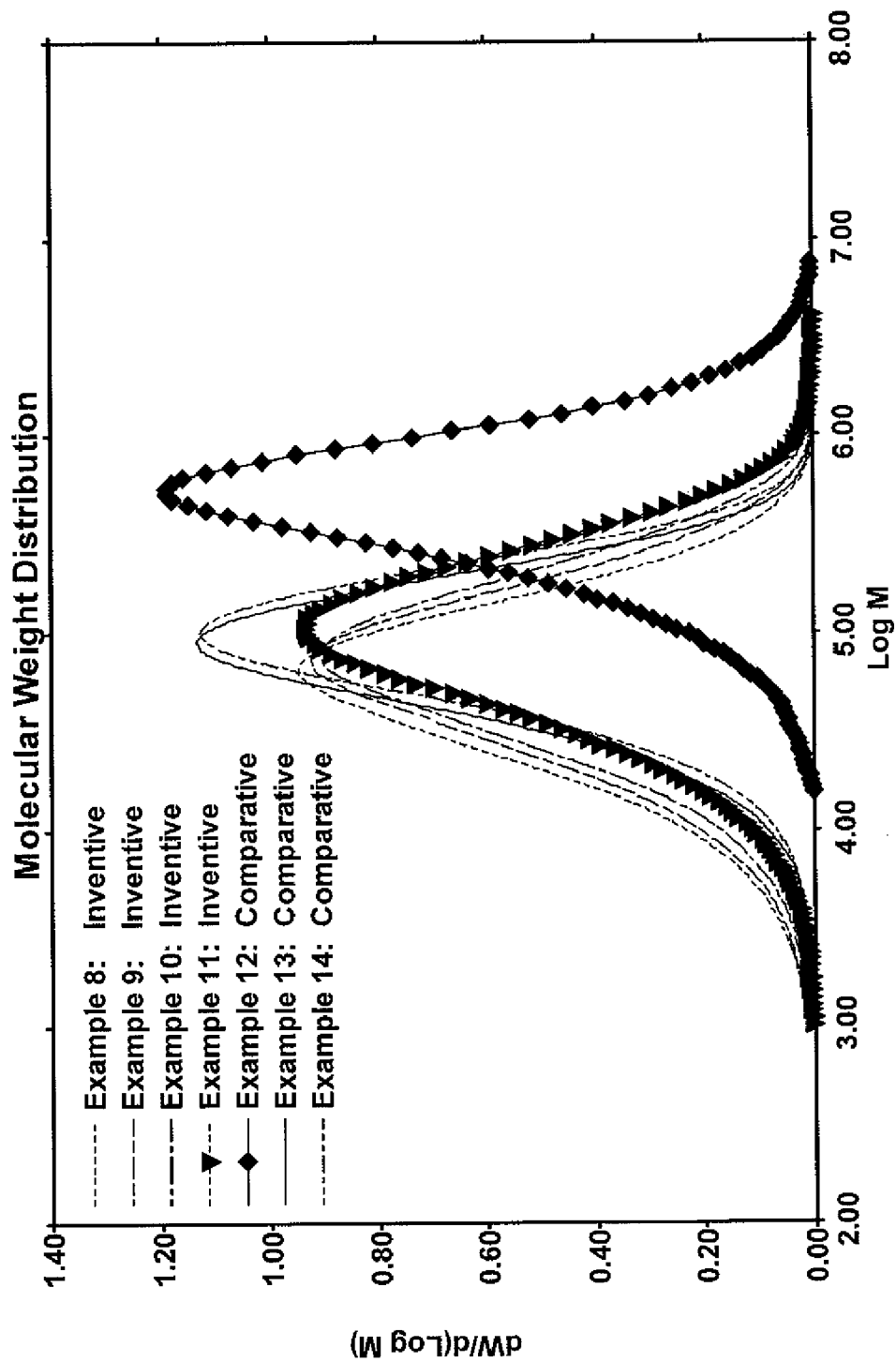
FIG. 5 presents a plot of the molecular weight distributions of the polymers of Examples 8-14.

FIG. 5 compares the molecular weight distributions of the polymers of Examples 8-14, while Table III lists MI, HLMI, density, Mw, Mn, and the ratio of Mw/Mn, a measure of molecular weight distribution. As shown by comparing the results of Examples 8-11 with those of Example 12, polymers produced using MET 1 in the presence of hydrogen had a broader molecular weight distribution than the polymer produced in the absence of hydrogen. MET 1 also produced broader molecular weight distribution polymers than MET 2—in the presence of hydrogen—as shown by comparing Examples 8-11 (MET 1) with Examples 13-14 (MET 2) in both FIG. 5 and Table III.

Figure 6:
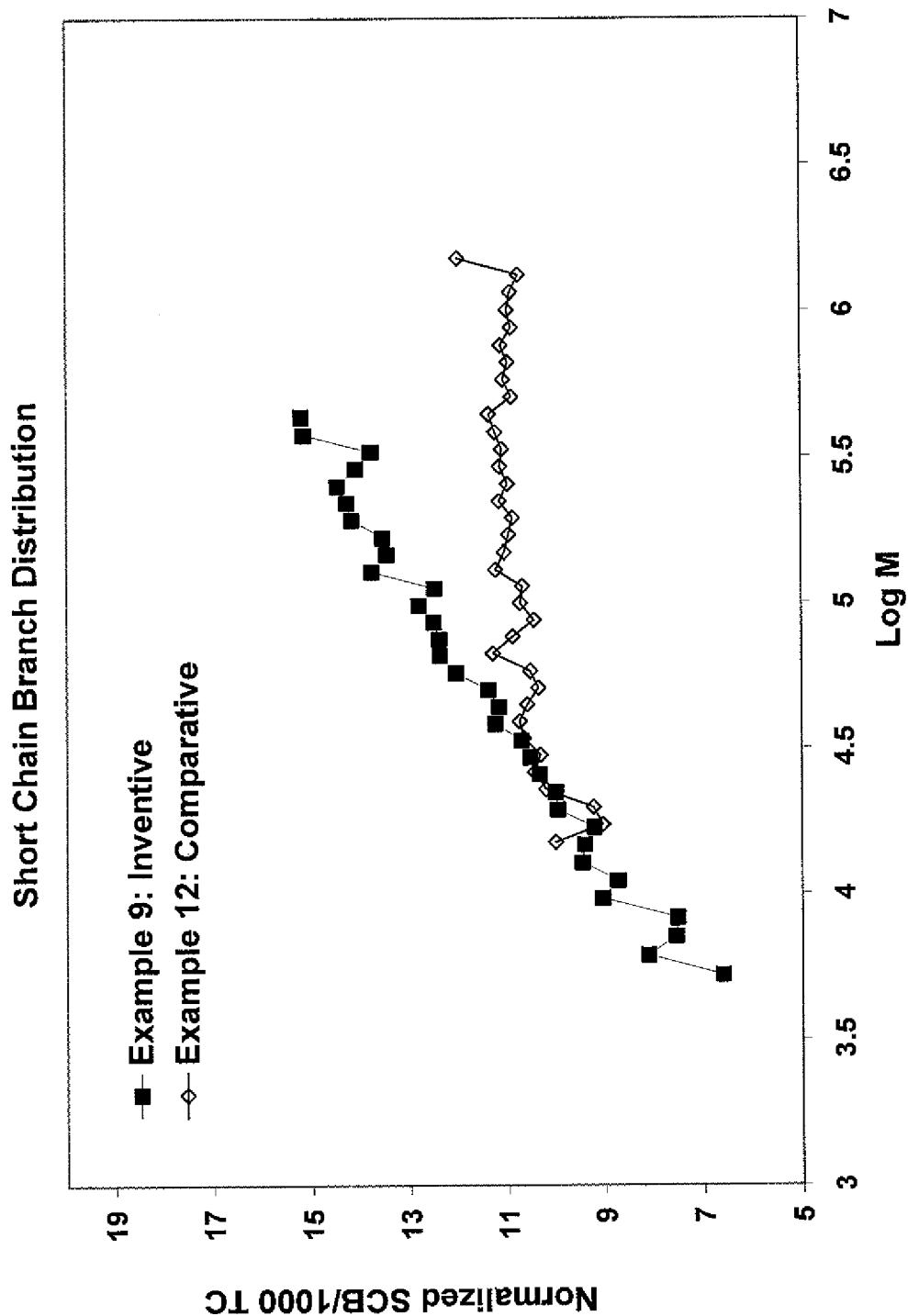
FIG. 6 presents a plot of the short chain branch distributions of the polymers of Example 9 and Example 12.

The SCBD of Examples 9 and 12 are compared in FIG. 6. Example 9 was produced using MET 1 in the presence of hydrogen and has a reverse comonomer distribution. As shown in FIG. 6, the number of SCB per 1000 total carbon atoms is greater at Mw than at Mn for Example 9. Further, the ratio of the number of SCB per 1000 total carbon atoms at a molecular weight of $10^{5.5}$ to the number of SCB per 1000 total carbon atoms at a molecular weight of $10^4$ is greater than 1.

татв III

Polymerization Conditions and Polymer Properties of Examples 8-14.

| Example | Metallocene (mg) | 1-hexene (g) | Hydrogen (mg) | SA (mg) | g PE produced |
|---|---|---|---|---|---|
| 8 | 0.5 mg MET 1 | 35 | 261 | 104 | 155 |
| 9 | 0.5 mg MET 1 | 35 | 156 | 107 | 248 |
| 10 | 0.5 mg MET 1 | 35 | 132 | 109 | 300 |
| 11 | 0.38 mg MET 1 | 45 | 120 | 130 | 207 |
| 12 | 0.25 mg MET 1 | 35 | 0 | 109 | 142 |
| 13 | 2 mg MET 2 | 43 | 47 | 117 | 305 |
| 14 | 2 mg MET 2 | 43 | 33 | 97 | 261 |

TABLE III-continued

Polymerization Conditions and Polymer Properties of Examples 8-14.

| Example | MI g/10 min | HLMI g/10 min | Density g/cc | Mn g/mol | Mw g/mol | Mw/Mn |
|---|---|---|---|---|---|---|
| 8  | 8.2 | 327 | 0.9242 | 24,200  | 77,600  | 3.2 |
| 9  | 3.0 | 81  | 0.9240 | 27,700  | 90,700  | 3.3 |
| 10 | 2.0 | 52  | 0.9243 | 31,700  | 105,500 | 3.3 |
| 11 | 0.9 | 20  | 0.9156 | 41,900  | 142,500 | 3.4 |
| 12 | 0.0 | 0   | 0.9065 | 272,600 | 613,800 | 2.3 |
| 13 | 1.3 | 22  | 0.9142 | 45,900  | 106,900 | 2.3 |
| 14 | 0.8 | 14  | 0.9117 | 45,000  | 119,700 | 2.7 |

Examples 15-28

Polymers Produced Using Metallocene MET 1, MET 2, or MET 3

The polymerization runs of Examples 15-28 were conducted in a loop reactor as follows. A 27.3-gallon (103.3 L) or 31.2-gallon (118 L) slurry loop reactor was employed as the polymerization reactor. Polymerization runs were carried out under continuous particle form process conditions in the loop reactor (also known as a slurry process) by contacting a 1-hexene solution of the metallocene with triisobutylaluminum (TIBA) and a sulfated alumina activator-support in a 500 or 1000-mL stirred autoclave with continuous output to the loop reactor.

Precontacting was carried out in the following manner. A TIBA solution in isobutane and the metallocene solution in 1-hexene were fed as separate streams into a manifold upstream of the solid activator feeder outlet where they contacted each other and were combined with isobutane flush. The solid activator was flushed with the combined solution into the autoclave, briefly contacting the TIBA/metallocene just before entering the autoclave. The combined solution flush used to transport the solid activator into the autoclave was set at a rate that would result in a residence time of approximately 20-30 minutes in the autoclave, controlled by adjusting the isobutane flow rate. The total flow from the autoclave then entered the loop reactor.

Ethylene used was polymerization grade ethylene (obtained from AirGas Specialty Gases) which was purified through a column of A201 alumina and activated at 343° C. in nitrogen. 1-Hexene used was polymerization grade 1-hexene (obtained from Chevron Phillips Chemical Company), which was further purified by distillation and subsequently passed through a column of AZ300, an alumina molecular sieve hybrid, and activated at 343° C. in nitrogen. The loop reactor was a liquid-full, 15.2-cm diameter, loop reactor, having a volume of either 27.3 gallons (103.3 L) or 31.2 gallons (118 L). Liquid isobutane was used as the diluent. Hydrogen was added to affect the molecular weight and molecular distribution of the polymer product. The isobutane was polymerization grade isobutane (obtained from Enterprise Products) that was further purified by distillation and subsequently passed through a column of 13× molecular sieves and activated at 343° C. in nitrogen.

Reactor pressure was approximately 590 psig. The reaction temperatures employed are listed in Table IV. Additionally, the reactor was operated to have a residence time of about 1.1 hours. The solid activator was added through a 0.35-mL circulating ball-check feeder (for example 28, the feeder was 0.90 mL) and fed to the 500 or 1000-mL autoclave as described above. Metallocene concentrations in the reactor were within a range of about 0.9-4.7 parts per million (ppm) of the diluent in the polymerization reactor. Polymer was removed from the reactor at the rate of about 26-49 lb/hr and recovered in a flash chamber. A Vulcan dryer was used to dry the polymer under nitrogen at about 60-80° C. for the smaller volume reactor. The larger reactor was used in conjunction with a purge column operating in same temperature range.

TIBA concentration in the reactor was in a range of about 36-84 ppm of the diluent in the polymerization reactor, as listed in Table IV. About one-half of the TIBA was added to the autoclave and the remainder fed directly to the reactor. To prevent static build-up in the reactor, a small amount (less than 5 ppm based on the weight of diluent) of a commercial antistatic agent available as Octastat 3000 was added as needed.

The polymerization conditions and resultant polymer properties for Inventive Examples 17-27 and Comparative Examples 15-16 and 28 are listed in Table IV.

Figure 7:
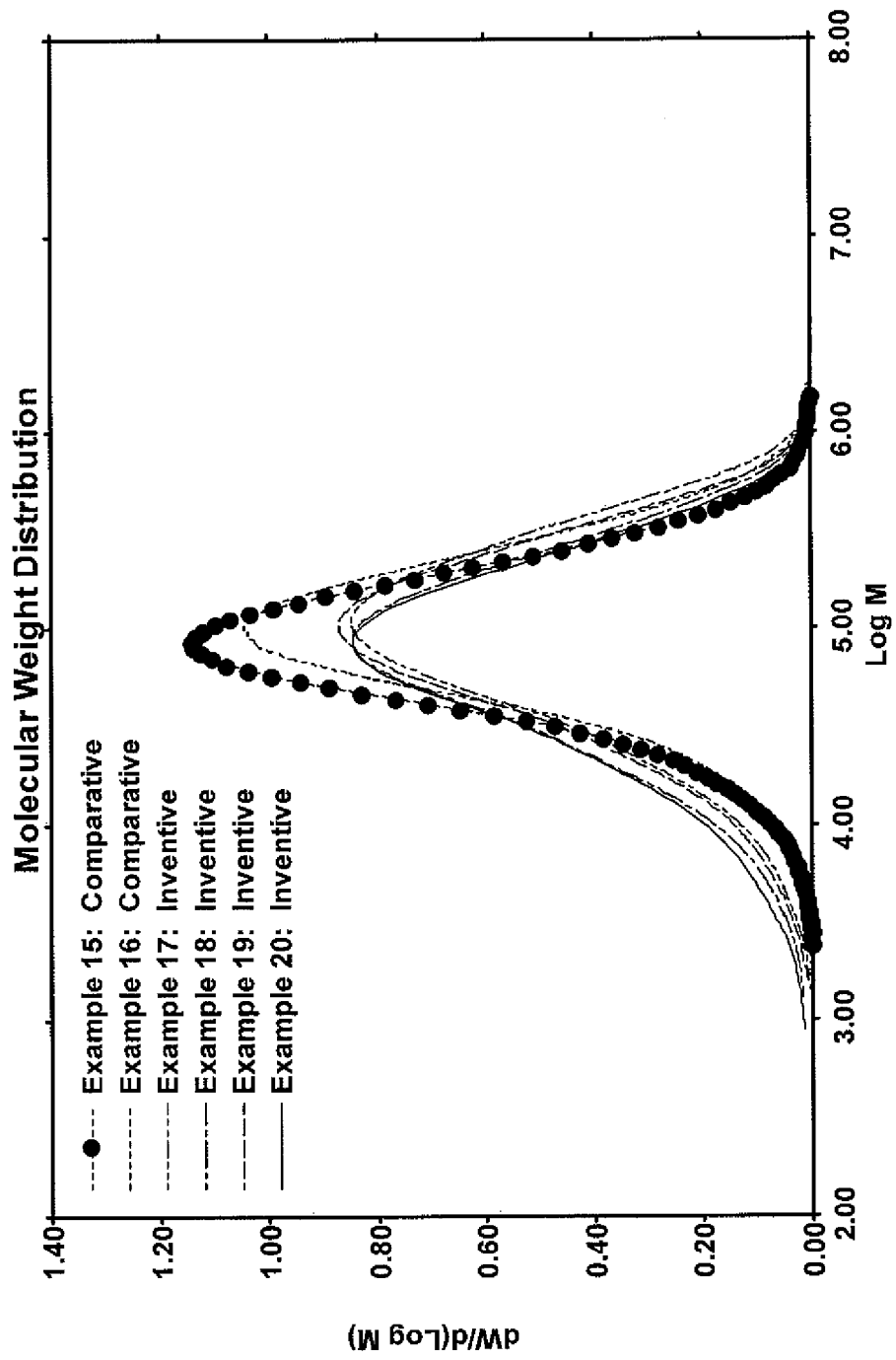
FIG. 7 presents a plot of the molecular weight distributions of the polymers of Examples 15-20.
Figure 8:
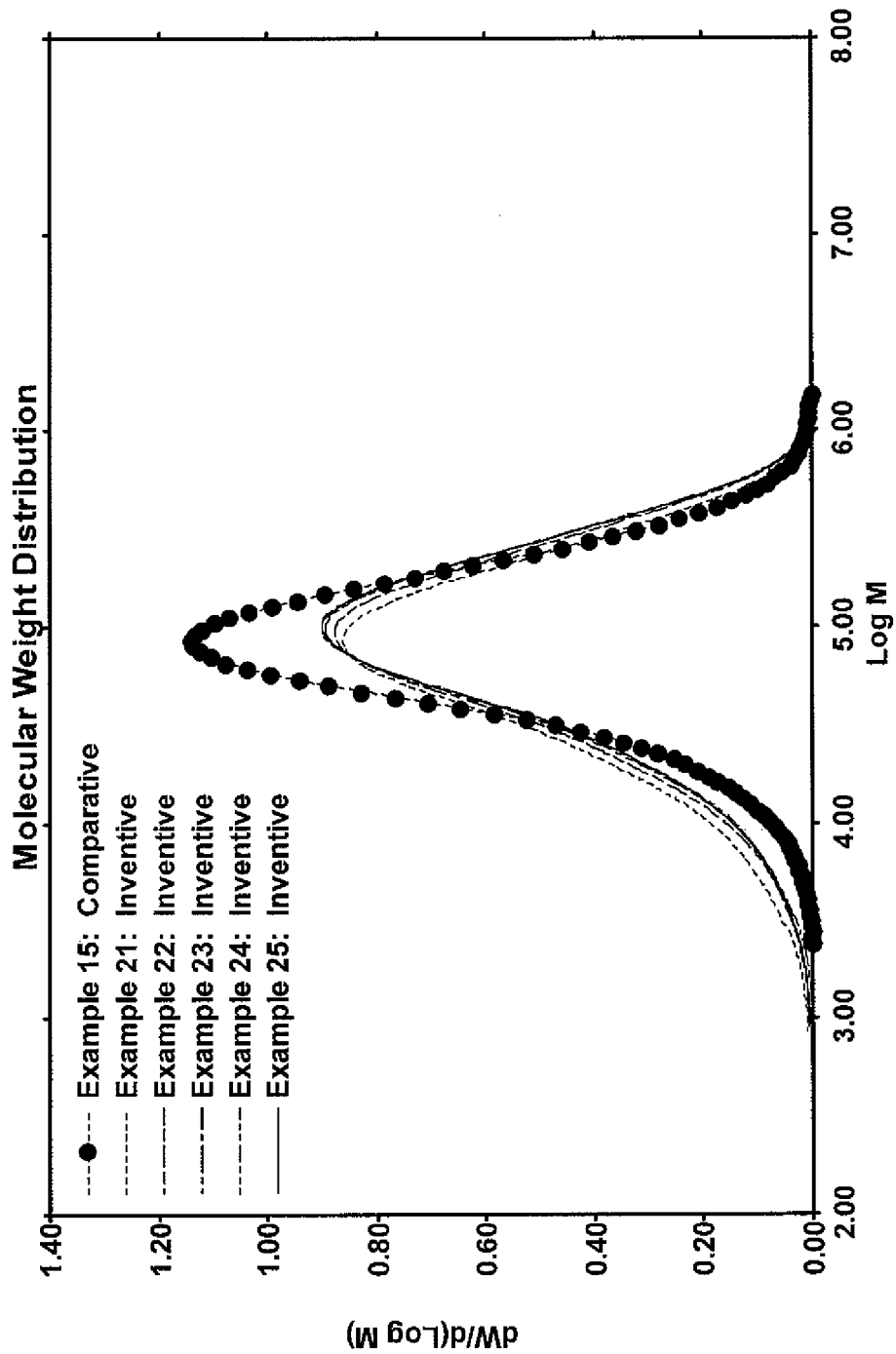
FIG. 8 presents a plot of the molecular weight distributions of the polymers of Example 15 and Examples 21-25.

FIG. 7 compares the molecular weight distributions of the polymers of Examples 15-20 while Table IV lists MI, HLMI, density, Mw, Mn, and the ratio of Mw/Mn, a measure of molecular weight distribution. As shown by comparing the results of Examples 17-20 with those of Examples 15-16, polymers produced using MET 1 were broader in molecular weight distribution than those produced using MET 2. Likewise, FIG. 8 compares the molecular weight distributions of the polymers of Examples 15 and 21-25, and also demonstrates the broader molecular weight distribution achieved using MET 1 as compared to MET 2.

Figure 9:
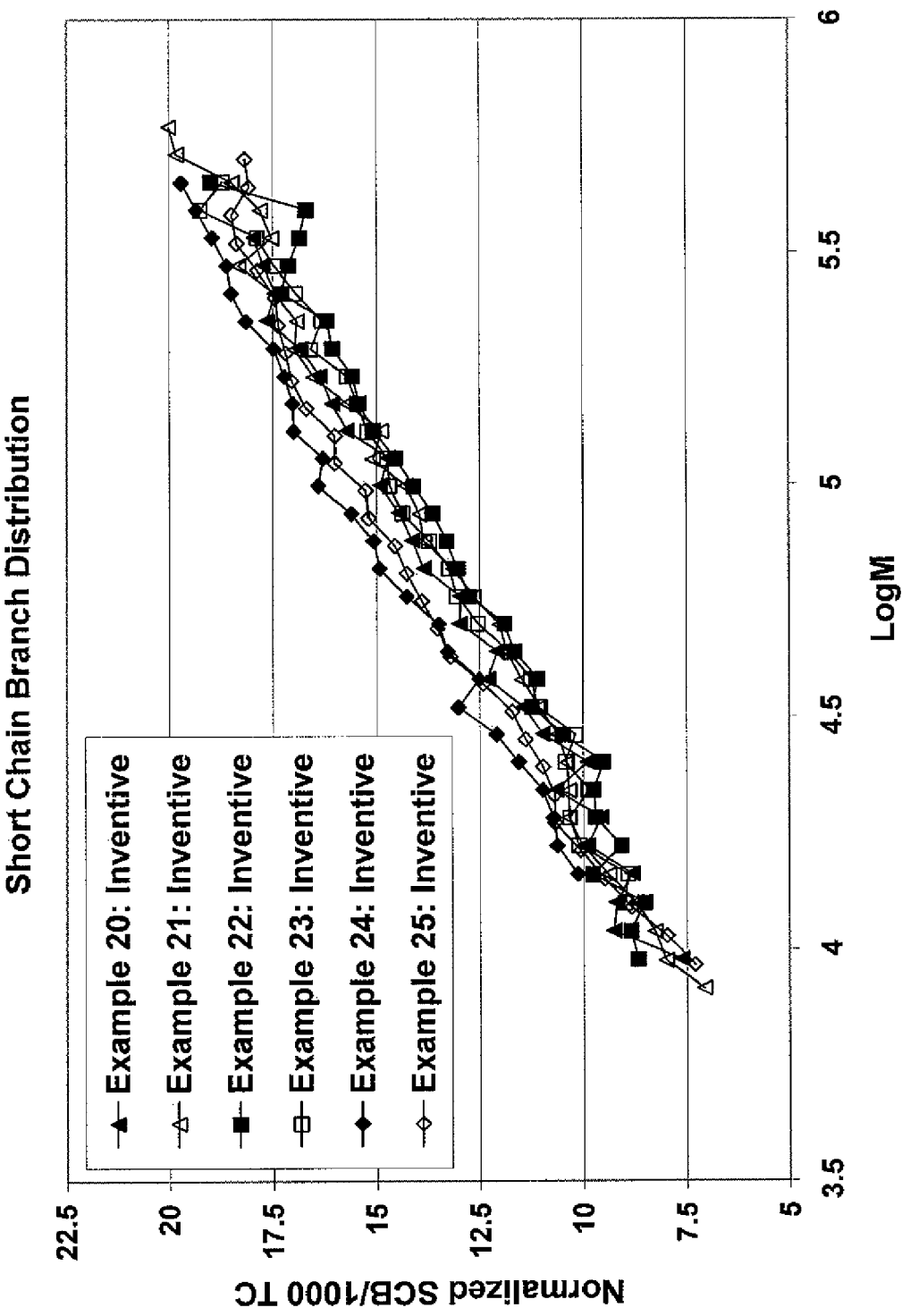
FIG. 9 presents a plot of the short chain branch distributions of the polymers of Examples 20-25.

The SCBD of Examples 20-25 is shown in FIG. 9. Each of these Examples was produced using MET 1 in the presence of hydrogen and has a reverse comonomer distribution. As shown in FIG. 9, the number of SCB per 1000 total carbon atoms is greater at Mw than at Mn for Examples 20-25. Likewise, the ratio of the number of SCB per 1000 total carbon atoms at a molecular weight of $10^{5.5}$ to the number of SCB per 1000 total carbon atoms at a molecular weight of $10^4$ is greater than 1.

Figure 10:
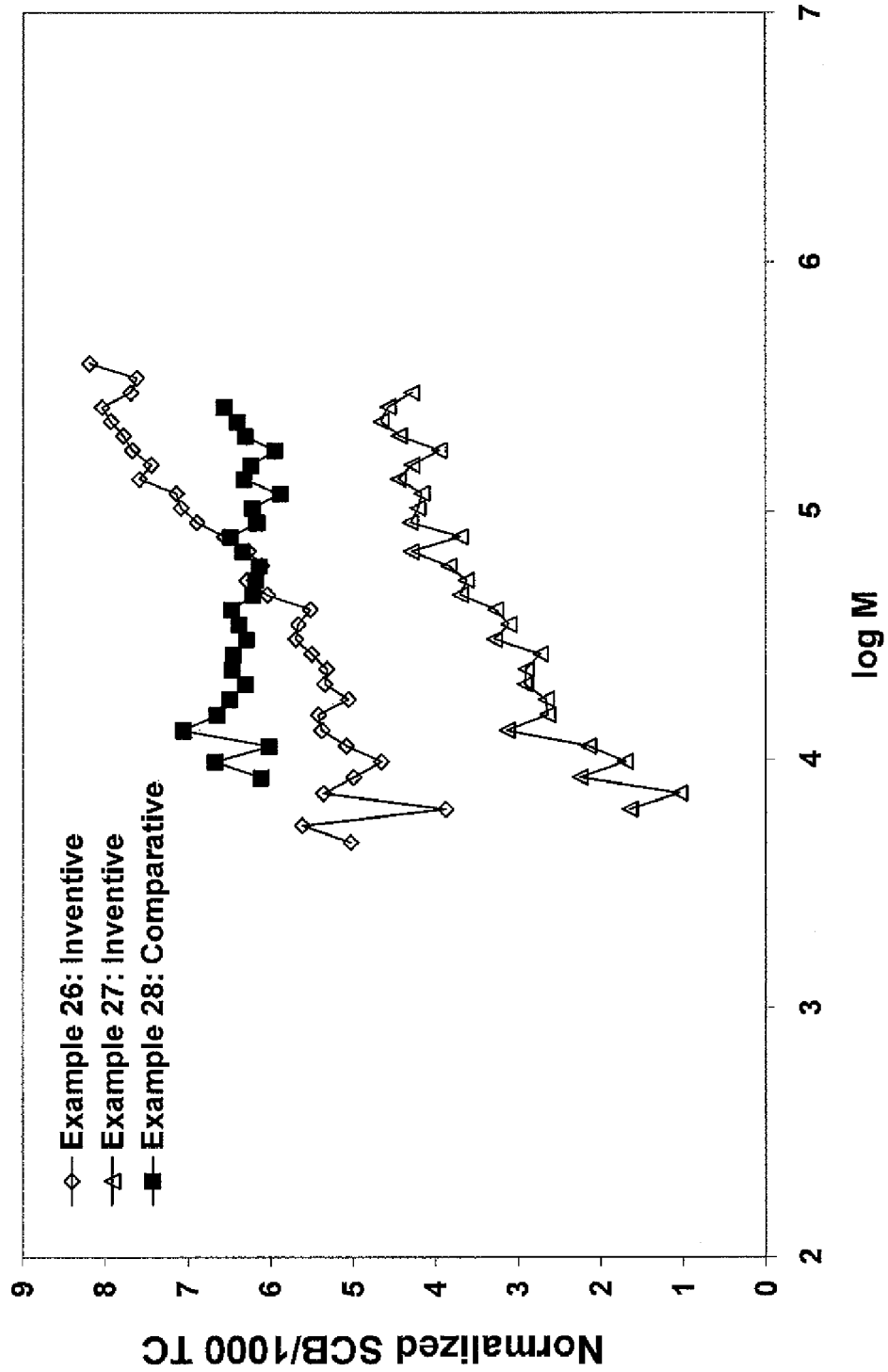
FIG. 10 presents a plot of the short chain branch distributions of the polymers of Examples 26-28.

Comparative Example 28 was produced using MET 3, while Inventive Examples 26-27 employed MET 1. The SCBD of Example 28 is contrasted with the SCBD of Examples 26-27 in FIG. 10. While Example 28 does not exhibit a reverse comonomer distribution, Examples 26-27 have a reverse comonomer distribution, in which the number of SCB per 1000 total carbon atoms is greater at Mw than at Mn. Additionally, for Examples 26-27, the ratio of the number of SCB per 1000 total carbon atoms at a molecular weight of $10^{5.5}$ to the number of SCB per 1000 total carbon atoms at a molecular weight of $10^4$ is greater than 1.

Figure 11:
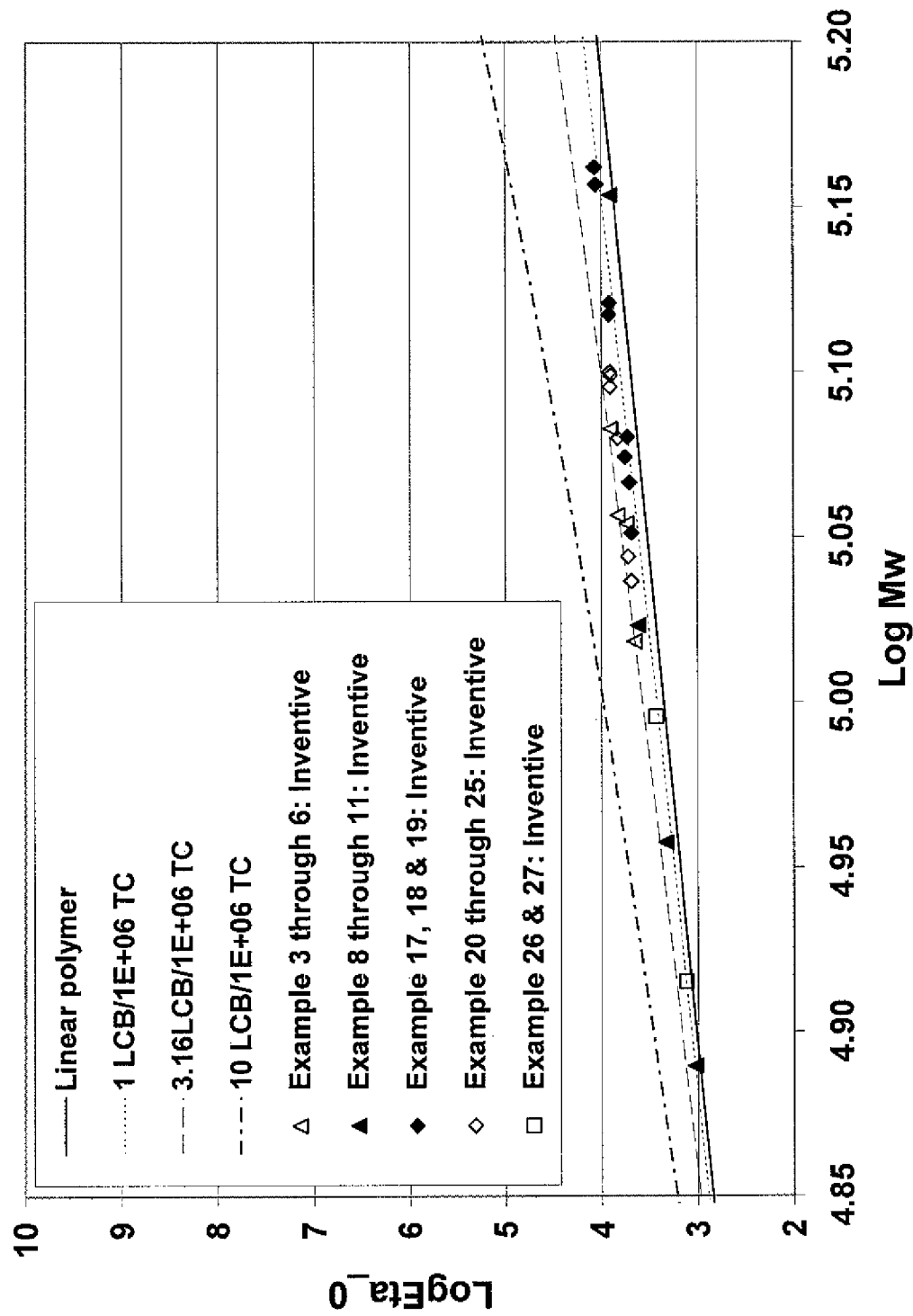
FIG. 11 presents a plot of zero shear viscosity versus weight-average molecular weight, specifically, $\log(\eta_0)$ versus $\log(Mw)$, for the polymers of Examples 3-6, 8-11, and 17-27.

FIG. 11 is a plot of $\log(\eta_0)$ versus $\log(Mw)$ and illustrates the low levels of LCB of the inventive polymers of this invention. Linear polyethylene polymers are observed to follow a power law relationship between their zero shear viscosity, $\eta_0$, and their weight-average molecular weight, Mw, with a power very close to 3.4. This relationship is shown by a straight line with a slope of 3.4 when the logarithm of $\eta_0$ is plotted versus the logarithm of Mw (labeled linear polymer in FIG. 11). Deviations from this linear polymer line are generally accepted as being caused by the presence of LCB. Janzen and Colby presented a model that predicts the expected deviation from the linear plot of $\log(\eta_0)$ vs. $\log(Mw)$ for given frequencies of LCB as a function of the Mw of the polymer. See "Diagnosing long-chain branching in polyethylenes," *J. Mol. Struct.* 48 5-486, 569-584 (1999), which is incorporated herein by reference in its entirety. Inventive polymers 3-6, 8-11, and 17-27 deviate only slightly from the well-known 3.4 power law "Arnett line" which is used as an indication of a linear polymer (J. Phys. Chem. 1980, 84, 649). All of these polymers have levels of LCB below the line representing 10 LCB per 1E+06 TC, which is equivalent to 0.01 LCB per 1000 total carbon atoms.

Figure 12:
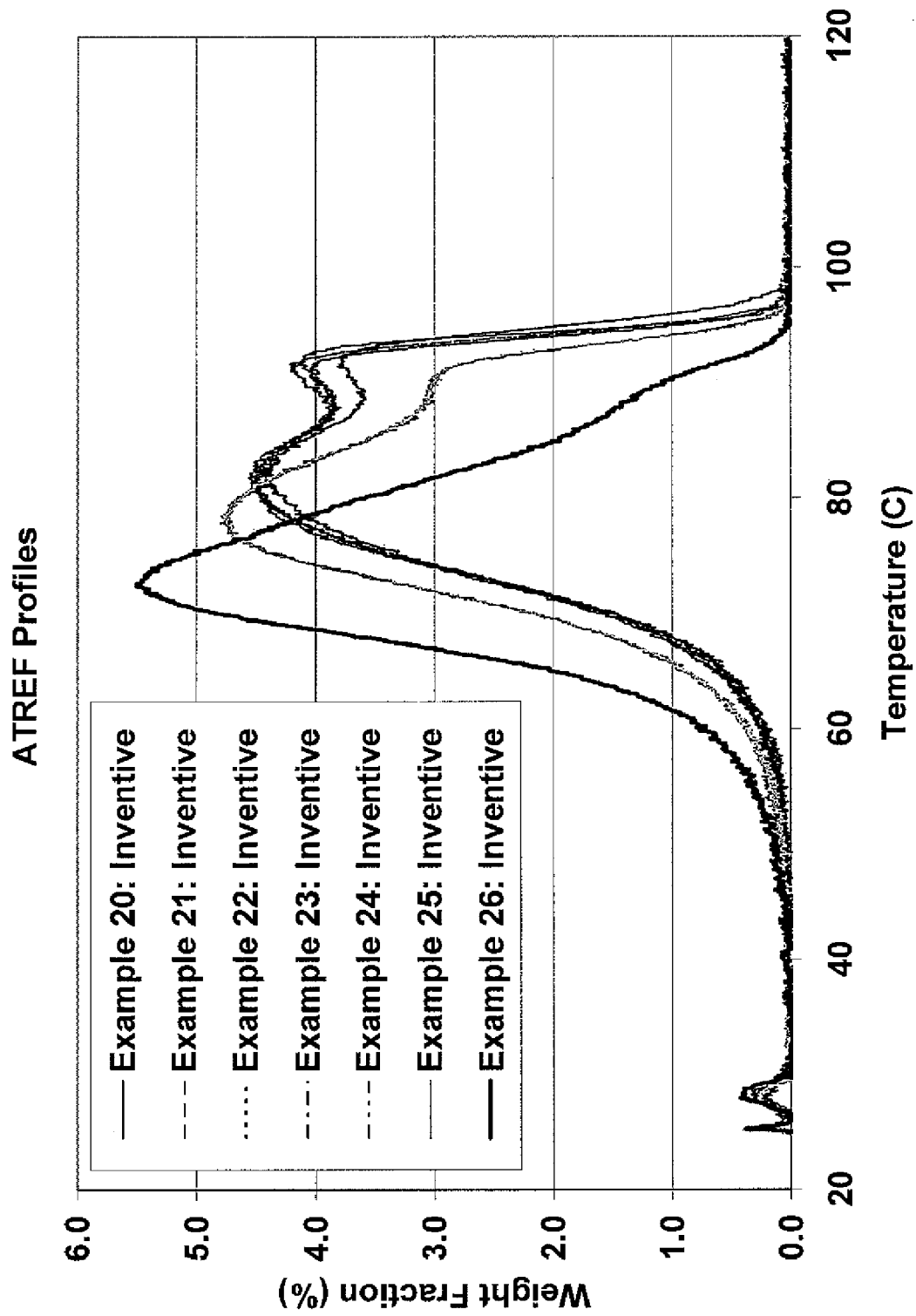
FIG. 12 presents a plot of the ATREF profiles of the polymers of Examples 20-26.

Analytical Temperature Rising Elution Fractionation (ATREF) profiles of Examples 20-26 are illustrated in FIG. 12. As illustrated in FIG. 12 and listed in Table IV, only a very small weight fraction of these polymers was eluted below a temperature of 40° C. This indicates that very little of the comonomer—in this case, 1-hexene—is present in the very low molecular weight fraction of the polymer which elutes at very low temperatures. Hence, more of the comonomer is incorporated in the higher molecular weight fractions, consistent with the characterization that these polymers have a reverse comonomer distribution.

TABLE IV

Polymerization Conditions and Polymer Properties of Examples 15-28.

| | Example | | | | |
|---|---|---|---|---|---|
| | 15 | 16 | 17 | 18 | 19 |
| Example Type | Comparative | Comparative | Inventive | Inventive | Inventive |
| Activator-Support | Sulfated Alumina | Sulfated Alumina | Sulfated Alumina | Sulfated Alumina | Sulfated Alumina |
| Metallocene | MET 2 | MET 2 | MET 1 | MET 1 | MET 1 |
| Metallocene to Reactor (ppm) | 4.65 | 2.53 | 0.98 | 1.13 | 1.12 |
| Autoclave Residence Time (min) | 26.2 | 26.2 | 28.9 | 28.6 | 28.7 |
| Co-catalyst Type | TIBA | TIBA | TIBA | TIBA | TIBA |
| Co-catalyst in reactor (ppm) | 71.3 | 83.9 | 40.2 | 42 | 42 |
| Rx Temp (° F.) | 175.3 | 190.5 | 165.4 | 165.4 | 167.5 |
| Ethylene (mol %) | 13.4 | 14.18 | 11.59 | 11.80 | 11.77 |
| 1-hexene (mol %) | 1.74 | 1.97 | 1.49 | 1.84 | 1.96 |
| Hydrogen Feed Rate (mlb/hr) | 0.98 | 0.5 | 3 | 5 | 4.1 |
| Ethylene Feed Rate (lb/hr) | 49.5 | 34.5 | 36 | 36 | 36 |
| 1-Hexene Feed Rate (lb/hr) | 5.75 | 0.37 | 3.64 | 4.5 | 5.2 |
| Total Isobutane Flow Rate (lb/hr) | 64.4 | 70.3 | 76 | 75.4 | 75.3 |
| Solids Concentration. Wt. % | 40.7 | 27.9 | 28.4 | 28.9 | 30.8 |
| Polymer Production (lb/hr) | 49.1 | 29.9 | 33.3 | 34 | 36.3 |
| Density (pellets) (g/cc) | 0.9185 | 0.9368 | 0.9242 | 0.9225 | 0.9191 |
| Density (fluff) (g/cc) | 0.9173 | 0.3946 | 0.9164 | 0.9228 | 0.9185 |
| HLMI (pellets) | 23.9 | 15.7 | 14.8 | 33 | 19.8 |
| MI (pellets) | 1.4 | 0.93 | 0.64 | 1.5 | 0.92 |
| HLMI (fluff) | 25.6 | 16.6 | 20.3 | 40.8 | 31.7 |
| MI (fluff) | 1.51 | 0.97 | 0.71 | 1.4 | 0.98 |
| Mn/1000 (pellets) | 54.24 | 56.3 | 40.93 | 31.22 | 37.89 |
| Mw/1000 (pellets) | 115.33 | 142.31 | 145.26 | 120.33 | 131.07 |
| Mw/Mn (pellets) | 2.13 | 2.53 | 3.55 | 3.85 | 3.46 |
| ATREF Elution Below 40° C. (wt %) | — | — | — | — | — |

| | Example | | | | |
|---|---|---|---|---|---|
| | 20 | 21 | 22 | 23 | 24 |
| Example Type | Inventive | Inventive | Inventive | Inventive | Inventive |
| Activator-Support | Sulfated Alumina | Sulfated Alumina | Sulfated Alumina | Sulfated Alumina | Sulfated Alumina |
| Metallocene | MET 1 | MET 1 | MET 1 | MET 1 | MET 1 |
| Metallocene to Reactor (ppm) | 1.09 | 0.94 | 0.96 | 1.01 | 1.06 |
| Autoclave Residence Time (min) | 28.9 | 29.2 | 28.9 | 29.3 | 28.7 |
| Co-catalyst Type | TIBA | TIBA | TIBA | TIBA | TIBA |
| Co-catalyst in reactor (ppm) | 41.1 | 41.1 | 41.9 | 41.8 | 42.3 |
| Rx Temp (° F.) | 165.4 | 165.4 | 166.8 | 167.6 | 165.8 |
| Ethylene (mol %) | 11.48 | 11.71 | 11.84 | 11.83 | 11.59 |
| 1-hexene (mol %) | 1.94 | 1.97 | 1.96 | 1.97 | 2.13 |
| Hydrogen Feed Rate (mlb/hr) | 5 | 5 | 4.3 | 4.1 | 4 |
| Ethylene Feed Rate (lb/hr) | 36 | 36 | 36 | 36 | 36 |
| 1-Hexene Feed Rate (lb/hr) | 4.89 | 5 | 5.08 | 5.13 | 5.68 |

TABLE IV-continued

Polymerization Conditions and Polymer Properties of Examples 15-28.

| | | | | | |
|---|---|---|---|---|---|
| Total Isobutane Flow Rate (lb/hr) | 75.4 | 75.5 | 75.6 | 75 | 75.6 |
| Solids Concentration Wt. % | 29.7 | 29.1 | 27.8 | 29.7 | 29 |
| Polymer Production (lb/hr) | 35 | 34.3 | 32.9 | 34.9 | 34.4 |
| Density (pellets) (g/cc) | 0.9214 | 0.9229 | 0.9206 | 0.9207 | 0.9207 |
| Density (fluff) (g/cc) | 0.9185 | 0.9205 | 0.918 | 0.9183 | 0.915 |
| HLMI (pellets) | 37.19 | 38.61 | 26.31 | 21.46 | 21.46 |
| MI (pellets) | 1.52 | 1.58 | 1.15 | 0.92 | 0.93 |
| HLMI (fluff) | 45.7 | 44.2 | 27.8 | 25.1 | 23.5 |
| MI (fluff) | 1.67 | 1.61 | 1.06 | 1.01 | 0.94 |
| Mn/1000 (pellets) | 25.8 | 27.60 | 32.80 | 37.50 | 34.50 |
| Mw/1000 (pellets) | 110.9 | 108.8 | 120.2 | 125.9 | 125.6 |
| Mw/Mn (pellets) | 4.29 | 3.94 | 3.67 | 3.36 | 3.64 |
| ATREF Elution Below 40° C. (wt %) | 0.8 | 0.8 | 0.7 | 0.4 | 0.7 |

| | Example | | | |
|---|---|---|---|---|
| | 25 | 26 | 27 | 28 |
| Example Type | Inventive | Inventive | Inventive | Comparative |
| Activator-Support | Sulfated Alumina | Sulfated Alumina | Sulfated Alumina | Sulfated Alumina |
| Metallocene | MET 1 | MET 1 | MET 1 | MET 3 |
| Metallocene to Reactor (ppm) | 1.03 | 0.9 | 0.95 | 2.2 |
| Autoclave Residence Time (min) | 28.9 | 21.6 | 21.4 | 20.4 |
| Co-catalyst Type | TIBA | TIBA | TIBA | TIBA |
| Co-catalyst in reactor (ppm) | 41.5 | 40.7 | 36.2 | 41.1 |
| Rx Temp (° F.) | 165.8 | 174.8 | 174.8 | 174.8 |
| Ethylene (mol %) | 11.74 | 9.8 | 10.24 | 13.1 |
| 1-hexene (mol %) | 2.15 | 0.74 | 0.59 | 2.24 |
| Hydrogen Feed Rate (mlb/hr) | 4 | 4.7 | 3 | 1.8 |
| Ethylene Feed Rate (lb/hr) | 36 | 30.1 | 30.1 | 31.7 |
| 1-Hexene Feed Rate (lb/hr) | 5.64 | 1.7 | 0.87 | 5.04 |
| Total Isobutane Flow Rate (lb/hr) | 75.4 | 66.3 | 76.4 | 63.6 |
| Solids Concentration Wt. % | 29.3 | 26.7 | 24.1 | 26.8 |
| Polymer Production (lb/hr) | 34.7 | 26.5 | 26.1 | 27.3 |
| Density (pellets) (g/cc) | 0.9191 | 0.9360 | 0.9395 | 0.9369 |
| Density (fluff) (g/cc) | 0.9153 | 0.935 | 0.9385 | 0.9358 |
| HLMI (pellets) | 21.56 | — | — | — |
| MI (pellets) | 0.93 | — | — | — |
| HLMI (fluff) | 23.6 | 134.4 | 64.7 | 123.7 |
| MI (fluff) | 0.89 | 5.85 | 3.02 | 6.25 |
| Mn/1000 (pellets) | 34.90 | 24.68 | 27.65 | 28.27 |
| Mw/1000 (pellets) | 124.6 | 86.77 | 101.67 | 80.41 |
| Mw/Mn (pellets) | 3.56 | 3.52 | 3.68 | 2.84 |
| ATREF Elution Below 40° C. (wt %) | 0.6 | 0.6 | — | — |

Comparative Examples 29-32

Polymers Produced Using a Ziegler Catalyst System

Figure 13:
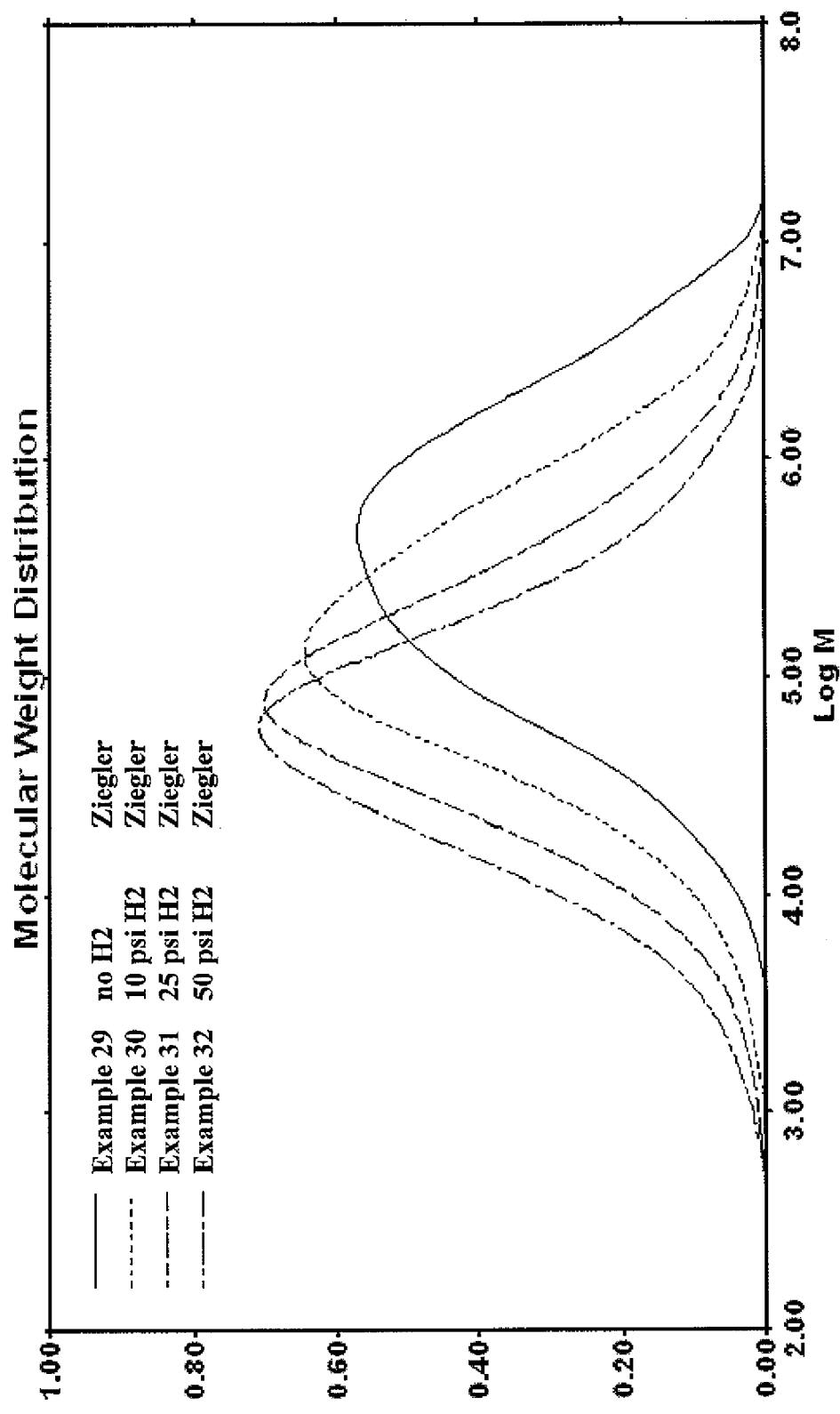
FIG. 13 presents a plot of the molecular weight distributions of the polymers of Examples 29-32.

Comparative Examples 29-32 were produced in accordance with the following procedure. To produce the Ziegler catalyst, grade 951 silica, obtained from W.R. Grace, was activated by calcination in a fluidized bed at 600° C. for 3 hours. 20.92 g of this calcined silica were then slurried at 25° C. in 60 mL of dry heptane. Next, 17.2 mL of 1M dibutyl magnesium was added to the slurry, followed by the dropwise addition of 3.8 mL of liquid $TiCl_4$. Subsequently, the heptane was decanted, followed by two heptane washes. The catalyst was dried at 40° C. under nitrogen. About 0.1 g of this catalyst was then charged under nitrogen to a 2.2-L autoclave, equipped with a jacket for temperature control and a marine stirrer operating at 400 rpm. After 1.2 L of isobutane liquid were added, hydrogen was added, or not, as indicated in FIG. 13. Hydrogen gas was added to the reactor at 25° C. from a 1-L pressurized storage cylinder. The temperature was increased in the reactor to 90° C. and ethylene was added at 550 psig, and continuously added to maintain that pressure during polymerization. Thus, polymerizations were conducted at a temperature of 90° C., a pressure of 550 psig, and either in the presence of, or the absence of, hydrogen. Polymerizations were stopped by venting after about 60 minutes.

FIG. 13 illustrates the molecular weight distribution of Comparative Examples 29-32 at hydrogen levels ranging from zero to 50 psig. The results of Comparative Examples 29-32 indicated that the addition of hydrogen in the polymerization of ethylene produces a polymer with a narrower molecular weight distribution.

We claim:

1. An olefin polymerization process, which comprises:
contacting a catalyst composition with an olefin monomer and at least one olefin comonomer under polymerization conditions to produce an olefin polymer, wherein the catalyst composition comprises a contact product of at least one metallocene compound and at least one activator,
wherein the at least one metallocene compound has the formula:

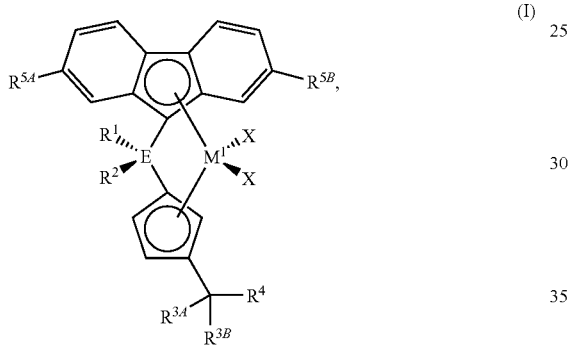

(I)

wherein:
$M^1$ is Ti, Zr, or Hf;
X is independently F; Cl; Br; I; methyl; phenyl; H; $BH_4$; $OBR^4{}_2$ or $SO_3R^4$, wherein $R^4$ is an alkyl or aryl group having up to 12 carbon atoms; or a hydrocarbyloxide group, a hydrocarbylamino group, or a hydrocarbylsilyl group, any of which can have up to 20 carbon atoms;
E is C or Si;
$R^1$ and $R^2$ are independently H or an alkyl or aryl group having up to 12 carbon atoms, wherein at least one of $R^1$ and $R^2$ is an aryl group;
$R^{3A}$ and $R^{3B}$ are independently H or a hydrocarbyl or hydrocarbylsilyl group having up to 20 carbon atoms;
$R^4$ is an alkyl or alkenyl group having up to 10 carbon atoms; and
$R^{5A}$ and $R^{5B}$ are independently H or a hydrocarbyl group having up to 12 carbon atoms; and
wherein the polymerization process is conducted in the presence of hydrogen; the olefin polymer has a reverse comonomer distribution; and the olefin polymer has a ratio of Mw/Mn from about 3 to about 6.

2. The process of claim 1, wherein $R^1$ and $R^2$ are an aryl group having up to 12 carbon atoms.

3. The process of claim 1, wherein $R^{3A}$ and $R^{3B}$ independently are H or methyl.

4. The process of claim 1, wherein $R^4$ is a linear alkenyl group having up to 6 carbon atoms.

5. The process of claim 1, wherein $R^{5A}$ and $R^{5B}$ independently are H or t-butyl.

6. The process of claim 1, wherein the at least one metallocene compound is:

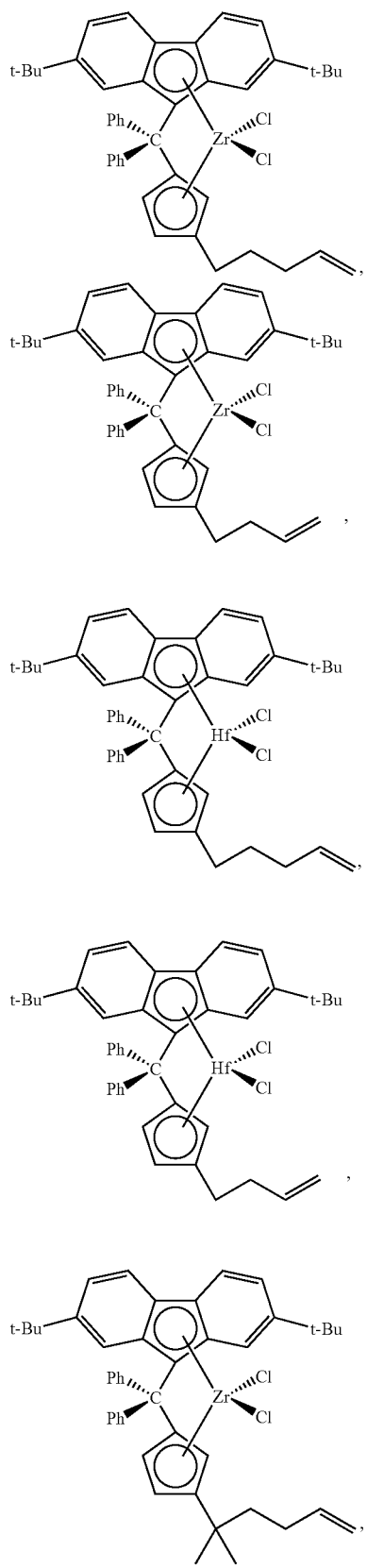

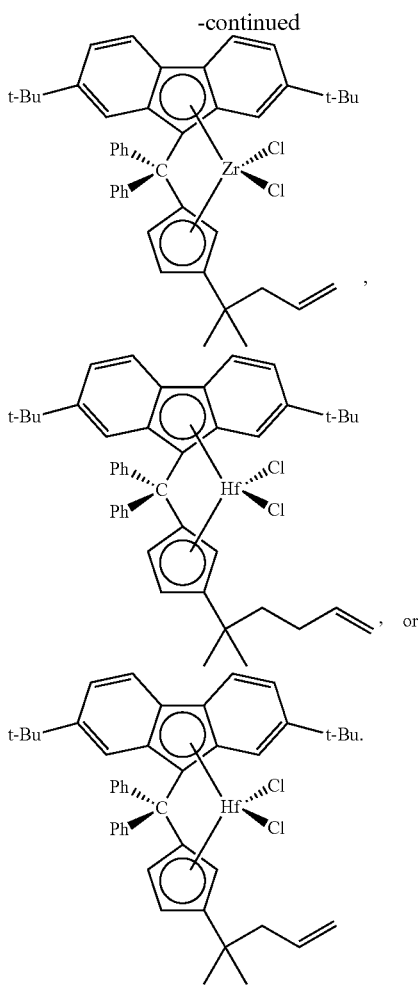

7. The process of claim 1, wherein the catalyst composition comprises only one metallocene compound having formula (I).

8. The process of claim 1, wherein the at least one activator is at least one activator-support comprising a solid oxide treated with an electron-withdrawing anion, wherein:
the solid oxide is silica, alumina, silica-alumina, aluminum phosphate, heteropolytungstate, titania, zirconia, magnesia, boria, or zinc oxide, or a mixed oxide thereof, or any mixture thereof; and
the electron-withdrawing anion is sulfate, bisulfate, fluoride, chloride, bromide, iodide, fluorosulfate, fluoroborate, phosphate, fluorophosphate, trifluoroacetate, triflate, fluorozirconate, or fluorotitanate, or any combination thereof.

9. The process of claim 8, wherein the at least one activator-support further comprises a metal or metal ion, and wherein the metal or metal ion is zinc, nickel, vanadium, titanium, silver, copper, gallium, tin, tungsten, molybdenum, or zirconium, or any combination thereof.

10. The process of claim 1, wherein the at least one activator is at least one activator-support, and wherein the at least one activator-support is fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, or fluorided silica-clad alumina, or any combination thereof.

11. The process of claim 1, wherein the at least one activator is at least one activator-support comprising a clay mineral, a pillared clay, an exfoliated clay, an exfoliated clay gelled into another oxide matrix, a layered silicate mineral, a non-layered silicate mineral, a layered aluminosilicate mineral, or a non-layered aluminosilicate mineral, or any combination thereof.

12. The process of claim 1, wherein the catalyst composition further comprises at least one organoaluminum compound having the formula:

$$Al(X^5)_m(X^6)_{3-m};$$

wherein:
$X^5$ is a hydrocarbyl;
$X^6$ is an alkoxide or an aryloxide, a halide, or a hydride; and
m is from 1 to 3, inclusive.

13. The process of claim 12, wherein the at least one organoaluminum compound is trimethylaluminum, triethylaluminum, tri-n-propylaluminum, tri-n-butylaluminum, tri-isobutylaluminum, tri-n-hexylaluminum, tri-n-octylaluminum, diisobutylaluminum hydride, diethylaluminum ethoxide, or diethylaluminum chloride, or any combination thereof.

14. The process of claim 1, wherein the at least one activator is at least one aluminoxane compound, at least one organoboron or organoborate compound, or at least one ionizing ionic compound, or any combination thereof.

15. The process of claim 1, wherein a weight ratio of hydrogen to the olefin monomer is in a range from about 50 ppm to about 10,000 ppm.

16. The process of claim 1, wherein the catalyst composition, the olefin monomer, and the at least one olefin comonomer are contacted in a single reactor, and wherein the single reactor is a gas phase reactor, a loop reactor, or a stirred tank reactor.

17. The process of claim 1, wherein the olefin monomer is ethylene.

18. The process of claim 1, wherein the at least one olefin comonomer is propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, or styrene, or mixtures thereof.

19. An olefin polymerization process, which comprises:
contacting a catalyst composition with an olefin monomer and at least one olefin comonomer under polymerization conditions to produce an olefin polymer, wherein the catalyst composition comprises a contact product of at least one metallocene compound and at least one activator,
wherein the at least one metallocene compound has the formula:

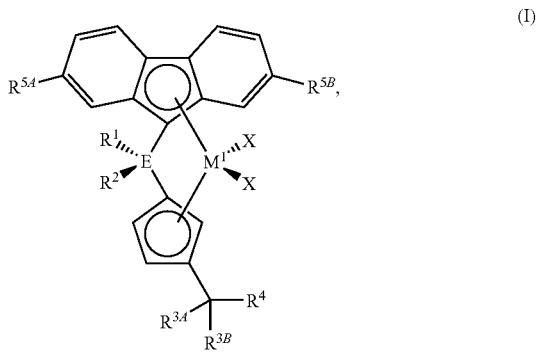

wherein:
  $M^1$ is Ti, Zr, or Hf;
  X is independently F; Cl; Br; I; methyl; phenyl; H; $BH_4$; $OBR^A{}_2$ or $SO_3R^A$, wherein $R^A$ is an alkyl or aryl group having up to 12 carbon atoms; or a hydrocarbyloxide group, a hydrocarbylamino group, or a hydrocarbylsilyl group, any of which can have up to 20 carbon atoms;
  E is C or Si;
  $R^1$ and $R^2$ are independently H or an alkyl or aryl group having up to 12 carbon atoms, wherein at least one of $R^1$ and $R^2$ is an aryl group;
  $R^{3A}$ and $R^{3B}$ are independently H or a hydrocarbyl or hydrocarbylsilyl group having up to 20 carbon atoms;
  $R^4$ is an alkyl or alkenyl group having up to 10 carbon atoms; and
  $R^{5A}$ and $R^{5B}$ are independently H or a hydrocarbyl group having up to 12 carbon atoms;
wherein:
  the polymerization process is conducted in the presence of hydrogen;
  the olefin polymer has a ratio of Mw/Mn from about 3 to about 6;
  the olefin polymer has a reverse comonomer distribution; and
  the olefin polymer has less than about 0.05 LCB per 1000 total carbon atoms.

20. The process of claim 19, wherein the olefin monomer is ethylene, and the at least one olefin comonomer is 1-butene, 1-pentene, 1-hexene, 1-octene, 1-decene, or styrene, or a mixture thereof.

21. The process of claim 20, wherein less than about 5% by weight of the olefin polymer is eluted below a temperature of 40° C. in an ATREF test.

22. The process of claim 21, wherein in formula (I):
  $M^1$ is Zr or Hf;
  X is independently Cl, methyl, or phenyl;
  E is C;
  $R^1$ and $R^2$ are independently methyl, ethyl, phenyl, or benzyl, wherein at least one of $R^1$ and $R^2$ is phenyl;
  $R^{3A}$ and $R^{3B}$ are independently H, methyl, ethyl, or trimethylsilyl;
  $R^4$ is ethenyl, propenyl, butenyl, or pentenyl; and
  $R^{5A}$ and $R^{5B}$ are independently H, methyl, ethyl, propyl, or t-butyl.

23. An olefin polymerization process, which comprises:
  contacting a catalyst composition with an olefin monomer and at least one olefin comonomer under polymerization conditions to produce an olefin polymer, wherein the catalyst composition comprises a contact product of at least one metallocene compound and at least one activator,
  wherein the at least one metallocene compound has the formula:

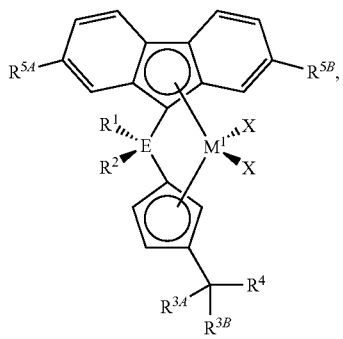

(I)

wherein:
  $M^1$ is Ti, Zr, or Hf;
  X is independently F; Cl; Br; I; methyl; phenyl; H; $BH_4$; $OBR^A{}_2$ or $SO_3R^A$, wherein $R^A$ is an alkyl or aryl group having up to 12 carbon atoms; or a hydrocarbyloxide group, a hydrocarbylamino group, or a hydrocarbylsilyl group, any of which can have up to 20 carbon atoms;
  E is C or Si;
  $R^1$ and $R^2$ are independently H or an alkyl or aryl group having up to 12 carbon atoms, wherein at least one of $R^1$ and $R^2$ is an aryl group;
  $R^{3A}$ and $R^{3B}$ are independently H or a hydrocarbyl or hydrocarbylsilyl group having up to 20 carbon atoms;
  $R^4$ is an alkyl or alkenyl group having up to 10 carbon atoms; and
  $R^{5A}$ and $R^{5B}$ are independently H or a hydrocarbyl group having up to 12 carbon atoms;
wherein:
  the polymerization process is conducted in the presence of hydrogen;
  the olefin polymer has a ratio of Mw/Mn from about 3 to about 6; and
  less than about 5% by weight of the olefin polymer is eluted below a temperature of 40° C. in an ATREF test.

24. The process of claim 23, wherein the olefin polymer has less than about 0.05 LCB per 1000 total carbon atoms.

25. The process of claim 23, wherein the at least one metallocene compound is:

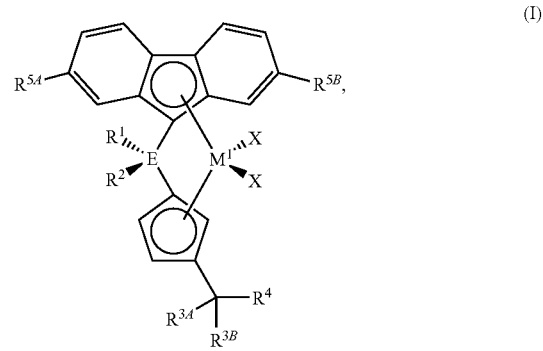

(I)

26. The process of claim 23, wherein the catalyst composition comprises only one metallocene compound having formula (I).

27. The process of claim 23, wherein the at least one activator is at least one aluminoxane compound, at least one organoboron or organoborate compound, or at least one ionizing ionic compound, or any combination thereof.

28. The process of claim 27, wherein the olefin monomer is ethylene, and the at least one olefin comonomer is 1-butene, 1-pentene, 1-hexene, 1-octene, 1-decene, or styrene, or a mixture thereof.

29. The process of claim 28, wherein in formula (I):
  $M^1$ is Zr or Hf;
  X is independently Cl, methyl, or phenyl;
  E is C;
  $R^1$ and $R^2$ are independently methyl, ethyl, phenyl, or benzyl, wherein at least one of $R^1$ and $R^2$ is phenyl;
  $R^{3A}$ and $R^{3B}$ are independently H, methyl, ethyl, or trimethylsilyl;
  $R^4$ is ethenyl, propenyl, butenyl, or pentenyl; and
  $R^{5A}$ and $R^{5B}$ are independently H, methyl, ethyl, propyl, or t-butyl.

30. The process of claim 23, wherein the at least one activator is at least one activator-support, and wherein the at least one activator-support is fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, or fluorided silica-clad alumina, or any combination thereof.

31. The process of claim 30, wherein the catalyst composition further comprises at least one organoaluminum compound, and wherein the at least one organoaluminum compound is trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, or diethylaluminum chloride, or any combination thereof.

32. The process of claim 31, wherein the olefin monomer is ethylene, and the at least one olefin comonomer is 1-butene, 1-pentene, 1-hexene, 1-octene, 1-decene, or styrene, or a mixture thereof.

33. The process of claim 32, wherein in formula (I):
$M^1$ is Zr or Hf;
X is independently Cl, methyl, or phenyl;
E is C;
$R^1$ and $R^2$ are independently methyl, ethyl, phenyl, or benzyl, wherein at least one of $R^1$ and $R^2$ is phenyl;
$R^{3A}$ and $R^{3B}$ are independently H, methyl, ethyl, or trimethylsilyl;
$R^4$ is ethenyl, propenyl, butenyl, or pentenyl; and
$R^{5A}$ and $R^{5B}$ are independently H, methyl, ethyl, propyl, or t-butyl.

34. The process of claim 23, wherein the olefin polymer has a reverse comonomer distribution and a ratio of Mw/Mn from about 3.2 to about 4.8.

35. The process of claim 23, wherein a weight ratio of hydrogen to the olefin monomer is in a range from about 50 ppm to about 10,000 ppm.

36. The process of claim 23, wherein the catalyst composition, the olefin monomer, and the at least one olefin comonomer are contacted in a single reactor, and wherein the single reactor is a gas phase reactor, a loop reactor, or a stirred tank reactor.

* * * * *

UNITED STATES PATENT AND TRADEMARK OFFICE
CERTIFICATE OF CORRECTION

PATENT NO.        : 8,114,946 B2
APPLICATION NO.   : 12/338225
DATED             : February 14, 2012
INVENTOR(S)       : Yang et al.

Page 1 of 1

It is certified that error appears in the above-identified patent and that said Letters Patent is hereby corrected as shown below:

In the Claims

Column 52, lines 30-45:    The chemical structure should be deleted and replaced with:

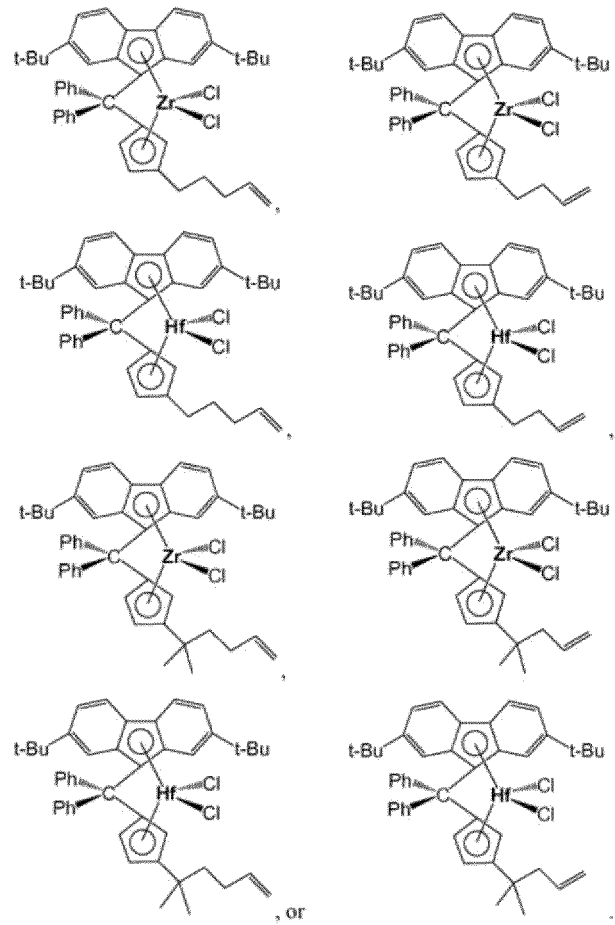

Signed and Sealed this
First Day of March, 2016

Michelle K. Lee
*Director of the United States Patent and Trademark Office*